United States Patent [19]
Uchiyama et al.

[11] Patent Number: 5,850,295
[45] Date of Patent: Dec. 15, 1998

[54] IMAGE RECORDING APPARATUS

[75] Inventors: Seiji Uchiyama; Atsushi Kashihara, both of Tokyo; Kaoru Seto, Chigasaki; Hiroshi Mano; Tetsuo Saito, both of Tokyo; Takashi Kawana, Yokohama, all of Japan

[73] Assignee: Canon Kabushiki Kaisha, Tokyo, Japan

[21] Appl. No.: 275,254

[22] Filed: Jul. 15, 1994

Related U.S. Application Data

[62] Division of Ser. No. 577,340, Sep. 4, 1990.

[30] Foreign Application Priority Data

| Sep. 6, 1989 | [JP] | Japan | 1-229120 |
| Jan. 9, 1990 | [JP] | Japan | 2-001006 |
| Jan. 29, 1990 | [JP] | Japan | 2-016100 |

[51] Int. Cl.$^6$ ................................. H04N 1/40
[52] U.S. Cl. ................ 358/443; 358/447; 358/462; 395/102
[58] Field of Search ............... 358/443, 462, 358/459, 455, 456, 444, 447; 395/102

[56] References Cited

U.S. PATENT DOCUMENTS

| 4,400,738 | 8/1983 | Tomory et al. | 358/456 |
| 4,506,301 | 3/1985 | Kingsley et al. | 358/462 |
| 4,578,689 | 3/1986 | Spencer et al. | 346/160 |
| 4,617,596 | 10/1986 | Yoshida et al. | 358/280 |
| 4,631,751 | 12/1986 | Anderson et al. | 382/47 |
| 4,658,300 | 4/1987 | Kawamura et al. | 358/280 |
| 4,672,459 | 6/1987 | Kudo | 358/462 |
| 4,672,463 | 6/1987 | Tomohisa et al. | 358/284 |
| 4,709,274 | 11/1987 | Tanioka | 358/283 |
| 4,712,185 | 12/1987 | Aoki | 364/518 |
| 4,782,399 | 11/1988 | Sato | 358/280 |
| 4,791,678 | 12/1988 | Iwase et al. | 382/54 |
| 4,831,392 | 5/1989 | Dei | 364/519 |
| 4,841,375 | 6/1989 | Nakajima et al. | 353/280 |
| 4,864,392 | 9/1989 | Sato | 358/80 |
| 4,885,786 | 12/1989 | Anderson et al. | 382/47 |
| 4,905,097 | 2/1990 | Watanabe et al. | 358/456 |
| 4,930,087 | 5/1990 | Egawa et al. | 364/518 |
| 4,947,260 | 8/1990 | Reed et al. | 358/447 |
| 4,975,785 | 12/1990 | Kantor | 358/447 |
| 5,008,752 | 4/1991 | Van Nostrand | 353/462 |
| 5,025,325 | 6/1991 | Hudson | 358/447 |
| 5,045,869 | 9/1991 | Isaka et al. | 346/108 |
| 5,129,048 | 7/1992 | Ng | 395/110 |
| 5,163,122 | 11/1992 | Urabe et al. | 395/109 |
| 5,175,635 | 12/1992 | Yamada | 358/467 |
| 5,235,436 | 8/1993 | Sakamoto et al. | 358/462 |
| 5,270,837 | 12/1993 | Chem et al. | 358/462 |
| 5,337,167 | 8/1994 | Hiratsuka et al. | 358/462 |
| 5,355,231 | 10/1994 | Murata | 358/443 |
| 5,475,414 | 12/1995 | Isaka et al. | 347/129 |
| 5,521,990 | 5/1996 | Ishizawa et al. | 382/270 |

FOREIGN PATENT DOCUMENTS

| 0232081 | 8/1987 | European Pat. Off. . |
| 0356224 | 2/1990 | European Pat. Off. . |
| 61-201591 | 9/1986 | Japan . |
| 63-12019 | 1/1988 | Japan . |
| 63-100894 | 5/1988 | Japan . |
| 2-81184 | 3/1990 | Japan . |
| 2224187 | 4/1990 | United Kingdom . |

*Primary Examiner*—Thomas L. Stoll
*Attorney, Agent, or Firm*—Fitzpatrick, Cella Harper & Scinto

[57] ABSTRACT

The present invention is structured in such a manner that, when multivalued pixel data which constitutes a multivalued image are supplied, a predetermined number of interpolated pixel data are generated and inserted between the supplied and successive pixels. At this time, the gradient of each of the interpolated pixels is calculated and determined in accordance with the gradient of the supplied neighboring multivalued pixels. Thus, the image is recorded on a recording medium in accordance with image data including the interpolated pixel. As a result, print information processed so as to be printed by a low resolution printer can be printed with the same size and high quality as when printed by a high resolution printer according to the present invention.

30 Claims, 44 Drawing Sheets

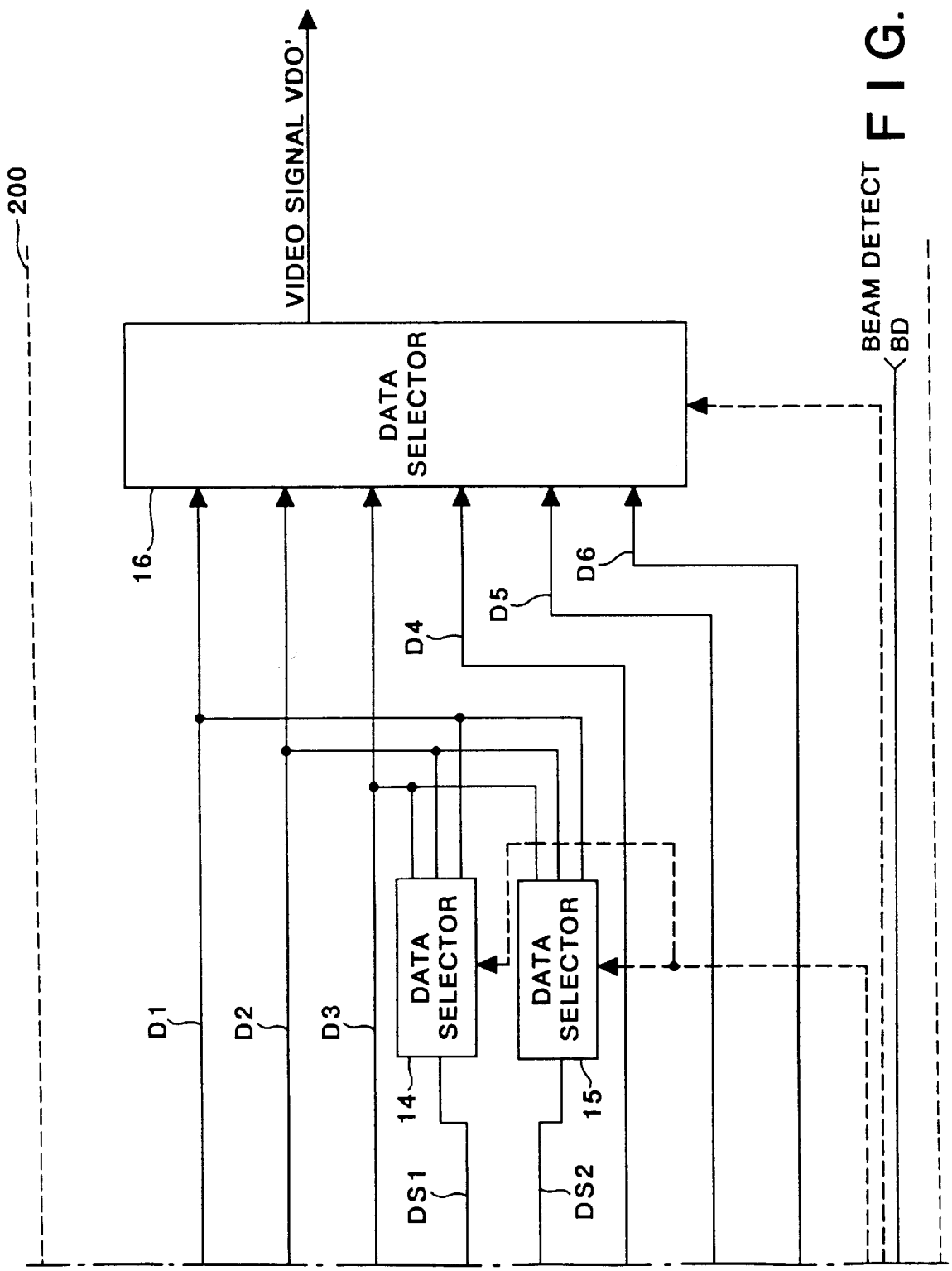

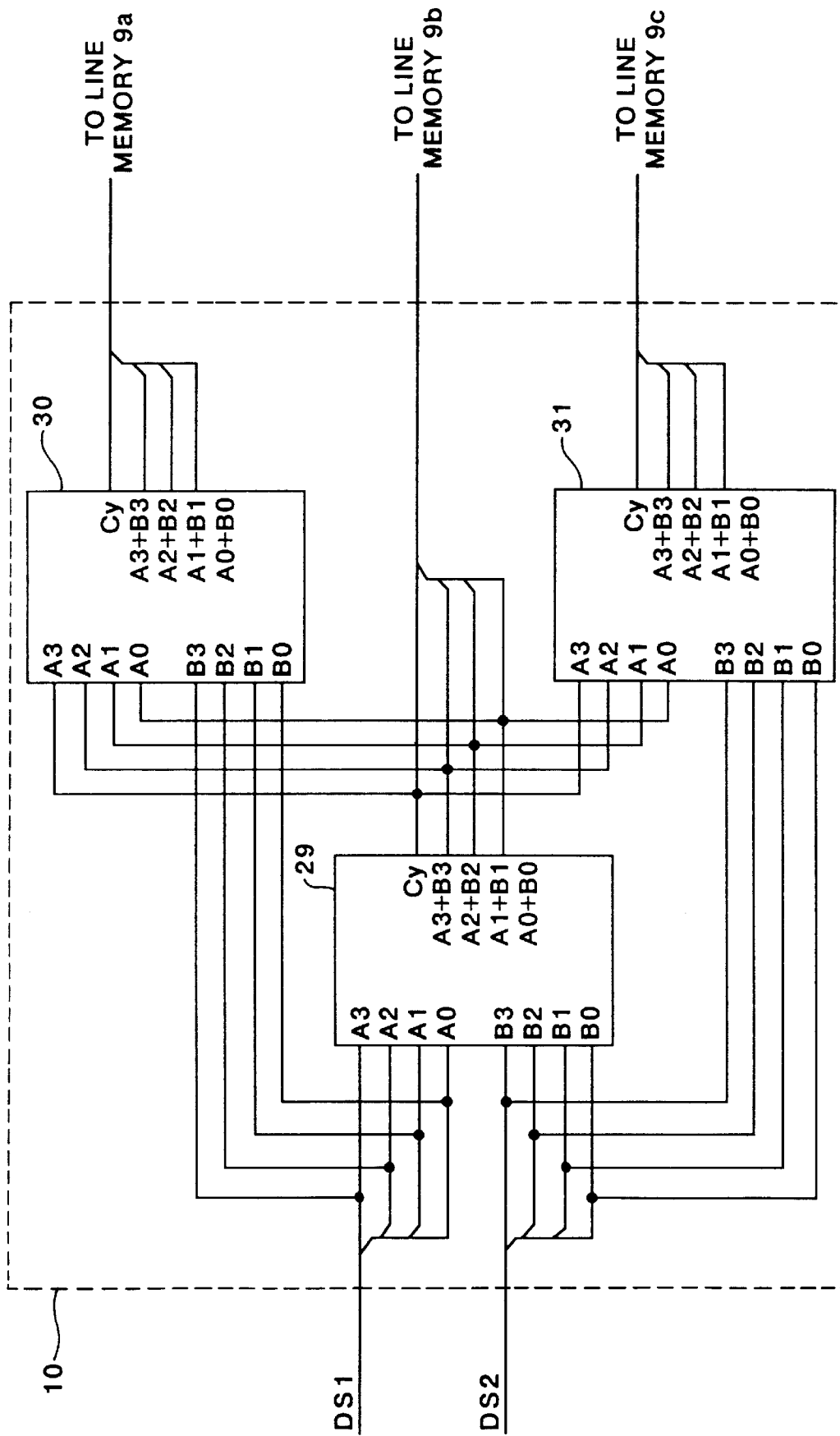
F I G. 7

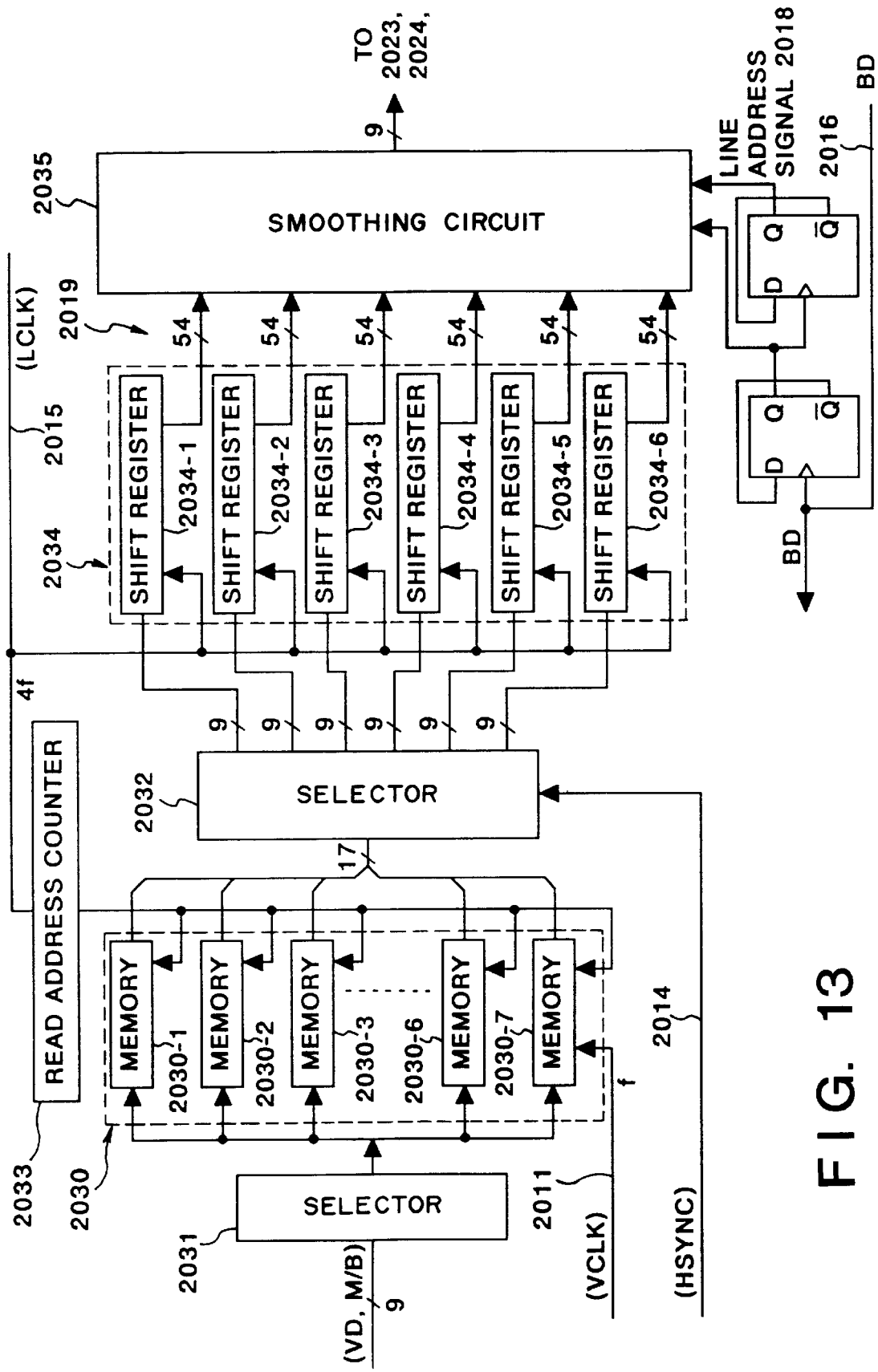
F I G. 13

SIGNALS NECESSARY FOR BINARY DETECTION
1 BIT 36 SIGNALS

SIGNALS TO WHICH REFERENCE IS MADE
FOR PROCESSING SMOOTHING PATTERN
8 BITS 9 SIGNALS

SIGNALS NECESSARY AT NO CONVERSION
9 BITS 16 SIGNALS

F I G.  14C

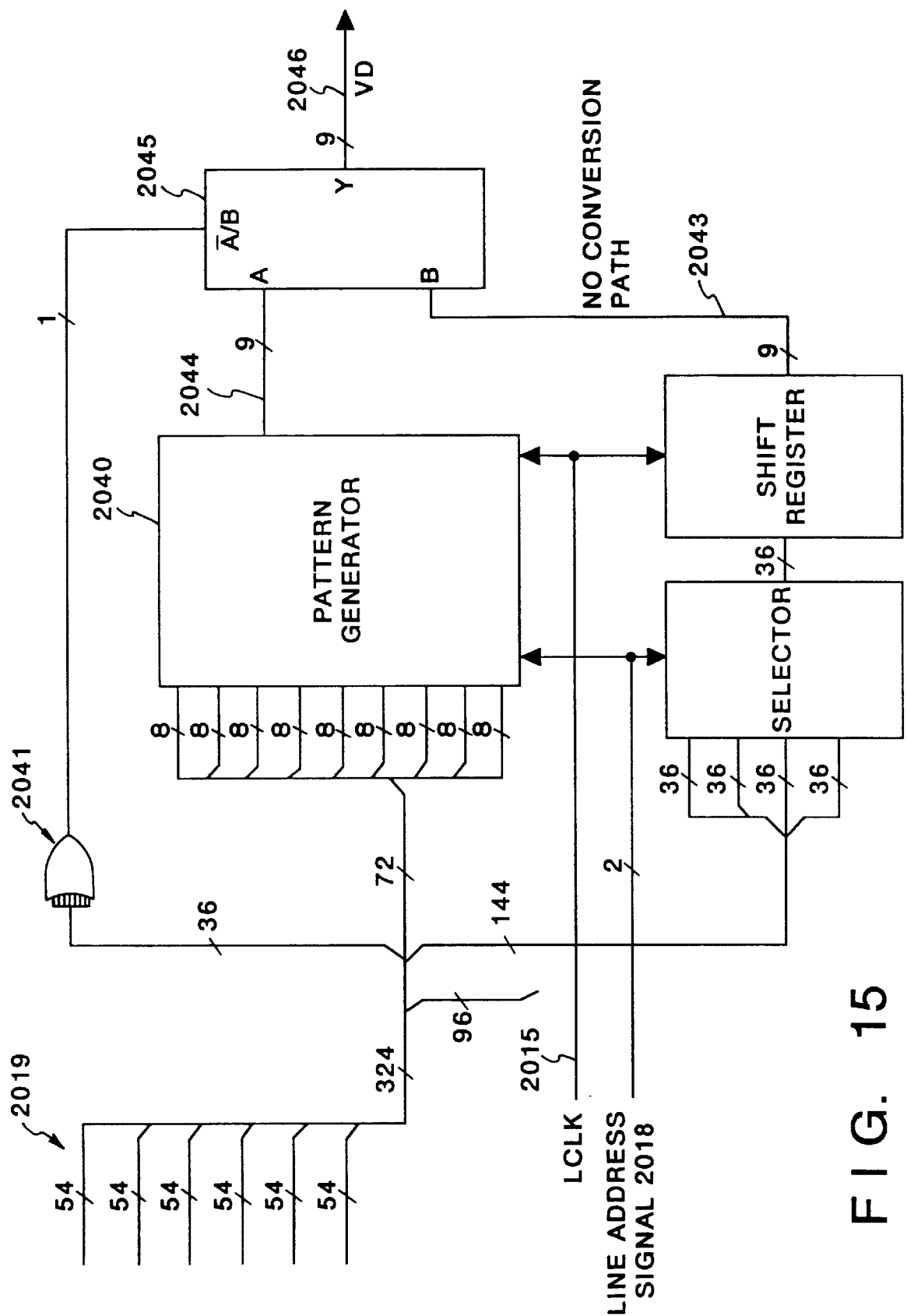
F I G. 15

F I G. 19

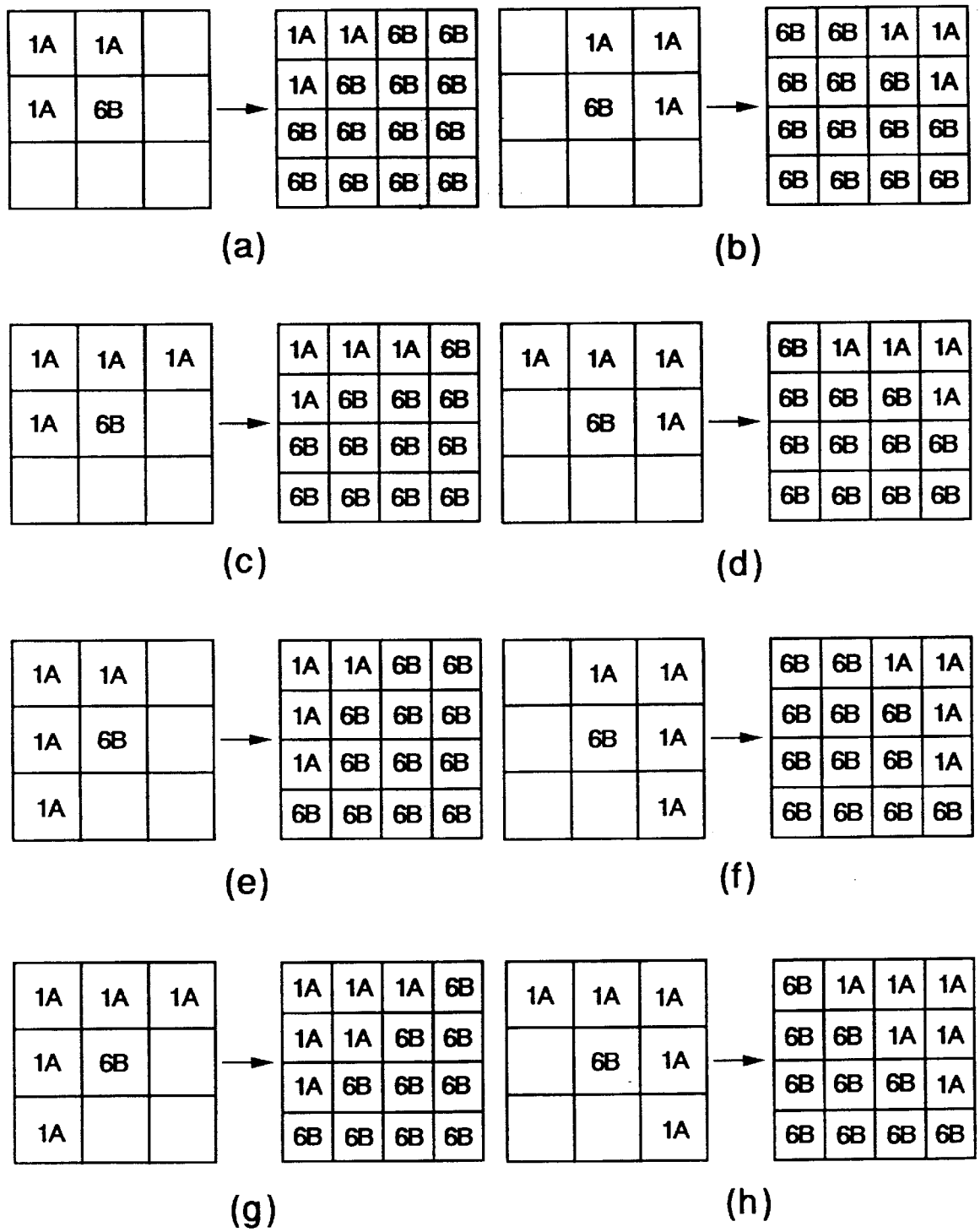
F I G. 20

MAIN SCANNING DIRECTION →
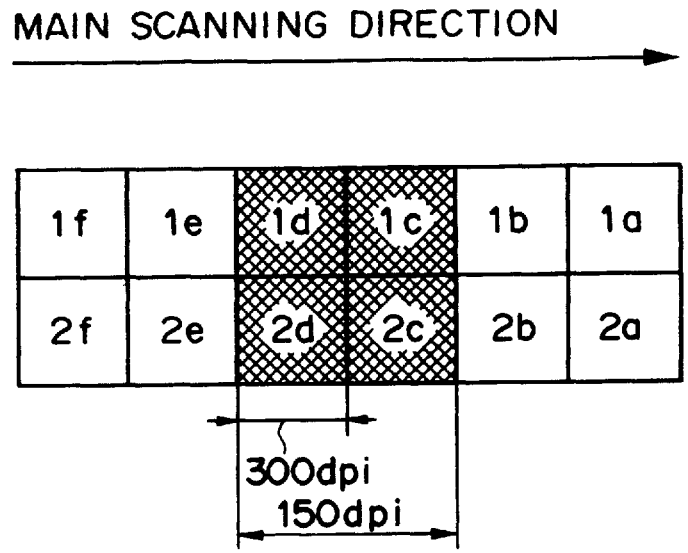
F I G. 24
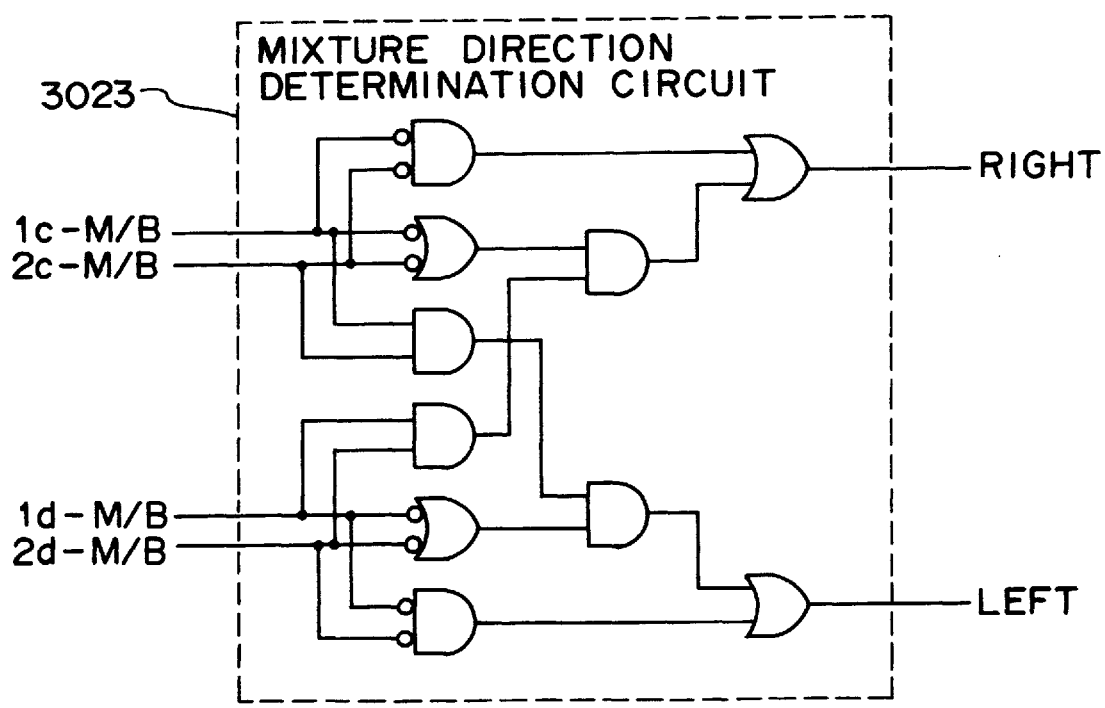
F I G. 25

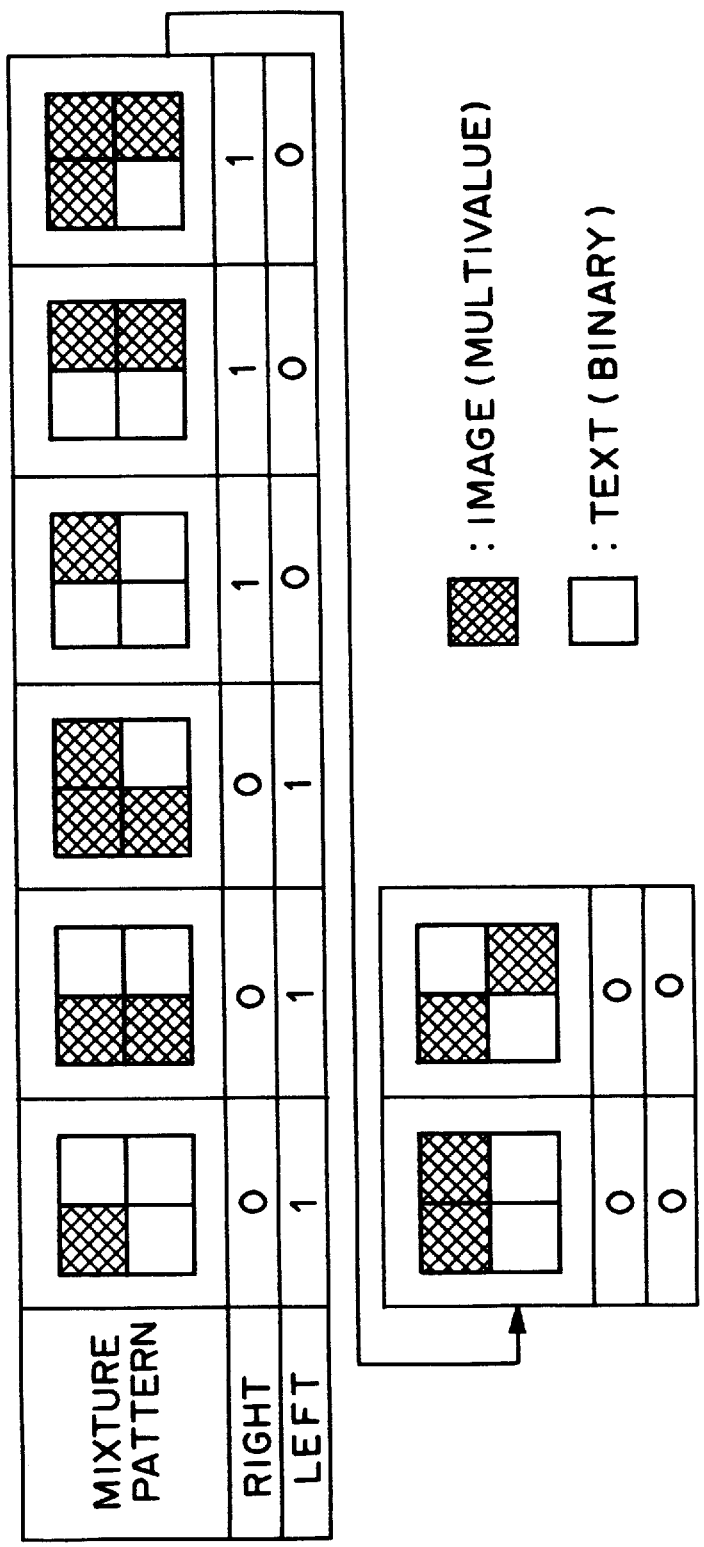
F I G. 26

| BI | MUL | RIGHT | LEFT | BI-L | MUL-L | BI-R | MUL-R | M/B' | PSEL |
|---|---|---|---|---|---|---|---|---|---|
| 1 | 0 | 0 | 0 | X | X | X | X | 1 | B |
| 0 | 1 | 0 | 0 | X | X | X | X | 0 | B |
| 0 | 0 | 0 | 0 | X | X | X | X | 0 | B |
| 0 | 0 | 1 | 0 | X | X | 1 | 0 | 1 | C |
| 0 | 0 | 1 | 0 | X | X | 0 | 1 | 0 | C |
| 0 | 0 | 1 | 0 | X | X | 0 | 0 | 0 | B |
| 0 | 0 | 0 | 1 | 1 | 0 | X | X | 1 | A |
| 0 | 0 | 0 | 1 | 0 | 1 | X | X | 0 | A |
| 0 | 0 | 0 | 1 | 0 | 0 | X | X | 0 | B |

FIG. 27

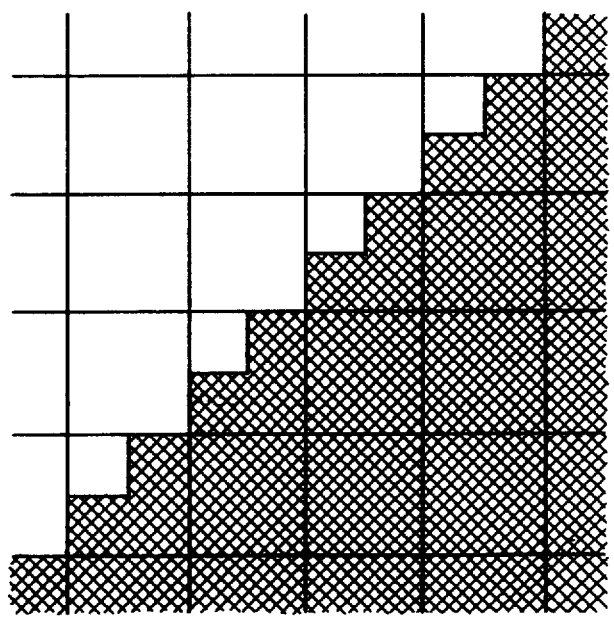
F I G. 29

| | LINE 1 | 2 | 3 | 4 | 5 | 6 |
|---|---|---|---|---|---|---|
| SELECTOR 3101 | LM 3102 | LM 3103 | LM 3104 | LM 3105 | LM 3106 | LM 3107 |
| LINE MEMORY 3102 | W1 | | | | R1 | R1 |
| LINE MEMORY 3103 | | W2 | | | R2 | R2 |
| LINE MEMORY 3104 | | | W3 | | R3 | R3 |
| LINE MEMORY 3105 | | | | W4 | R4 | R4 |
| LINE MEMORY 3106 | | | | | W5 | |
| LINE MEMORY 3107 | | | | | | W6 |
| LINE MEMORY 3108 | | | | | | |
| LINE MEMORY 3109 | | | | | | |
| SELECTOR 3110 | | | | | | |
| SELECTOR 3111 | | | | | LM 3102 | |
| SELECTOR 3112 | | | | | LM 3103 | |
| SELECTOR 3113 | | | | | LM 3104 | |
| SELECTOR 3114 | | | | | LM 3105 | |
| PRINTING LINE | | | | | 1 | 2 |

F I G. 31A

| 7 | 8 | 9 | 10 | 11 | 12 | 13 | 14 |
|---|---|---|---|---|---|---|---|
| LM 3108 | LM 3102 | LM 3103 | LM 3104 | LM 3105 | LM 3106 | LM 3107 | LM 3108 |
| R1 | R1/W8 | R8 | R8 | R8 | R8 | R8 | R8 |
| R2 | R2 | W9 |  | R9 | R9 | R9 | R9 |
| R3 | R3 | R3 | R3/W10 | R10 | R10 | R10 | R10 |
| R4 | R4 | R4 | R4 | W11 |  | R11 | R11 |
| R5 | R5 | R5 | R5 | R5 | R5/W12 | R12 | R12 |
| R6 | R6 | R6 | R6 | R6 | R6 | W13 |  |
| W7 |  | R7 | R7 | R7 | R7 | R7 | R7/W14 |
| LM3102 | | LM3104 | | LM3106 | | LM3108 | |
| LM3103 | | LM3105 | | LM3107 | | LM3102 | |
| LM3104 | | LM3106 | | LM3108 | | LM3103 | |
| LM3105 | | LM3107 | | LM3102 | | LM3104 | |
| LM3106 | | LM3108 | | LM3103 | | LM3105 | |
| LM3107 | | LM3102 | | LM3104 | | LM3106 | |
| 3 | 4 | 5 | 6 | 7 | 8 | 9 | 10 |

| | LINE 1 | 2 | 3 | 4 | 5 | 6 | 7 | 8 | 9 | 10 | 11 | 12 |
|---|---|---|---|---|---|---|---|---|---|---|---|---|
| SELECTOR 3101 | LM 3202 | LM 3203 | LM 3204 | LM 3205 | LM 3206 | LM 3202 | LM 3203 | LM 3204 | LM 3205 | LM 3206 | LM 3202 | LM 3203 |
| LINE MEMORY 3202 | W1 | | | R1 | R1 | W6 | | R6 | R6 | R6 | | R11 (R6/W11) |
| LINE MEMORY 3203 | | W2 | | R2 | R2 | R2 | R7 | R7 (R2/W7) | R7 | R7 | R7 | W12 |
| LINE MEMORY 3204 | | | W3 | R3 | R3 | R3 | R3 | W8 | R8 | R8 | R8 | R8 |
| LINE MEMORY 3205 | | | | W4 | | R4 | R4 | R4 | R4 | W9 (R4/W9) | R9 | R9 |
| LINE MEMORY 3206 | | | | | W5 | R5 | R5 | R5 | R5 | W10 | | R10 |
| SELECTOR 3207 | | | | | LM 3202 | LM 3203 | LM 3203 | LM 3204 | LM 3205 | LM 3206 | LM 3202 | LM 3204 |
| SELECTOR 3208 | | | | | | LM 3202 | LM 3204 | LM 3205 | LM 3206 | LM 3202 | LM 3203 | LM 3205 |
| SELECTOR 3209 | | | | | | | LM 3205 | LM 3202 | LM 3203 | LM 3204 | LM 3205 | LM 3206 |
| SELECTOR 3210 | | | | | | | | LM 3203 | LM 3204 | LM 3205 | LM 3206 | LM 3202 |
| PRINTING LINE | | | | 1 | 2 | 3 | 4 | 5 | 6 | 7 | 8 | 9 |

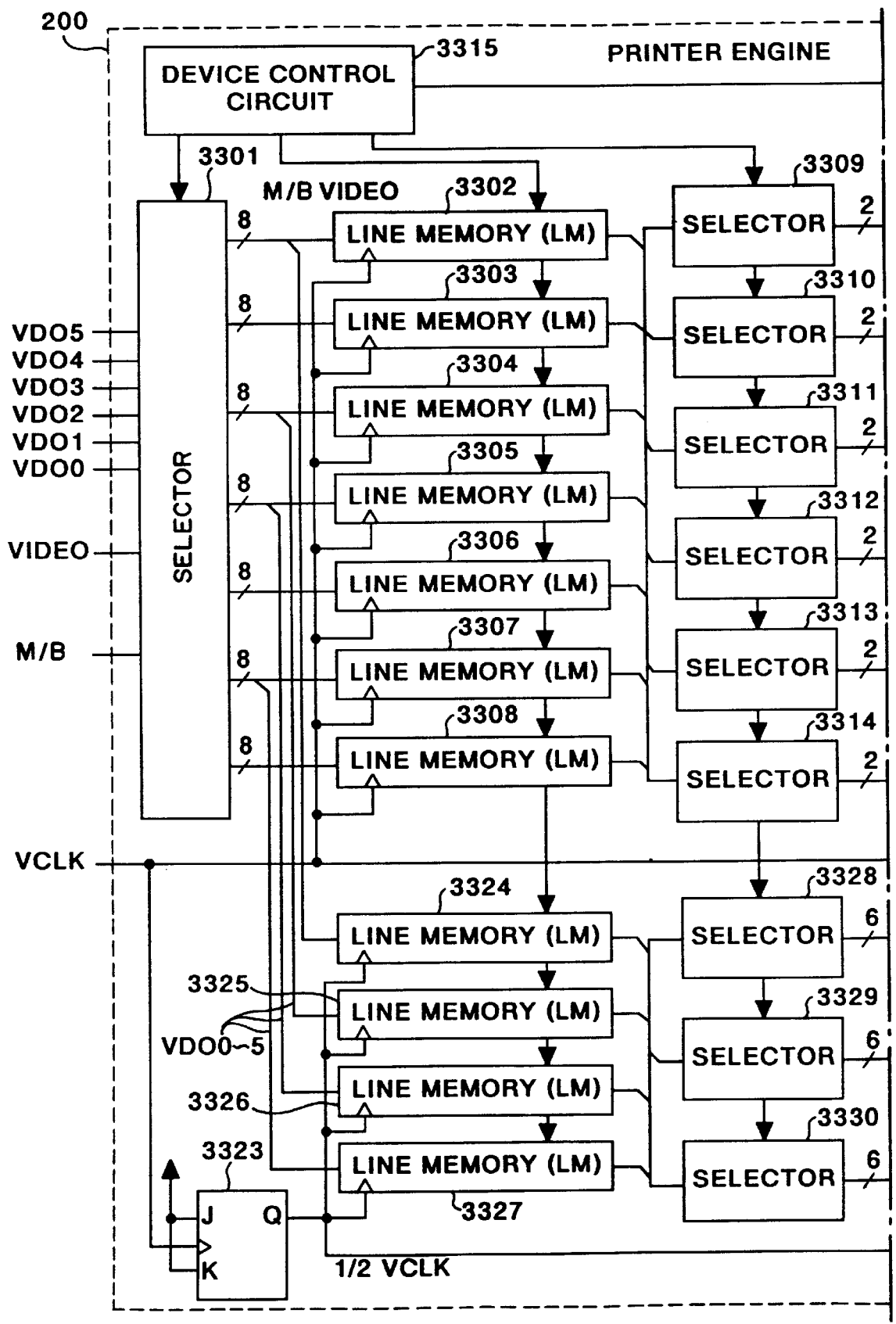
F I G. 36A

IMAGE RECORDING APPARATUS

This application is a division of application Ser. No. 07/577,340, filed Sep. 4, 1990.

BACKGROUND OF THE INVENTION

The present invention relates to an image recording apparatus, and, more particularly, to an image recording apparatus for recording an image on a recording medium in accordance with image data supplied from a host computer or the like.

Recently, a variety of image recording apparatuses acting on the basis of an electrophotography such as a laser beam printer has been widely used as an output apparatus for the computer. An apparatus of the type described above exhibits a multiplicity of advantage such as high image quality and low noise. In particular, the excellent image quality realized by an apparatus of the type described above has been rapidly widened the market of the DTP (Desk Top Publishing).

FIG. 1 is a structural view which schematically illustrates an ordinary laser beam printer.

As shown in FIG. 1, a laser beam printer 300 comprises a printer controller 100 and a printer engine portion 200. The printer controller 100 receives code data (for example, page writing language) or image data so as to develop the image data in the bit map memory thereof, the data thus developed being then transmitted to the printer engine portion 200. The printer engine portion 200 turns on/off a laser device in accordance with data supplied from the printer controller 100. As a result, a laser beam is generated so as to be applied to the side surface of a polygonal mirror which is being rotated at a predetermined speed. Thus, the surface of a photosensitive drum is applied with the laser beam in the main scanning direction. Since the photosensitive drum rotates at a predetermined speed, a two-dimensional static latent image can be formed on the surface of the photosensitive drum when it is swept by the laser beam. Then, the static latent image is, by a known electrophotographic method, developed so that its image is recorded on recording paper. The printer engine portion 200 usually arranged to have a resolution of 300 dpi.

In order to improve the quality of the printed image, the printer engine portion 200 has recently been arranged in such a manner that the resolution of the printed image has been doubled or higher. Furthermore, the gradation expression has been realized. The gradation can be expressed by a pulse width modulation (to be abbreviated to a "PWM" method hereinafter) method. That is, the laser device is operated for a duration corresponding to the density, and the gradation is expressed by the area of the dot which has thereby been formed.

However, when a high resolution printer of the type described above, for example, a printer of 1200 dpi is used, a problem arises in that an application program, which acts on a host computer 500, must correspond to the above-described printer.

For example, when an application program 400 arranged to be used in a 300 dpi printer is being operated in the host computer 500 and the printing is performed by a 1200 dpi laser beam printer, the obtainable image becomes considerably smaller than the size desired by an operator. FIG. 2A illustrates the relationship between the position of the dot on one line and the density in the case where the resolution is 300 dpi. If the image in accordance with the same data is printed by a 1200 dpi printer, the relationship becomes as shown in FIG. 2B, resulting the lateral length of the image (similar to the longitudinal length) to become a quarter of the desired length.

It might therefore be considered feasible to employ a structure arranged in such a manner that the longitudinal and the lateral dot distributions are simply quadrupled so that the dot configuration of 300 dpi can be printed by the 1200 dpi printer. In this case, although the size of the image can be maintained, the obtainable printed image cannot exhibit no significant difference in the smooth gradation change. That is, the quality of the obtained image does not correspond to the performance of the 1200 dpi printer engine.

According to the above-described PWM method, a gradation image can be recorded by receiving multivalued data from the host computer 500. However, it is necessary for obtaining an excellent half tone image to collectively subject several dots to the pulse width modulation which is performed by using the characteristics of the electrophotography. For example, in an apparatus capable of recording an image at a resolution of 600 dpi, a binary image is recorded at 600 dpi. The multivalued image is recorded in such a manner that it is recorded at about a density of 150 dpi (150 lines) by collecting 4×4 dots, each of which is 600 dpi, into one unit. Thus, characters and lines can be recorded with high resolution exhibited and the half tone image exhibiting an excellent gradation can be recorded.

The schematic structure of an apparatus of the type described above will be described with reference to FIG. 37.

FIG. 37 is a block diagram which illustrates a portion of the printer engine portion 200.

In this case, the printer engine 200 is arranged to have the resolution of 300 dpi, and the resolution at the time of the PWM processing is 150 dpi.

The printer controller 100 transmits 6-bits multivalued video signals VD00 to VD05, binary video signal VIDEO and multivalue/binary selection signal M/B to the printer engine portion 200 in synchronization with image clock VCLK which corresponds to a resolution of 300 dpi. In the printer engine portion 200, the above-described signals are synchronized with the image clock VCLK so as to be fetched by a flip-flop 55. A pulse width modulation circuit 56 generates signal PW the pulse width of which has been modulated at 150 dpi unit in response to the multivalued video signals VD00 to VD05, the generated signal PW being then supplied to input terminal A of a selector 57. On the other hand, the binary video signal VIDEO is synchronized with the signal VCLK in the flip-flop 55 so as to be supplied to other input terminal B of the selector 57. The multivalue/binary selection signal M/B acts to select that the pixel to be printed (a subject pixel) is printed as multivalued data or the same is printed as binary data. The selector 57 determines that the multivalued printing is performed when the multivalue/binary selection signal M/B is "0" so that it selects the input A of the selector 57. Furthermore, when the above-described signal is "1", it determines that the binary (character or line) printing is performed and it selects and transmits the input B of the selector 57. Output Y from the selector 57 serves as laser drive signal LD so that the printing is performed by a known electrophotographic method. According to the above-described method, the image is printed at a resolution of 150 dpi and the text is printed at a resolution of 300 dpi. Therefore, the printed image is formed by the mixture of pixels having different resolutions.

Although no problem arises in the case where the binary image and the multivalued image can be separated from each other in a boundary which can be expressed in a unit of 150 lines, the portion in which the multivalued image regions having different gray levels are positioned in contact with each other arises a problem in that the outline of the region becomes too irregular.

Furthermore, in a case where a document is processed in such a manner that a multivalued image and a binary image are written in an overlapped manner in page writing language (for example, PCL, post-script, DDL or the like) in the DTP field, the quality of the processed document may be adversely influenced by the difference between the resolutions of the multivalued data and the binary data. The reason for this will be described with reference to post-script language as shown in FIGS. 38A to 38C.

As shown in FIG. 38A, an outline 58 of an binary image is instructed. The outline 58 is generated at the resolution of 300 dpi which is the resolution arranged for the printer engine 200. Then, as shown in FIG. 38, the inside portion (the lower right portion in the drawing) of the outline 58 is applied with gray (multivalued data). In this case, since the above-described portion is PWM processed as the multivalued data, the resolution becomes 150 dpi.

Then, as shown in FIG. 38C, the above-described region is furthermore applied with black, which is in a binary mode, as an alternative to gray. In this case, since it is the text data, the resolution becomes 300 dpi.

When the operations as described above have been performed, a gray portion 59 is left on the boundary due to the difference in the resolution between the image and the text, causing the image quality to be deteriorated.

SUMMARY OF THE INVENTION

Accordingly, an object of the present invention is to provide an image recording apparatus capable of recording an image of a desired size and excellent quality even if one of a plurality of available application softwares capable of operating on a host computer or the like are used as it is.

In order to achieve the above-described object, according to the present invention, there is provided an image recording apparatus for recording an image to a recording medium in accordance with supplied image information, comprising: input means for receiving multivalued pixel data which constitutes said image information; generating means for generating interpolated pixels by a predetermined number between neighboring multivalued pixels supplied by the input means; and calculating means for calculating the gradient for each of the interpolated pixels generated by the generating means in accordance with the gradient of each of the neighboring multivalued pixels.

According to a preferred embodiment of the present invention, it is preferable that the calculating means calculates the gradient of one interpolated pixel generated by the generating means in accordance with the gradient of each of the neighboring pixels supplied by the input means and the position of an objective interpolated pixel with respect to the neighboring pixel.

Another object of the present invention is to provide an image recording apparatus capable of, as well as the above-described object, recording an excellent quality image even if a binary image consisting of a character or a line is included.

In order to achieve the above-described object, according to the present invention, there is provided an image recording apparatus for recording an image to a recording medium in accordance with supplied image information, comprising: input means for receiving multivalued pixel data which constitutes said image information; interpolated pixel generating means for generating interpolated pixels by a predetermined number between neighboring multivalued pixels supplied by the input means; calculating means for calculating the gradient for each of the interpolated pixels generated by the generating means in accordance with the gradient of each of the neighboring multivalued pixels; output means for transmitting the gradient of either of the neighboring multivalued pixels as the gradient of each of the pixels generated by the generating means; and selection means for selecting either the calculating means or the output means in accordance with the difference in the gradient between the neighboring multivalued pixels supplied by the input means.

According to the preferred embodiment of the present invention, it is preferable that the calculating means calculates the gradient of one interpolated pixel generated by the interpolated pixel generating means in accordance with the gradient of each of the neighboring pixels supplied by the input means and the position of a subject interpolated pixel with respect to the neighboring pixel.

A further object of the present invention is to provide an image recording apparatus capable of recording an excellent quality image having a smooth outline even if the image is positioned in a boundary of multivalued data regions having different gradation levels.

In order to achieve the above-described object, according to the present invention, there is provided an image recording apparatus exhibiting high resolution and capable of maintaining the size of the overall image by recording a plurality of multivalued pixel data for a low resolution, comprising: input means for receiving low-resolution multivalued image data; conversion means for converting objective pixel data into multivalued image information for high resolution in accordance with the distribution of the gradation values of adjacent pixels including the objective pixel when the objective pixel data contained in the multivalued image data supplied by the input means is positioned in contact with a pixel having a different gradation value; and recording means for recording the image information converted by the conversion means.

According to a preferred embodiment of the present invention, it is preferable that high resolution binary image data be included as a subject to be supplied by the input means. Furthermore, it is preferable that the conversion means be urged when no binary pixel exists in the vicinity of the low resolution objective pixel.

A still further object of the present invention is to provide an image recording apparatus capable of recording an excellent quality image in a boundary of a binary image and a multivalued image even if the binary image and the multivalued image are recorded in an overlapped manner.

In order to achieve the above-described object, according to the present invention, there is provided an image recording apparatus which receives multivalued image data having a first resolution and binary image data having a second resolution the level of which is higher than the first resolution and which records each of the images in the form of a visible image on the same recording medium in accordance with each of the resolutions of each of the images, the image recording apparatus comprising: determination means for making a determination whether or not a region of a predetermined size is a mixed pixel of a multivalued pixel and a binary pixel; first detection means for detecting the deflective direction of the multivalued pixel in the region if the determination means has determined that the region is a mixed pixel; second detection means for detecting the state of a pixel in a region adjacent to the region; and selection means for selecting the pixel data in the adjacent region positioned in the deflective direction as the multivalued pixel in the subject region if the second detection means has detected that the adjacent region positioned in the deflective direction and detected by the first detection means is in a non-mixed state.

Furthermore, according to the present invention, there is provided an image recording apparatus which receives multivalued image data having a first resolution and binary image data having a second resolution the level of which is higher than the first resolution and which records each of the images in the form of a visible image on the same recording medium in accordance with each of the resolutions of each of the images, the image recording apparatus comprising: first detection means for detecting the deviation of a multivalued region and a binary region in a subject pixel the size of which corresponds to the first resolution; second detection means for detecting the state of a pixel adjacent to the subject pixel; and selection means arranged in such a manner that, when the first detection means has detected that the subject pixel is a mixture of a binary and a multivalued regions and that the position of the multivalued region is deflected and the second detection means has detected that an adjacent pixel positioned in the deflective direction of the multivalued region is in a non-mixed state, the selection means selects the adjacent pixel data positioned in the deflective direction as pixel data in the multivalued region in the subject pixel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A-1 and 4A-2 illustrate block diagram of the data conversion circuit according to a first embodiment of the present invention;

FIG. 7 illustrates the structure of the interpolating circuit in the sub-scanning direction according to the first embodiment of the present invention;

FIG. 13 illustrates the memory group and the smoothing portion shown in FIG. 12;

FIGS. 14A to 14C respectively illustrate the outline of a smoothing process according to the second embodiment of the present invention;

FIG. 15 illustrates the smoothing circuit shown in FIG. 13;

FIGS. 19(a) to 19(h) and 20(a) to 20(h) illustrate the density patterns according to a third embodiment of the present invention:

FIG. 24 illustrates the positional relationship between data registered by the shift register shown in FIG. 21 and the actually recorded pixel;

FIG. 25 illustrates the structure of the mixture determination circuit shown in FIG. 23;

FIG. 26 illustrates the relationship between the mixed patterns supplied to a mixture direction determination circuit according to a fourth embodiment of the present invention and the signals denoting the results of the determination;

FIG. 27 illustrates the relationship between the input and the output of the signal selection circuit shown in FIG. 23;

FIG. 29 illustrates an example of an output pattern of an image improved according to the fourth embodiment of the present invention;

FIGS. 31A and 31B illustrate the operation timing of the line memory shown in FIG. 30;

FIG. 34 illustrates the operation timing for the line memory shown in FIG. 33;

FIGS. 36A and 36B are block diagram according to a seventh embodiment of the present invention;

DETAILED DESCRIPTION OF THE PREFERRED EMBODIMENTS

Preferred embodiments of the present invention will be described with reference to the drawings.

<First Embodiment>

Figure 1:
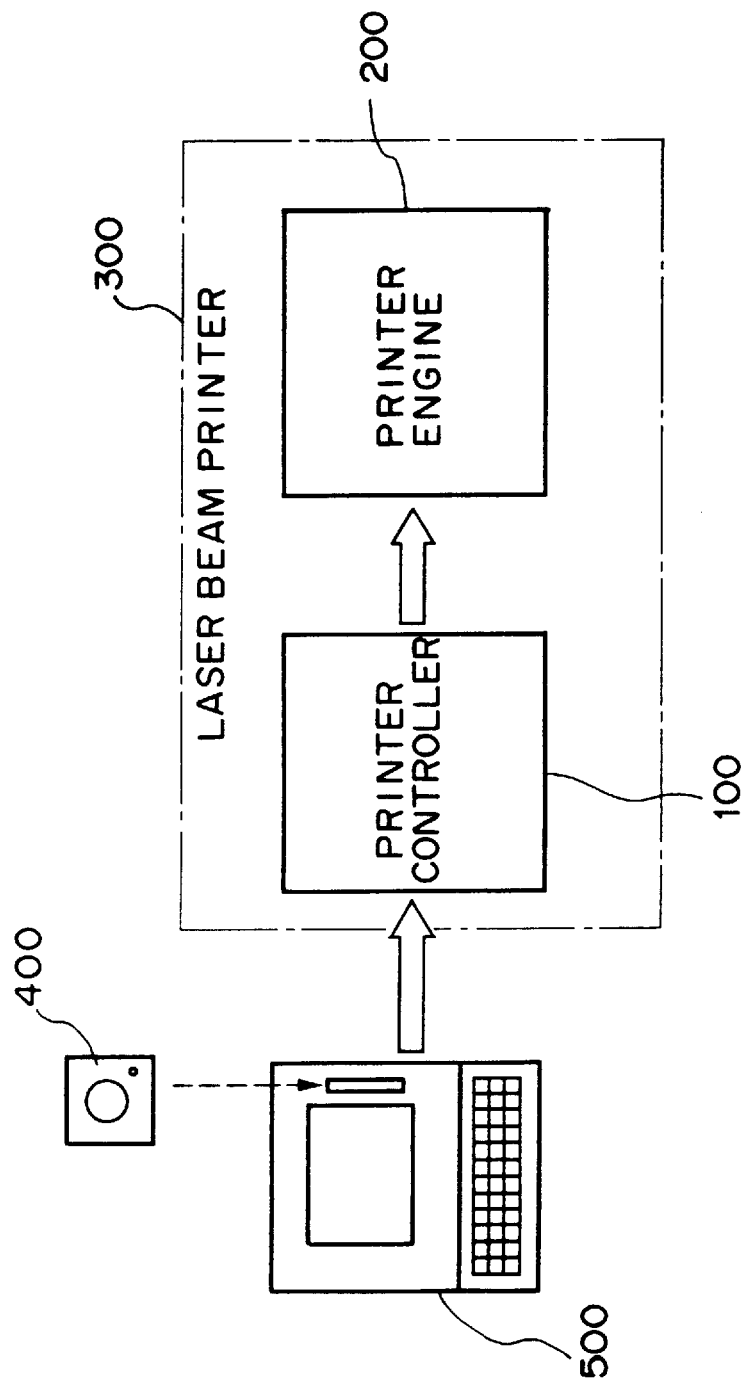
FIG. 1 illustrates the structure of a laser beam printer.
Figure 2A:
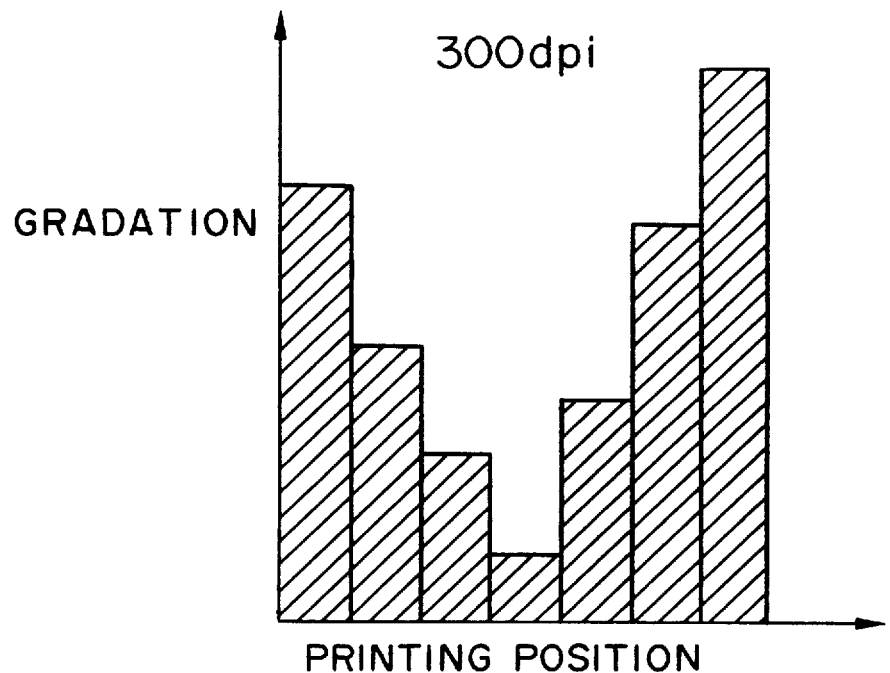
FIG. 2A illustrates the relationship between dot positions and dot gradations at a resolution of 300 dpi.
Figure 2B:
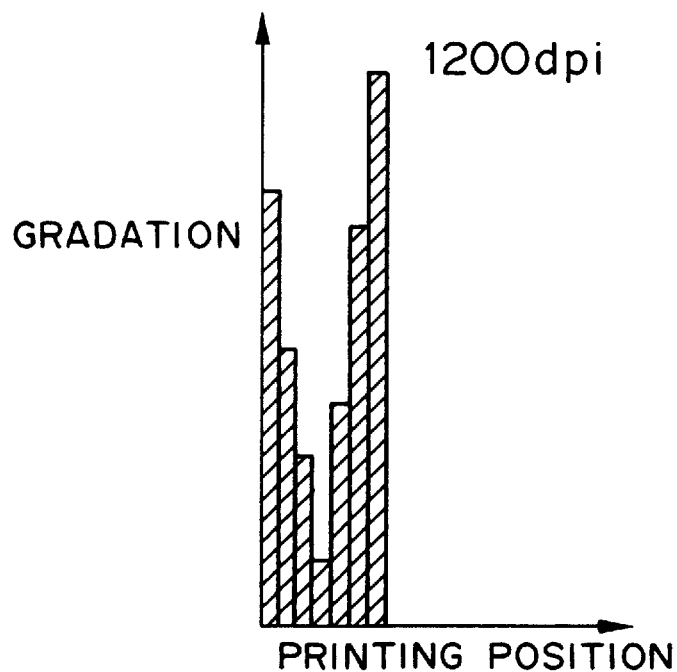
FIG. 2B illustrates the relationship between dot positions and dot gradations at a resolution of 1200 dpi.
Figures 1, 4A:
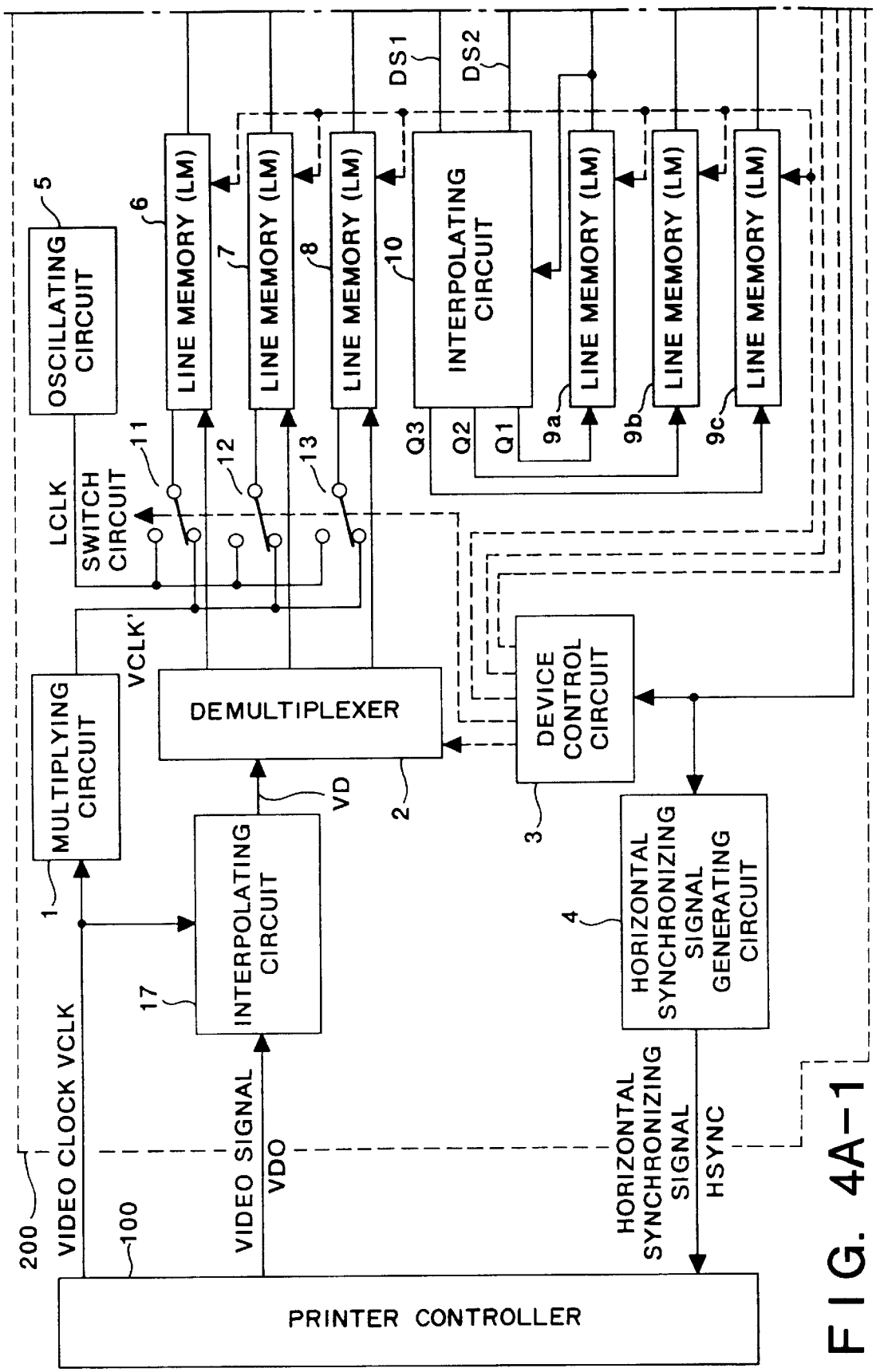

FIGS. 4A-1 and 4A-2 illustrate data conversion circuit positioned between the printer controller 100 and the printer engine portion 200 shown in FIG. 1. Although the data conversion circuit is arranged to serve as a portion of the printer engine portion 200 referring to FIGS. 4A-1 and 4A-2, it may, of course, be arranged to serve as a portion of the printer controller 100. The printer controller 100 transmits a video signal for 300 dpi and 16 gradations. The data conversion circuit according to this embodiment and included in the printer engine portion 200 receives the above-described data so as to convert it into data for 1200 dpi and 16 gradations. The above-described printer engine portion 200 comprises a laser driver for modulating the laser beam in response to a video signal (dot information), a scanner for performing scanning by laser beams and photosensitive drum.

The printer controller 100 transmits video signal VDO for 300 dpi and 16 gradations (four bits for a pixel) by a quantity for one line in synchronization with image clock VCLK to the printer engine portion 200 whenever it receives horizontal synchronizing signal HSYNC supplied from a horizontal synchronizing signal generating circuit 4. The horizontal synchronization signal generating circuit 4 includes a counter so as to transmit the horizontal synchronizing signal HSYNC when the counter counts 4 times known beam detect signal BD which serves as a synchronizing signal in the main scanning direction.

The printer engine portion 200 according to this embodiment forms, in the data conversion circuit to be described later, video signal VDO' for 1200 dpi and 16 gradations by converting the video signal VDO for 300 dpi and 16 gradations supplied in synchronization with the image clock VCLK, the printer engine portion 200 then performing printing of 1200 dpi and 16 gradations in accordance with the signal VDO'.

Then, the operation of the data conversion circuit will be specifically described with reference to FIGS. 4AA and 4AB. Reference numeral 1 represents a frequency multiplying circuit for multiplying the frequency of the image clock VCLK so that clock VCLK' the frequency of which is four times that of the image clock VCLK is obtained. Reference numeral 5 represents an oscillating circuit for generating clock LCLK having the frequency which is 16 times the frequency of the image clock VCLK. Reference numerals 11, 12 and 13 represent switch circuits which respectively select the clock VCLK' or LCLK so as to supply it as the writing or reading clock for each of line memories (LM) 6 to 8. Although the detailed description about the inner structure of an interpolating circuit 17 will be made later, the interpolating circuit 17 generates pixel data (video signal VD) having the pixels the number of which is four times in the main scanning direction by inserting interpolating data between supplied pixel data (video signal VDO) items for 300 dpi for one line. That is, the interpolating circuit 17 is a circuit for converting pixel data for 300 dpi in the main scanning direction into data for 1200 dpi. A demultiplexer 2 selects any of the line memories 6 to 8 in response to a signal supplied from a device control circuit 3 so as to supply the signal interpolated by the interpolating circuit 17 to the selected line memory. The horizontal synchronizing signal generating circuit 4 counts the signal BD so that it transmits the horizontal synchronizing signal HSYNC whenever it receives four BD signals.

The device control circuit 3 supplies a selection, a writing and a reading signal for one line to the demultiplexer 2, each of the switching circuits 11 to 13 and each of data selectors 14 to 16, to be described later, so as to control the above-described elements. In response to a control signal supplied from the device control circuit 3, the video signal VD is written in any of the line memories 6 to 8 in accordance with the clock VCLK'. Furthermore, the video signal is read from each of the other line memories in accordance with the clock LCLK. The above-described operations are successively performed in such a manner that, for example, when the video signal is written to the line memory 6, the video signal is read from each of the line memories 7 and 8. At the next timing, the video signal VD is written to the line memory 7, while data stored in the line memories 6 and 8 is read from the same. At the next timing, the line memory 8 is brought into the writing mode, while the line memories 6 and 7 are brought to the reading mode. Then, the above-described line memories are successively switched between the writing mode and the reading modes.

Each of the line memories 6 to 8 has the memory capacity of four times the 300 dpi data in the main scanning direction, that is, the data memory capacity of 1200 dpi in the main scanning direction. The description will be made hereinafter in such a manner that the video signals read from the respective line memories are called D1, D2 and D3.

The data selectors 14 and 15 select two video signals selected from a group consisting of the video signals D1, D2 and D3 supplied from the line memories, which have been brought to the reading mode in response to the control signal supplied from the device control circuit 3 so as to transmit the two selected video signals to the interpolating circuit 10. For example, when the line memory 6 is in the writing mode, the line memories 7 and 8 are in the reading mode. Therefore, the data selector 14 selects the data D2 read from the line memory 7 so as to transmit it as signal DS1 to the interpolating circuit 10. The data selector 15 selects the data D3 read from the line memory 8 so as to transmit it as the signal DS2 to the interpolating circuit 10. The interpolating circuit 10 processes the supplied signals DS1 and DS2 in the manner to be described later so as to generate interpolated image data and transmit it as output signals Q1, Q2 and Q3.

The capacity of each of line memories 9a to 9c, which store the respective output signals Q1, Q2 and Q3, is the same as that of each of the line memories 6 to 8. The clock LCLK is used when data is written/read from each of the line memories 9a to 9c. The above-described data writing/reading from the line memories 6 to 8 and 9a to 9c and the operation for selecting either the data selector 14 or 15 is controlled by the device control circuit 3.

The data selector 16 selects any of the signals D1 to D3 read from the respective line memories 6 to 8 and any of the signals D4 to D6 read from the respective line memories 9a to 9c so as to transmit the selected signal as video signal VDO'. Also the above-described selection operation is controlled by the device control circuit 3.

Then, an example of the structure of the above-described interpolating circuit 17 will be described with reference to FIG. 5.

As described above, since the video signal VDO supplied from an external device is 16 gradations data, the pixel data items are 4-bits data VD00 to VD03. Then, description will be made with reference to the signal VD03. The signal VD03 is alternately latched by latches 23 and 24 in accordance with clock VCLK/2 formed by halving the clock VCLk by a divider 18. Similarly, the other signals VD02 to VD00 are respectively and alternately latched by latches 20, 21 and 22. That is, data for neighboring two pixels supplied as 300 dpi data is stored by the latches 19 to 22. The data for two pixels thus latched is then added in an adder 25 so that a resulted carry bit (Cy) and the upper three bits are taken. As a result, the average of the supplied data can be obtained, the average value thus calculated being arranged to be the pixel positioned at the intermediate position between the supplied two pixels. Furthermore, each of the pixel data items latched by the respective latches 19 to 22 are subject, in adders 26 and 27, to an operation in which the average value with the output value supplied from the adder 25 is calculated. Thus, the adders 25, 26 and 27 generate three interpolated pixel data items between the neighboring two pixels in the main scanning direction supplied as the VDO signal.

Figure 8:
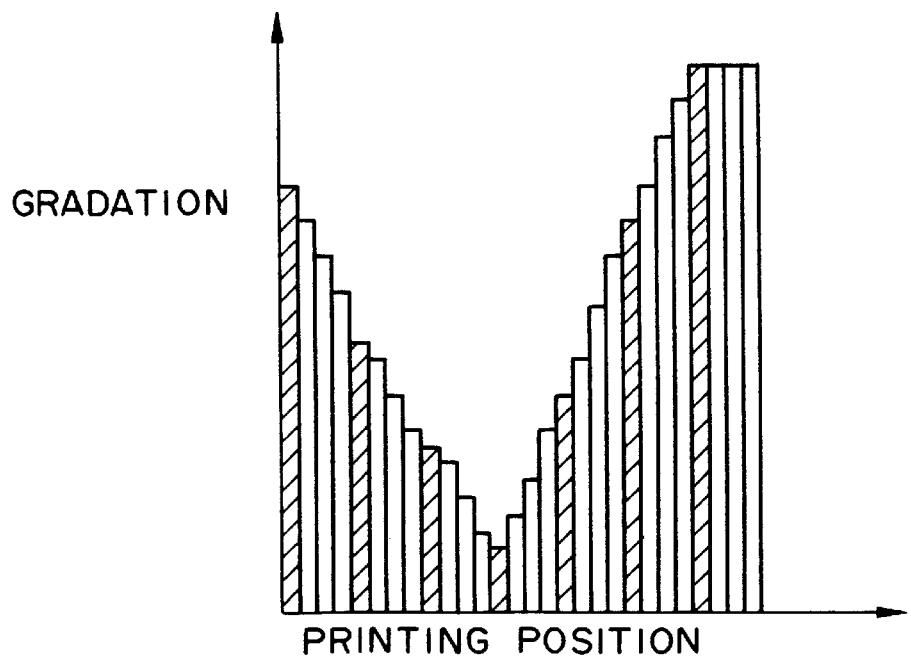
FIG. 8 illustrates the printing positions and the gradations according to the first embodiment of the present invention.

Furthermore, since the obtained gradation data has the density change the degree of which is in proportional to the distance between the neighboring two pixels, the 300 dpi and 16 gradation data shown in FIG. 2A can be, as shown in FIG. 8, interpolated by smooth gradation data. Referring to FIG. 8, the hatched section corresponds to the 300 dpi data supplied as the VDO signal, while the other portion corresponds to the pixel data obtained by the above-described interpolating processing. Then, the data items are selected by a selection circuit 28 at every clock VCLK' (having the frequency which is 4 times the frequency of the clock VCLK).

Figure 4B:
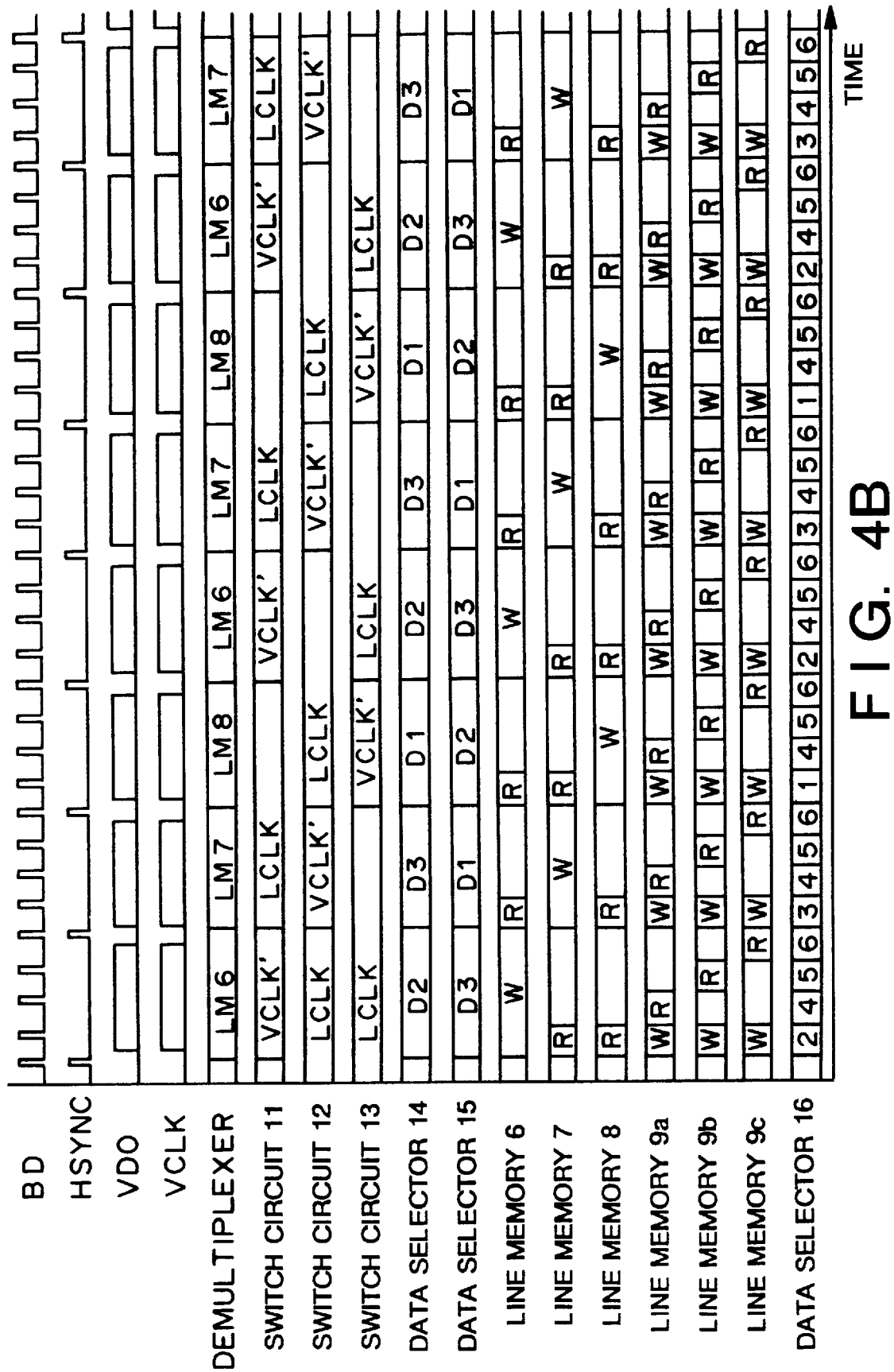
FIG. 4B is a timing chart for the data conversion circuit according to the first embodiment of the present invention.
Figure 6:
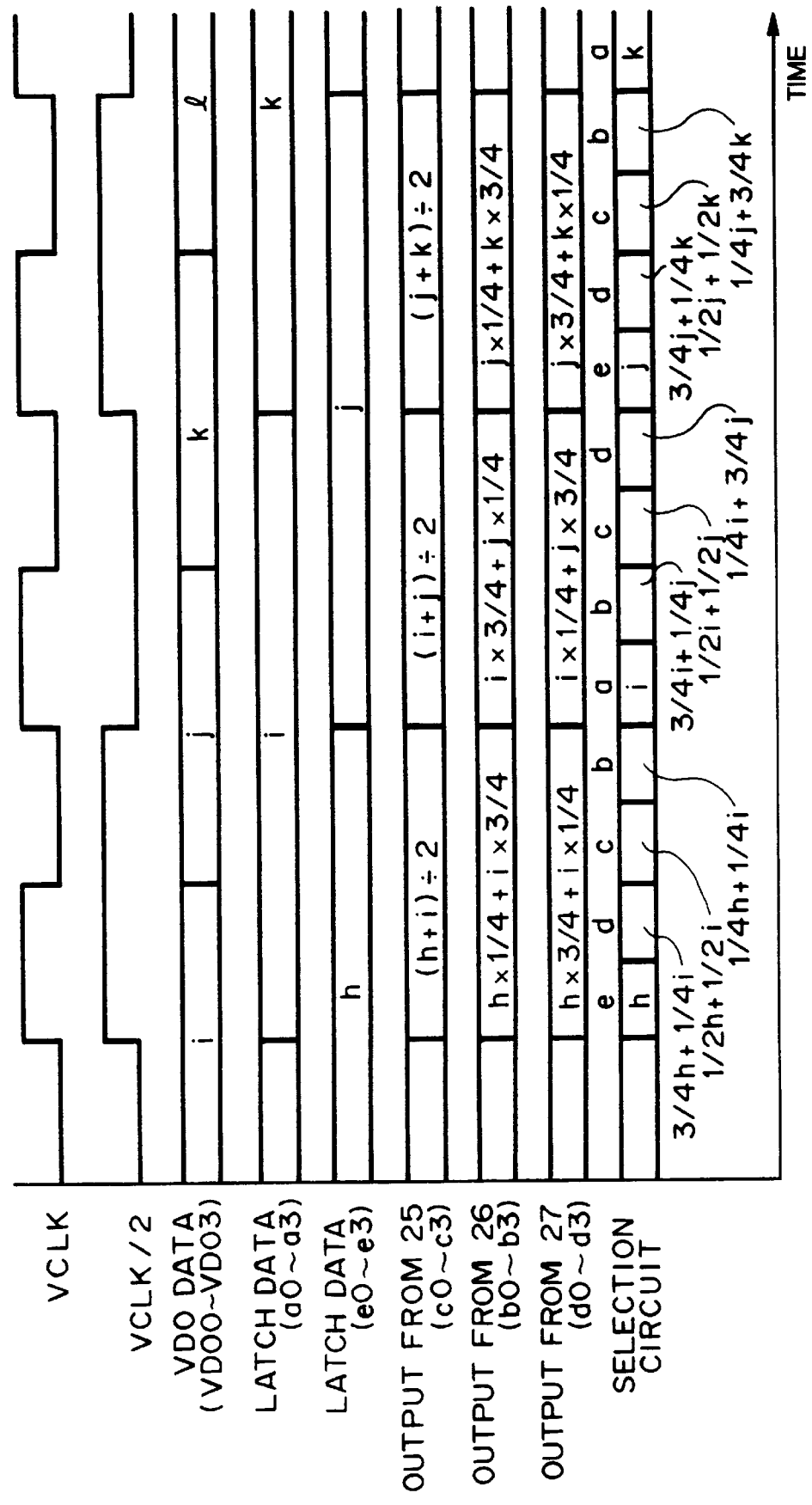
FIG. 6 is a timing chart for the interpolating circuit in the main scanning direction according to the first embodiment of the present invention.

The timing charts for the above-described operations are shown in FIGS. 4B and 6.

Then, an interpolating circuit 10 for performing the vertical interpolation will be described with reference to FIG. 7.

The above-described interpolating circuit 17 performs the interpolation of the horizontal scanning, while the interpolating circuit 10 generates interpolated data in the vertical direction (in the sub-scanning direction) in accordance with data interpolated by the interpolating circuit 17.

As shown in FIG. 7, data for one horizontal scanning line is, as the signal DS1, supplied to an adder 29 included in the interpolating circuit 17. The adder 29 adds the pixel data items, which are included in the supplied signals DS1 and DS2 and the lateral positions of which are the same, so as to transmit the result of the addition as five-bits data. Then, the upper four bits of the transmitted five bits are arranged to be data so that the average value of the two pixels on the neighboring lines can be obtained. The thus calculated average value is used as the pixel data for the line positioned between the two lines supplied from the printer controller 100. Then, the averaged data DS1 and DS2 are further averaged by adders 30 and 31 so that three vertical interpolated data items are generated. The thus generated data items are stored in the respective line memories 9a to 9c before supplied to the data selector 16 as image data D4, D5 and D6. The data selector 16 selects one of the supplied image data D1 to D6 in accordance with the timing shown in FIG. 4B so as to transmit it as the image data VDO' to a pulse width modulation circuit to be described later.

Figure 9:
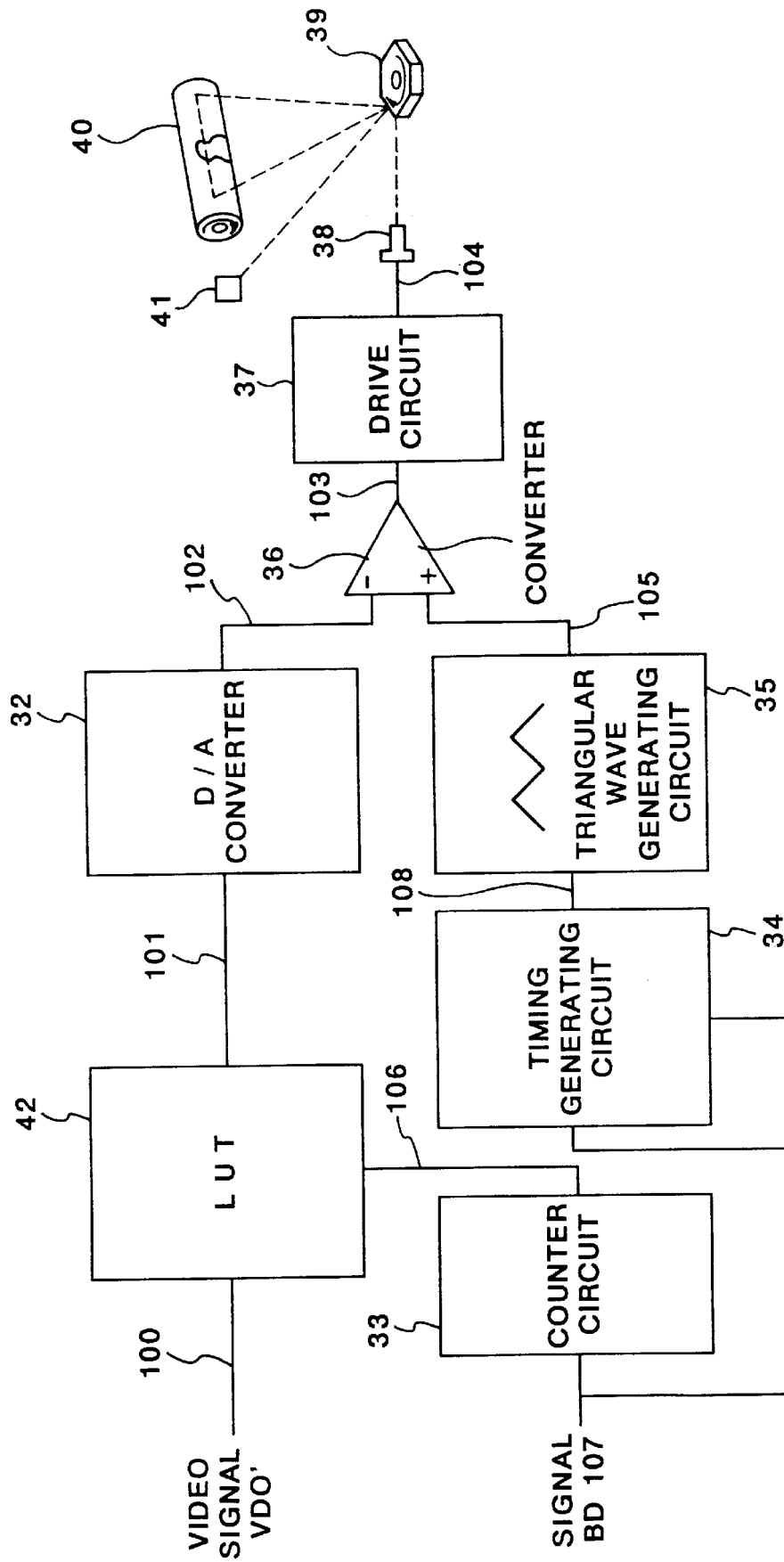
FIG. 9 illustrates a pulse width modulation and an image forming.

FIG. 9 illustrates the structure of a circuit for modulating the pulse width and forming an image. The timing of each of the signals is shown in FIGS. 10A and 10B.

The four-bits video signal VDO' horizontally and vertically interpolated and supplied from the data selector 16 is supplied to a look-up table (to be abbreviated to "LUT" hereinafter) 42 via a data line 100 in synchronization with a synchronizing clock 109. The LUT 42 corrects the supplied data to the data having proper density correction characteristics, the thus corrected image data being then transmitted to a D/A converter 32. The LUT 42 comprises a ROM having a 4-bits address input and a 4-bits data output. The D/A converter 32 converts 4-bits digital data supplied from the LUT 42 so as to transmit the analog signal to the minus input terminal of a comparator 36.

On the other hand, a timing generating circuit 34 generates a timing signal 108 which is in synchronization with the synchronizing clock 109 formed in accordance with, for example, the signal BD so as to transmit it to a triangular wave generating circuit 35. The triangular circuit 35 generates a triangular signal 105 in synchronization with the thus supplied timing signal 108, the triangular signal 105 being supplied to the positive (plus) input terminal of the comparator 105.

Figure 10A:
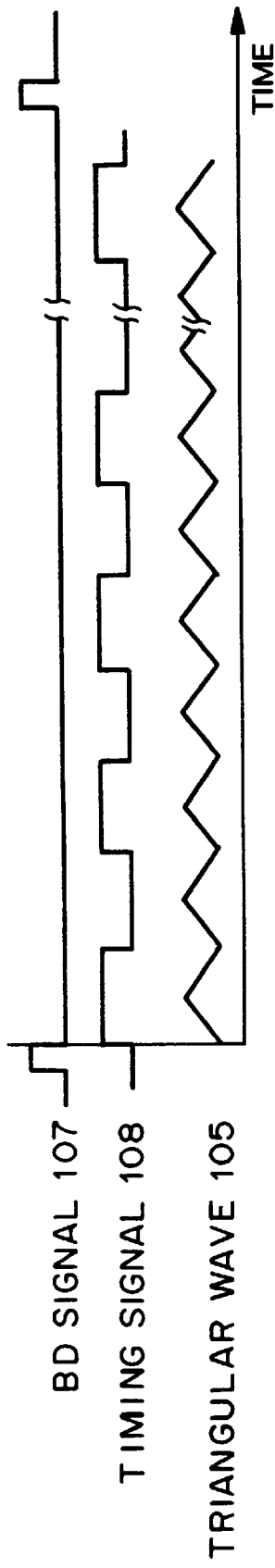
FIGS. 10A and 10B respectively illustrate timing of each of signals shown in FIG. 9.
Figure 10B:
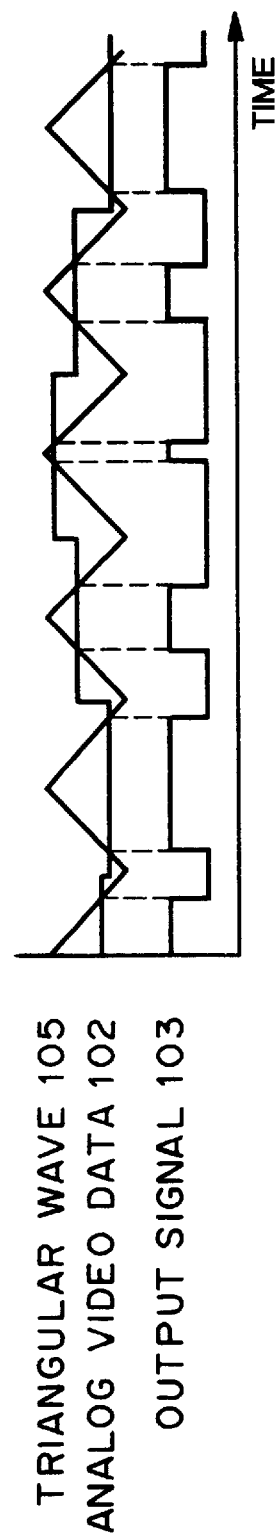

The timing at which the triangular signal 105 is generated from the triangular wave generating circuit 35 is shown in FIG. 10A.

The comparator then makes a comparison between analog image data supplied to its input terminal and the triangular wave 105 so as to transmit an output signal 103 having the pulse width corresponding to the level of the input image data shown in FIG. 10B. A driver circuit 37 operates a semiconductor laser 38 in response to an output signal 103 so that the duration in which the semiconductor 38 is operated is controlled in accordance with the density. Reference numeral 39 represents a polygonal mirror for applying a scanning laser beam and 40 represents a photosensitive drum. Reference numeral 41 represents a detector (BD) for detecting the position which is scanned by the laser beam. The detection output signal supplied from the detector 41 is shaped by a waveform shaping circuit (omitted from illustration) so that it is made to be the above-described BD signal 107. The laser beam transmitted from the semiconductor laser 38 is reflected by the side surface of the polygonal mirror 39 which is being rotated at a predetermined speed so as to be laterally swept. The laser beam reflected by the polygonal mirror 39 is, by a lens or the like (omitted from illustration), imaged on the photosensitive surface of the photosensitive drum 40. Since the photosensitive drum 40 is rotated as illustrated, a two dimensional 1200 dpi static latent image is formed on the surface of the photosensitive drum 40. Then, an image is formed by a known electrophotography process so as to be transferred to the surface of recording paper.

According to this embodiment, the three pixels are interpolated by unconditionally calculating the average value between the two pixel data items supplied from the printer controller 100. However, in the case where the difference between the values of the supplied two pixels is a certain large value, the two pixels are positioned at the edge of a character or a line. There has been a desire in that the edge portions of the characters and the lines are clearly expressed. Therefore, in such a case, it is preferable that supplied two pixels A and B be used as it is as the data for interpolating the portion between the two supplied pixels A and B as an alternative to data the average of which has been calculated.

Then, the structure of an example arranged to meet the above-described desire will be described.

Figure 5:
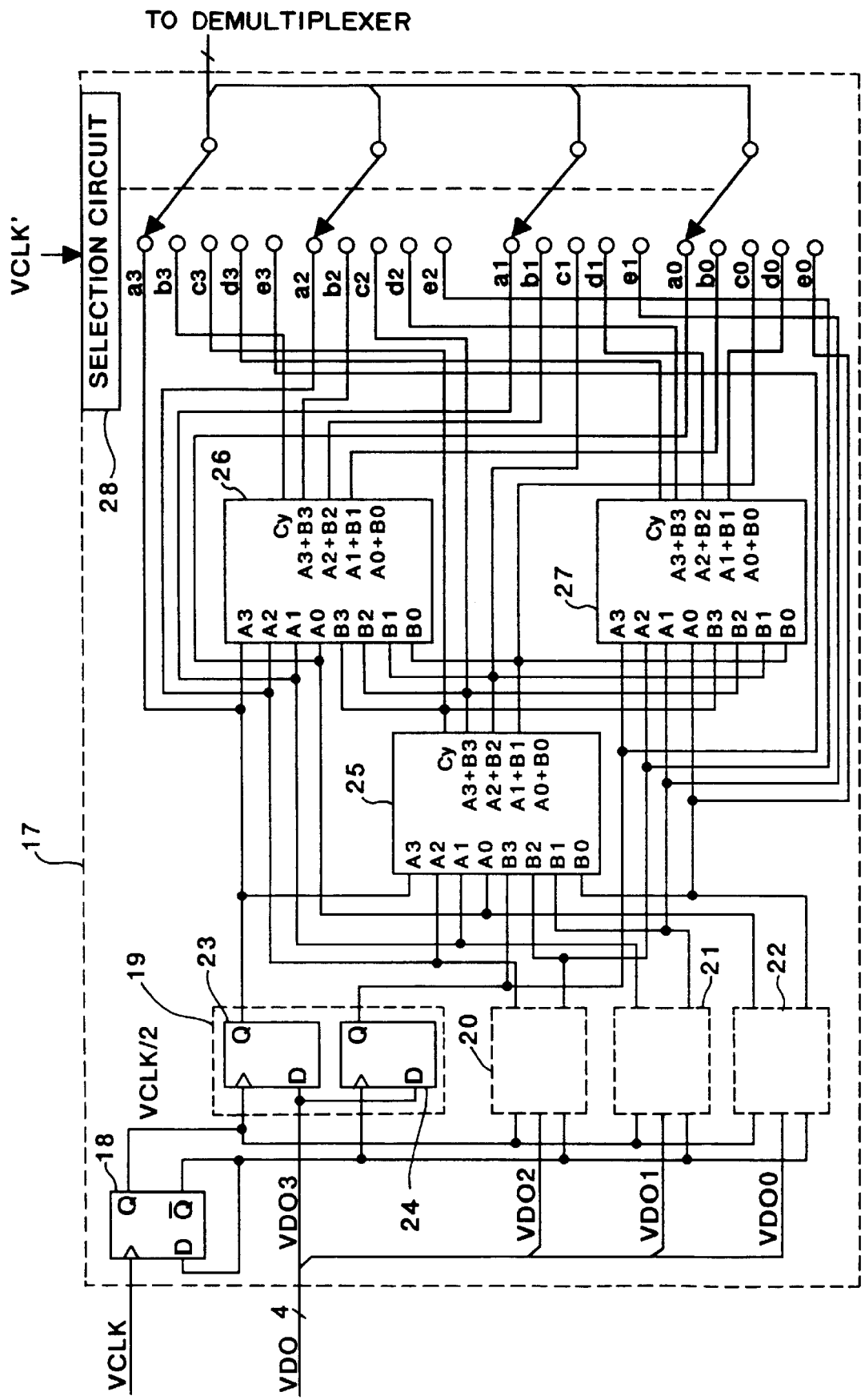
FIG. 5 illustrates the structure of an interpolating circuit in the main scanning direction according to the first embodiment of the present invention.
Figure 11B:
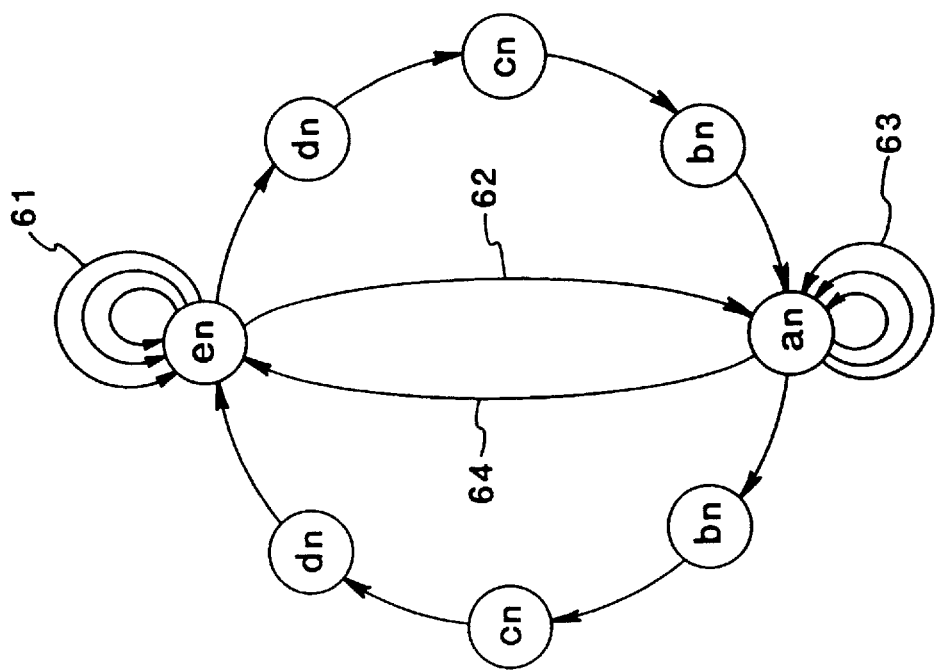
FIGS. 11A and 11B illustrate the status transition realized in a sub-scanning directional interpolation according to another embodiment of the present invention.
Figure 11A:
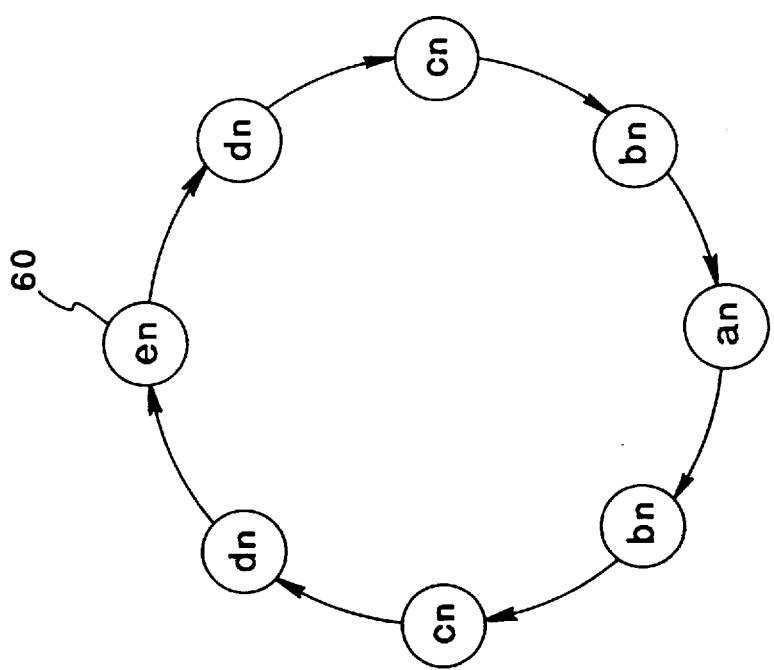

FIG. 11A illustrates the status transition of the selection circuit 28 shown in FIG. 5. Referring to the drawing, reference numeral 60 represents the state of the selection performed by the selection circuit 28, where symbol $e_n$ represents a set of data bits $e_0, e_1, e_2$ and $e_3$ similarly to other symbols $d_n$ and $c_n$.

As shown in the drawing, the selection circuit 28 according to this embodiment selects $d_n, c_n, b_n, a_n, b_n, c_n, d_n$ and $e_n$ in this sequential order.

Assuming that the two pixels latched by the latches 19 to 22 are $e_n$ and $a_n$, the absolute value of the difference between the two pixels is subjected to a comparison with predetermined value T. If $|e_n-a_n|<T$, the processing of the interpolating data similar to the above-described embodiment is performed in accordance with the status transition shown in FIG. 11A.

If it has been determined that $|e_n-a_n|\geq T$, the determination may be made that the subject two pixels are positioned in the vicinity of the edge portion of the character or the line. Therefore, either of the pixels is selected and transmitted as the three interpolated data items generated between the pixels $e_n$ and $a_n$. Since the equivalent circuit to the above-described inequality can be easily constituted by using a subtractor, a circuit for removing the sign from the result of the subtraction and a comparator, the detailed description is omitted here.

The specific status transition of the selecting circuit 28 is shown in FIG. 11B.

It is assumed that the selection circuit 28 has selected status $e_n$. If the absolute value of the difference between the supplied pixel data $e_n$ and $a_n$ is larger than the predetermined value T, the selection circuit 28 selects $e_n$ three times so as to transmit them as the interpolated data. Then, the pixel $a_n$ is made to be the subject of the selection by a passage 62. If it is then determined that the absolute value between $e_n$ and $a_n$ is larger than the predetermined value T, $a_n$ is selected three times by a passage 63 so as to transit the selection subject to the pixel $e_n$.

In all of the above-described cases, the selection subject is, similarly to FIG. 11A, transmitted as $d_n$, $c_n$, $b_n$ and $a_n$ or $b_n$, $c_n$, $d_n$ and $e_n$ in this sequential order if the result of the comparison is smaller than the predetermined value. As a result, an image having an excessive contrast, for example, the outline of a character can be expressed clearly.

According to the above-described first embodiment, an example is described in which the printer controller 100 having the printing density of 300 dpi and the printer engine portion 200 having the printing density of 1200 dpi are combined to each other. The present invention is not limited to a structure of the type described above. A similar effect can be obtained from a structure arranged in such a manner that, for example, a printer controller of the printing density of 150 dpi and the printer engine of the printing density of 600 dpi are combined to each other.

According to this embodiment, although the three-dot data is interpolated, the number of the dots to be interpolated is not limited according to this embodiment. The present invention can be effectively applied to a case in which a plurality of dots are interpolated or to a case in which a gradation data for example 256 gradations is processed.

Furthermore, the half tone image may be expressed by the dither method as an alternative to the above-described pulse width modulation method.

As described above and according to the present invention, image data for a high density printer can be reproduced only with a reduced-capacity page memory, causing an economical effect to be obtained. Furthermore, the necessity of changing the conventional application for low-density printing operation acting on the host computer can be eliminated when high density printing is desired.

In addition, when the portion in the vicinity of the edge of the character or the line is expressed, interpolated data obtained by the calculation of the average value is not used. As an alternative to this, the supplied pixel data is used as the interpolated data as it is so that the edge portion of the character and the line can be clearly expressed.

According to this embodiment, a case is described in which sole and low resolution image data is inputted so as to be printed with a high resolution. However, another structure may be employed in which, when the host computer has transmitted the resolution of the image to be transmitted as the command data, the interpolation rate (the number of pixels to be inserted between the supplied pixels) is calculated from the relationship between the thus instructed resolution and the resolution of the apparatus whereby the interpolation is performed in accordance with the result of the calculation. As a result, even if an image of the resolution the level of which is lower than the resolution of the apparatus is supplied, the image of the size desired by an operator can be obtained.

<Second Embodiment>

A second embodiment will be described in which a smoothing portion to be described later is provided for the printer engine portion 200 of the laser beam printer 300 shown in FIG. 1.

Figure 12:
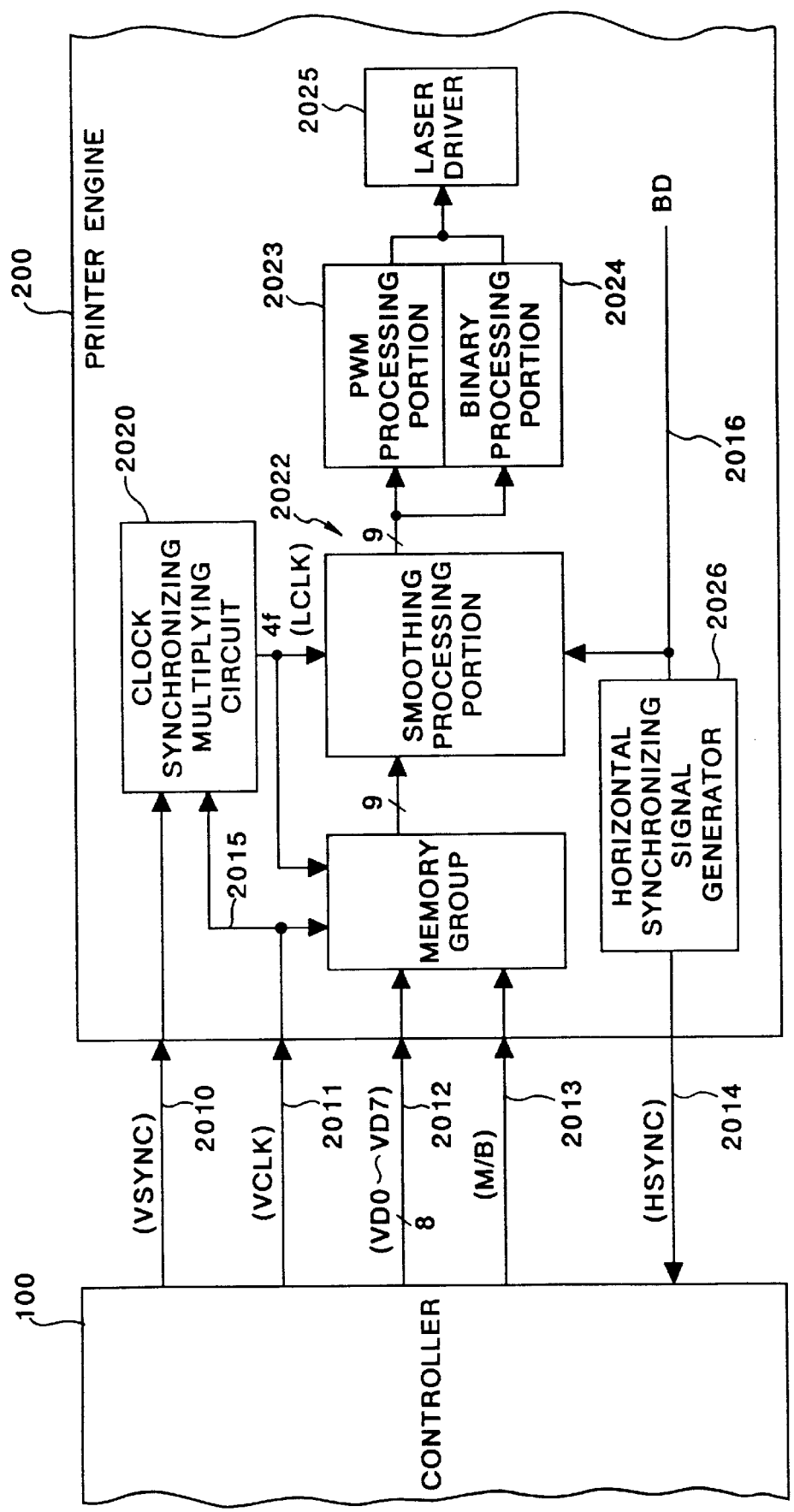
FIG. 12 is a schematic block diagram which illustrates the structure of an engine portion according to a second embodiment.

FIG. 12 is a schematic block diagram which illustrates a variety of signals transmitted/received between the controller 100 of the laser beam printer 300 and the printer engine portion 200 shown in FIG. 1 and a partial structure of the engine portion 200. According to this embodiment, 8-bits data (255 gradations) of a resolution of 600 dpi is transmitted from the printer controller 100. However, multivalued pixel data is transmitted as substantially 150 dpi data since the same value data for 4×4 pixel region is transmitted.

As shown in FIG. 12, the printer engine portion 200 receives, from the printer controller, a vertical synchronizing signal (VSYNC) 2010, an image clock (VCLK) 2011, binary or multivalued data (8 bits data $VD_0$ to $VD_7$ of [00H] to [FFH] according to this embodiment) 2012, a multivalue/binary identification (M/B) signal 2013. A clock synchronizing and multiplying circuit 2020 creates a clock (LCLK) 2015 the frequency is four times from the vertical synchronizing signal 2010 and the image clock 2011 so as to transmit it to a memory group 2021 and a smoothing portion 2022. As a result of the operation performed by the memory group 2021 and the smoothing portion 2022, the supplied image data 2012 is smoothed so as to be transmitted to a PWM processing portion 2023 and a binary processing portion 2024.

After the above-described transmission of the image data thus smoothed to the PWM processing portion 2023 and the binary processing portion 2024, the PWM processing portion 2023 creates a pulse width modulation signal in accordance with the supplied image data, while the binary processing portion 2024 binarizes the supplied image data. A signal obtained in the PWM processing portion 2023 or the binary processing portion 2024 is supplied to a laser driver 2025. In response to the supplied signal, the laser driver 2025 controls the operation of the semiconductor laser device which generates the laser beam.

A horizontal synchronizing signal generator 2026 transmits the horizontal synchronizing signal (HSYNC) 2014 to the printer controller 100 when it receives a beam detect signal (BD) 2016 four times so as to notify it the timing of the printing start.

The determination of the image data 2012 is made in such a manner that it is determined to be binary data when the binary/multivalue identification signal 2013 is "1", while it is determined to be multivalued data when the same is "0". In this case, it is assumed that the binary data is transmitted to the uppermost bit of the eight bits of the image data 2012.

In the case where the image data 2012 is a binary signal, the supplied data of the resolution of 600 dpi is used as it is. In the case where the same is a multivalued signal, the supplied data of the resolution of 600 dpi is converted into 150 dpi data.

FIG. 13 is a block diagram which illustrates the structure of the above-described memory group 21 and the smoothing portion 22.

As shown in the drawing, 9-bits data consisting of the image data 2012 and the binary/multivalue identifying signal 2013 supplied from the controller 100 is written to one of memories 2030-1 to 2030-7 selected by a selector 2031 in accordance with an image clock 2011. The selector 2031 is switched in response to a horizontal synchronizing signal 2014. Each of the memories 2030-1 to 2030-7 has a capacity capable of storing images of 9-bits×600 dpi for one line. During the writing of the supplied data after the selector 2031 has selected a memory from the memories 2030-1 to 2030-7, reading from the residual six memories is performed in accordance with the clock 2015 which is four times the image clock 2011.

For example, during the writing of data to the memory 2030-7, data in the other memories 2030-1 to 2030-6 can be read and a read address counter 2033 is cleared every BD 2016. That is, data is successively read from the same memory four times during the operation of one horizontal synchronizing signal 2014. Data items 2017 (=9×6 bits) simultaneously read from the six memories are supplied to the selector 2032 so as to be time-sequentially divided before transmitted to shift registers 2034-1 to 2034-6 each of which is arranged to have a lateral size of 6 pixels×9 bits in depth. As a result, each of the shift registers stores 9×6 (=54 bits) data. The data thus stored is subjected to a serial/parallel conversion so as to be supplied to a smoothing circuit 2035.

Figure 14A:
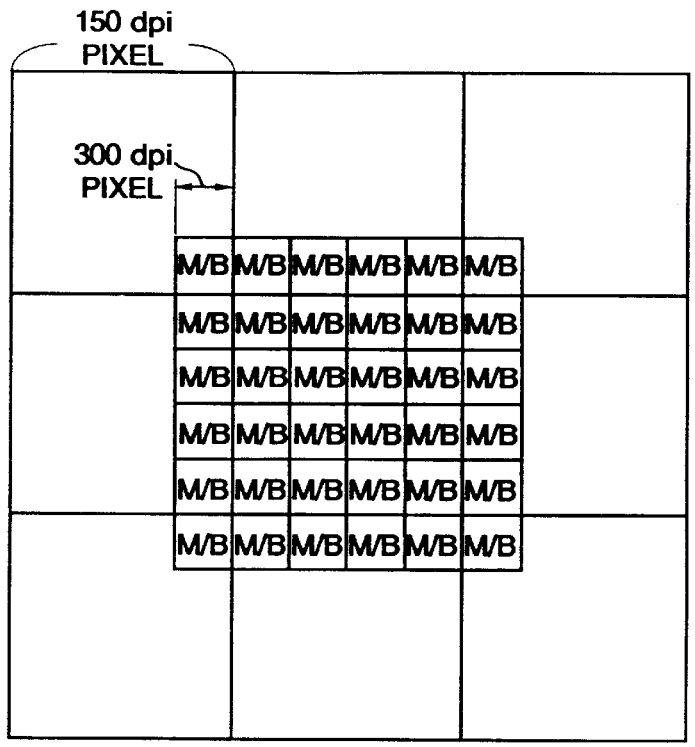
Figure 14B:
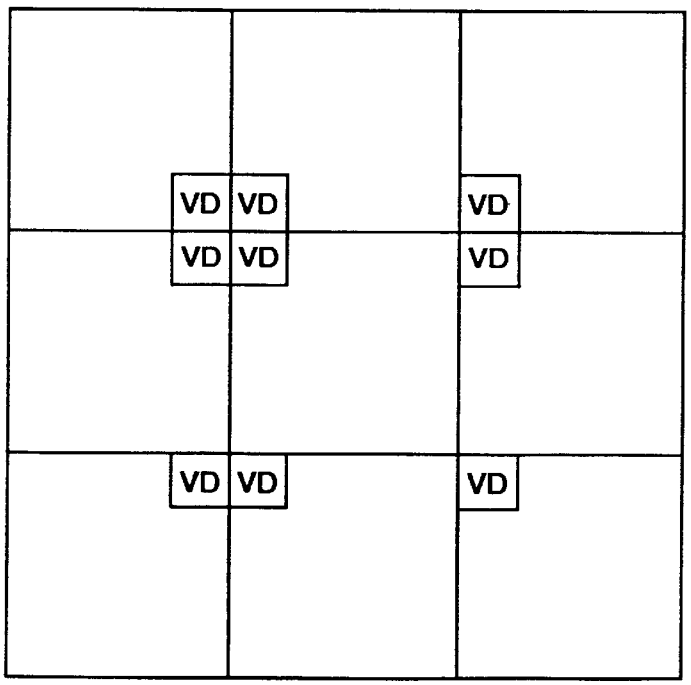

As a result, a reference can be made to the pixel for a certain region as shown in FIGS. 14A to 14C.

According to this embodiment, the region, to which a reference can be made, is a region including 3×3 pixels (9 pixels) of 150 dpi.

Then, the smoothing circuit 2035 will be described with reference to FIG. 15.

The pixel data to which a reference is made by the smoothing circuit 2035 is shown in FIGS. 14A to 14C.

Referring to FIG. 15, a pattern generator 2040 makes a reference to 6×6 pixel data (binary/multivalue identifying signal included) supplied from the shift registers 2034-1 to 2034-6 so that the central 4×4 pixel pattern, that is, one pixel of 150 dpi is determined. It is determined by using 36 identifying signals M/B shown in FIG. 14A whether or not the binary data is included in the 6×6 pixel region. The above-described determination is made by an OR circuit 2041 as shown in FIG. 15 so that a selector 2045 selects either input A or B in accordance with the thus made determination, the selected input being transmitted through Y.

For example, if binary data is included in the 6×6 pixel region, the output from the OR circuit 2041 become "1", causing the selector 2045 to select and transmit data of the input B. In this case, the conversion of the 4×4 central pixels is not performed, but the supplied video signal VD is transmitted as it is as shown in FIG. 14C.

If all of the pixels in the 6×6 pixel region are the multivalued data, the selector 2045 selects and transmits the data from the pattern generator 2040.

Figure 16:
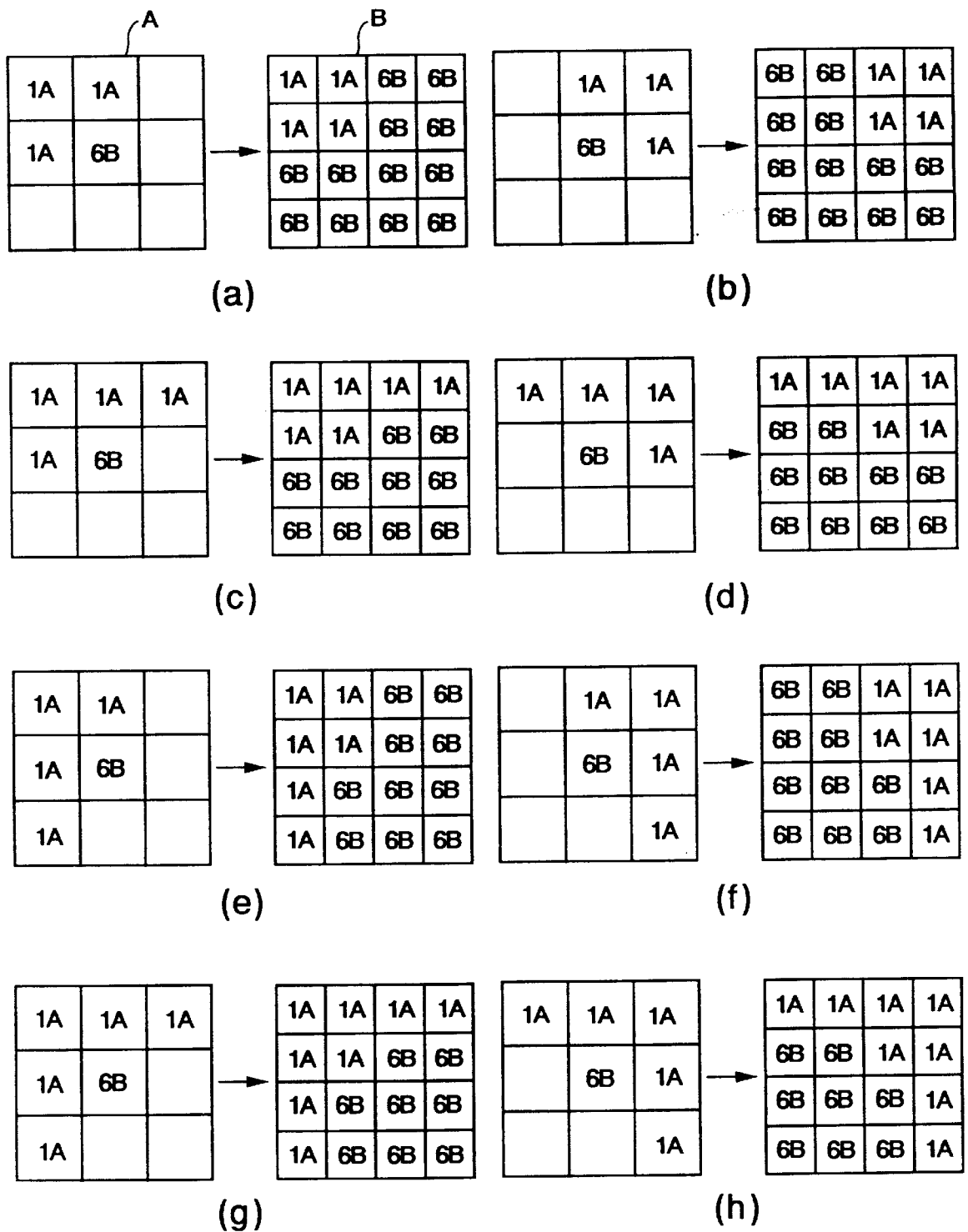
FIGS. 16(a) to 16(h) and 17(a) to 17(h) illustrate the density patterns according to the second embodiment of the present invention.

The pattern generator 2040 performs a conversion as shown in FIGS. 16(*a*) to 16(*h*) and 17(*a*) to 17(*h*). In this case, the number of the multivalued data, to which a reference is made, is nine as shown in FIG. 14B as an alternative to 36 since the multivalued data is arranged in a unit of 150 lines. The conversion is performed every four clocks (LCLK) 15.

Then, a pattern conversion performed by the pattern generator 2040 according to the second embodiment will be described time-sequentially.

As described above, the six memories of the seven memories have been brought to the reading mode. When data is read from the six memories 2030 in the reading mode by the selector 2032, data for the six pixels for each of the lines is stored in the shift registers 2034-1 to 2034-6 so as to be subjected to the serial-to-parallel conversion. As a result, 54-bits data (54 bits×6 in all) from each of the shift registers 2034-1 to 2034-6 is supplied to the smoothing circuit 2035. Then, it is determined whether or not there is binary data in the 6×6 pixel region by the structure shown in FIG. 15. If it is determined that there is the binary data, the selector 2045 selects data on a non-conversion path 2043, while data on an output path 2044 from the pattern generator 2040 is selected by the same.

The above-described conversion is selected every four clocks (LCLK) 2015. Since it is the first reading, the line address signal 2018 is set to "00".

Figure 17:
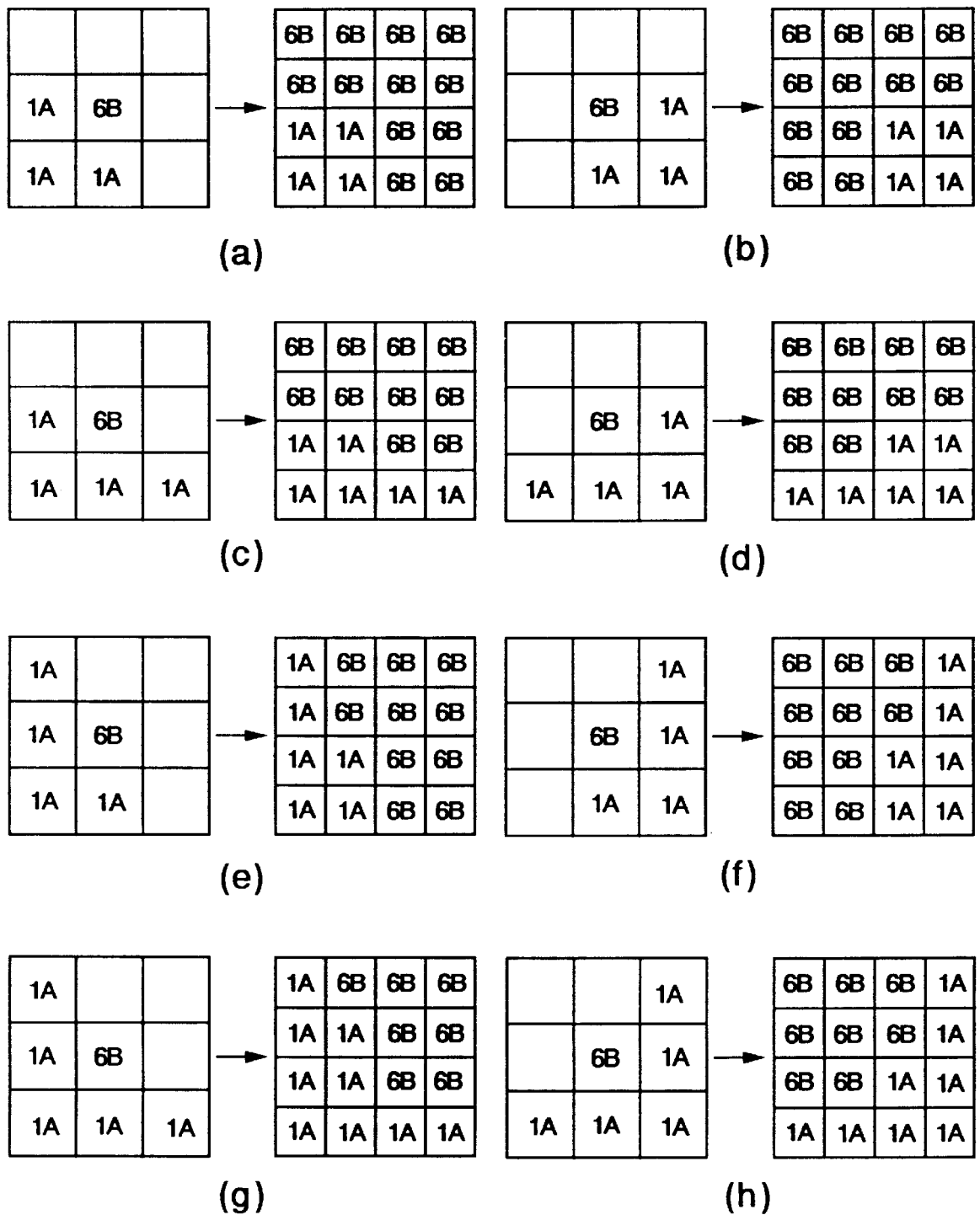
Figure 18:
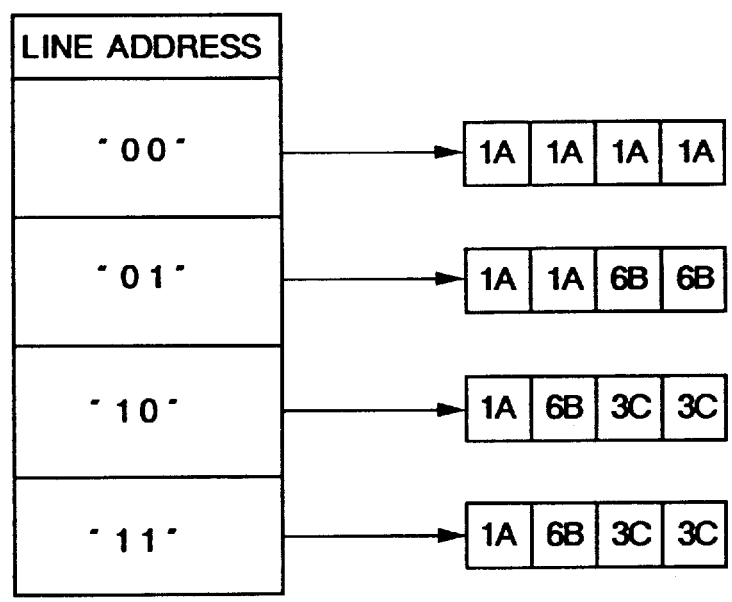
FIGS. 18(a) to 18(c) illustrate the principle of the smoothing process.

It is assumed that all of the 36 pixels latched in the shift registers 2034-1 to 2034-6 are multivalued data and the contents thereof are as shown in FIG. 18(*a*). That is, a pattern formed by synthesizing a pattern shown in FIG. 16(*g*) and a pattern shown in FIG. 17 (*b*) is considered. In this case, pixel [6B] for the central 150 lines (150 dpi) is converted into 16 pixels of 600 dpi as shown in FIG. 18 (*b*).

The output becomes 1A, 1A, 1A and 1A in this sequential order as shown in FIG. 18(*c*) since the line address signal 2018 is "00" at this time. Since the line address signal 2018 is "01" at the second reading, the output transits to the same pixel regions transits as 1A, 1A, 6B and 6B in this sequential order. Similarly, the data is transmitted in the sequential order of 1A, 6B, 3C and 3C at the third reading, while the data is transmitted in the sequential order of 1A, 6B, 3C and 3C at the fourth reading.

The above-described operations are repeated so that the smoothing operation is completed.

As described above, in a laser beam printer in which the binary and multivalued image data can be used but their resolutions do not coincide with each other, when 150-line pixels of different gray levels are positioned in contact with each other, a smoothing to 600 dpi is performed depending upon the state of the surrounding pixels so that the outline of the gray pixels can be expressed clearly and the accuracy of the processed document can be clarified.

<Third Embodiment>

A third embodiment of the present invention will be described.

Figure 19:
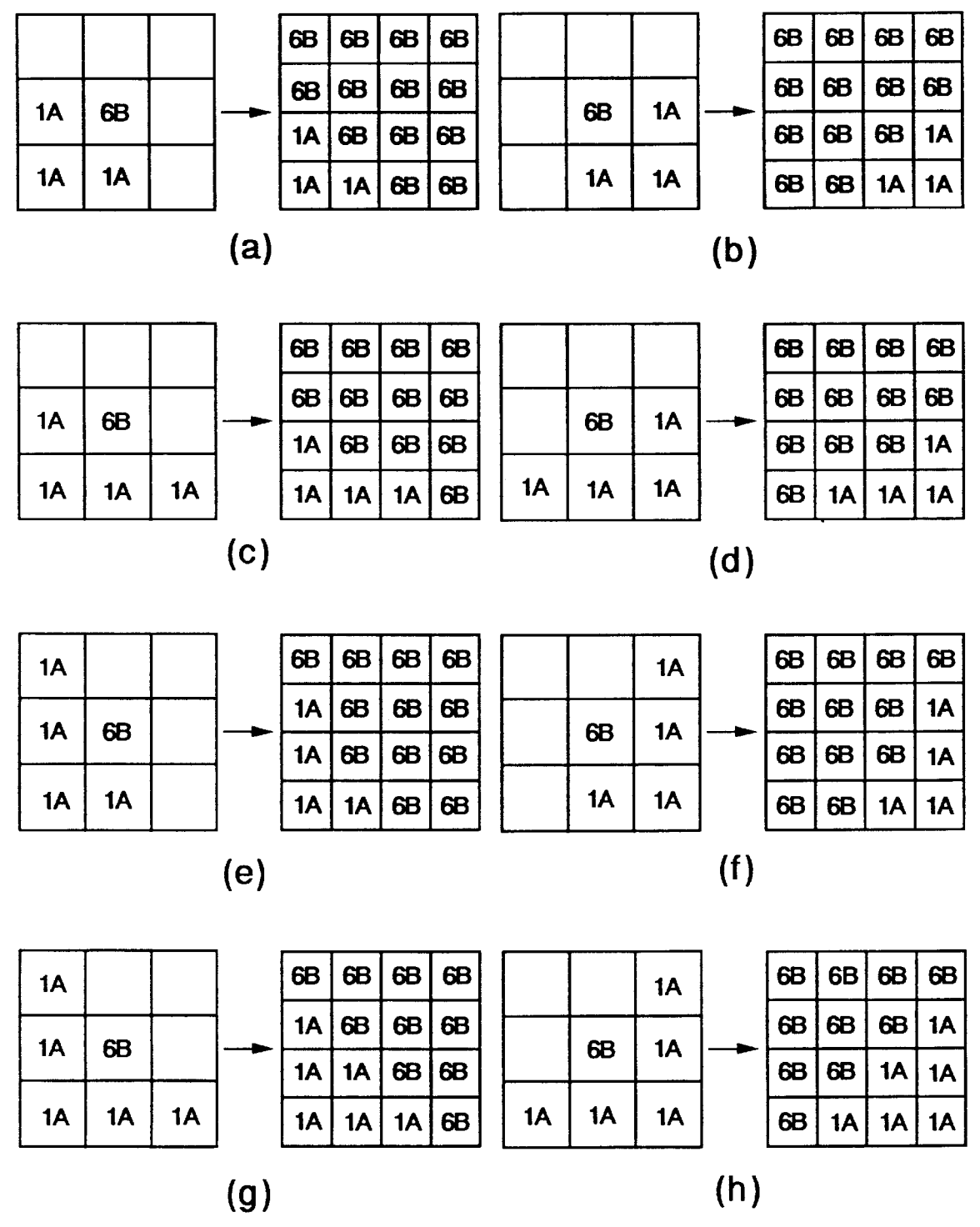

FIGS. 19(*a*) to 19(*h*) and 20(*a*) to 20(*h*) illustrates the improvements in the density patterns shown in FIGS. 16(*a*) to 16(*h*) and 17(*a*) to 17(*h*). As can be clearly seen from the drawings, the outline is further smoothed.

FIGS. 19 (*a*), 19 (*b*) and 20 (*c*) and 20 (*d*) respectively show the cases where the inclination of the boundary makes 45° and 135° and a subject pixel of 150 dpi is sectioned in a proportion of 3:13. Referring to the two drawings, (g) and (h), the boundary is 45° and 135° and the subject pixel of 150 dpi is sectioned at a proportion of 3:5. Furthermore, (c) to (f) respectively illustrate the cases where the boundary is 27°, 63°, 117° and 153° and the subject pixel of 150 dpi is sectioned into a proportion of 1:3.

According to this embodiment, the joint between the pixels can be further smoothed.

As described above, according to the second and the third embodiments, in the case where the multivalued data items having different gray levels are positioned in contact with each other, the boundary can be clearly expressed by performing smoothing.

<Fourth Embodiment>

Figure 21:
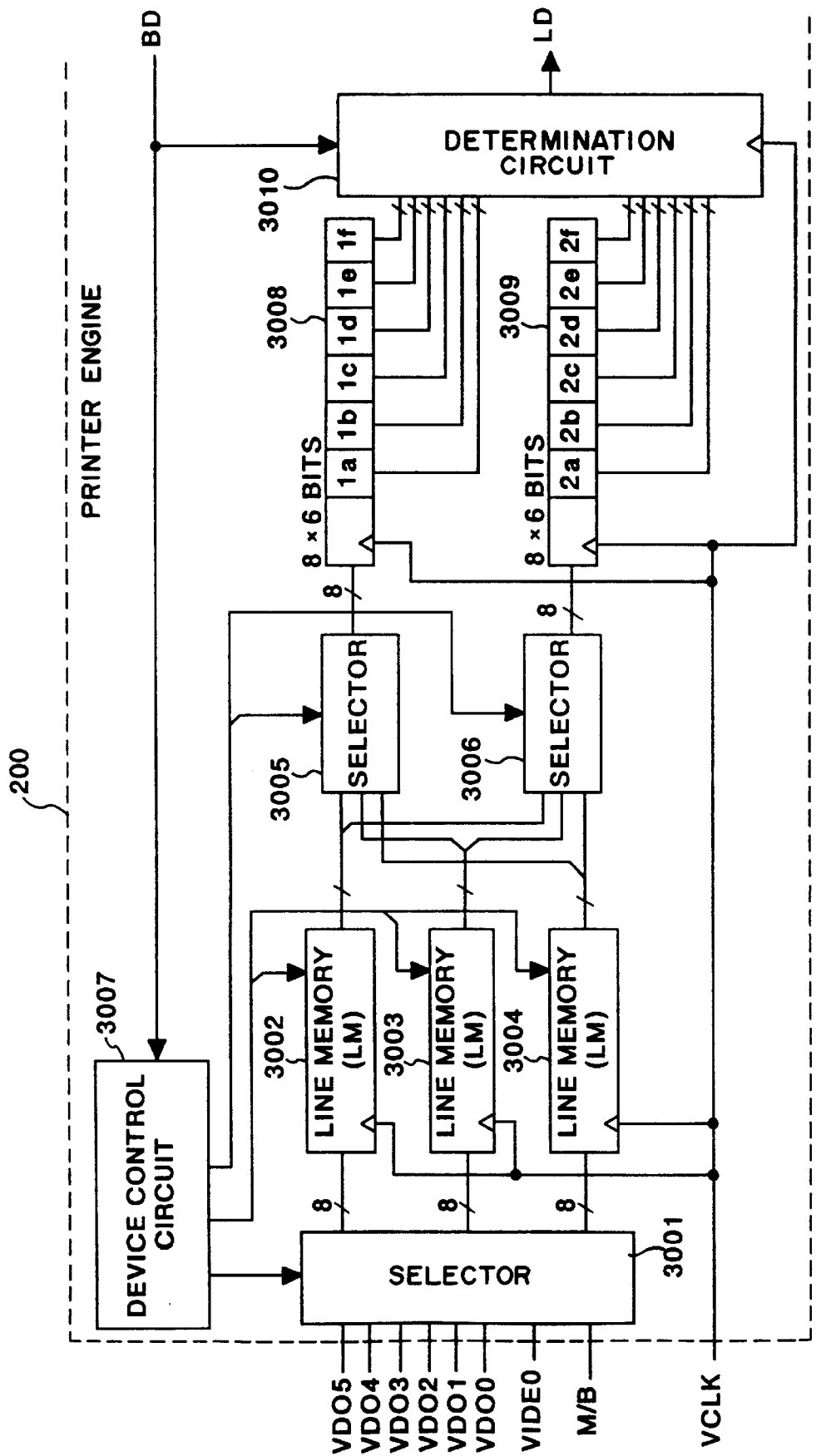
FIG. 21 is a block diagram which illustrates a fourth embodiment of the present invention.

FIG. 21 is a block diagram which illustrates a portion of the printer engine portion 200 according to a fourth embodiment. According to this embodiment, the printer controller 100 transmits binary pixel data in the form of 300 dpi data to the printer engine portion 200. Although the multivalued pixel data is transmitted at the same timing as that for the binary pixel data to the printer engine portion 200, substantially 150 dpi data is formed by successively transmits the same pixel data two times.

Referring to the drawing, reference numeral 3001 represents a selector for writing 8 bits signal consisting of 6-bits multivalued video signals VD00 to VD05, binary video signal VIDEO (1-bit) and multivalue/binary selection signal M/B (1-bit) supplied from the printer controller 100 in synchronization with the image clock VCLK to a line memory selected from line memories 3002 to 3004. The line memories 3002 to 3004 are the memories each of which has a capacity of storing 8-bits video signal for one line in the main scanning direction and arranged to be read and write in accordance with the image clock signal VCLK. Reference numerals 3005 and 3006 represent selectors each of which selects output data from any of the line memories 3002 to 3004 so as to write it to shift registers 3008 and 3009. Reference numeral 3007 represents a device control circuit which controls the above-described selectors 3001, 3005 and 30006 and the line memories 3002 to 3004 in response to the beam detect signal BD which is a known synchronizing signal in the main scanning direction. Reference numerals 3008 and 3009 represent shift registers capable of storing six pixel data items each of which has the depth corresponding to 8 bits, pixel data stored in the respective shift outputs 1a to 1f and 2a to 2f being supplied to a determination circuit 3010. The determination circuit 3010 performs a predetermined processing in accordance with the supplied pixel data so that the laser drive signal LD is transmitted.

Figure 22:
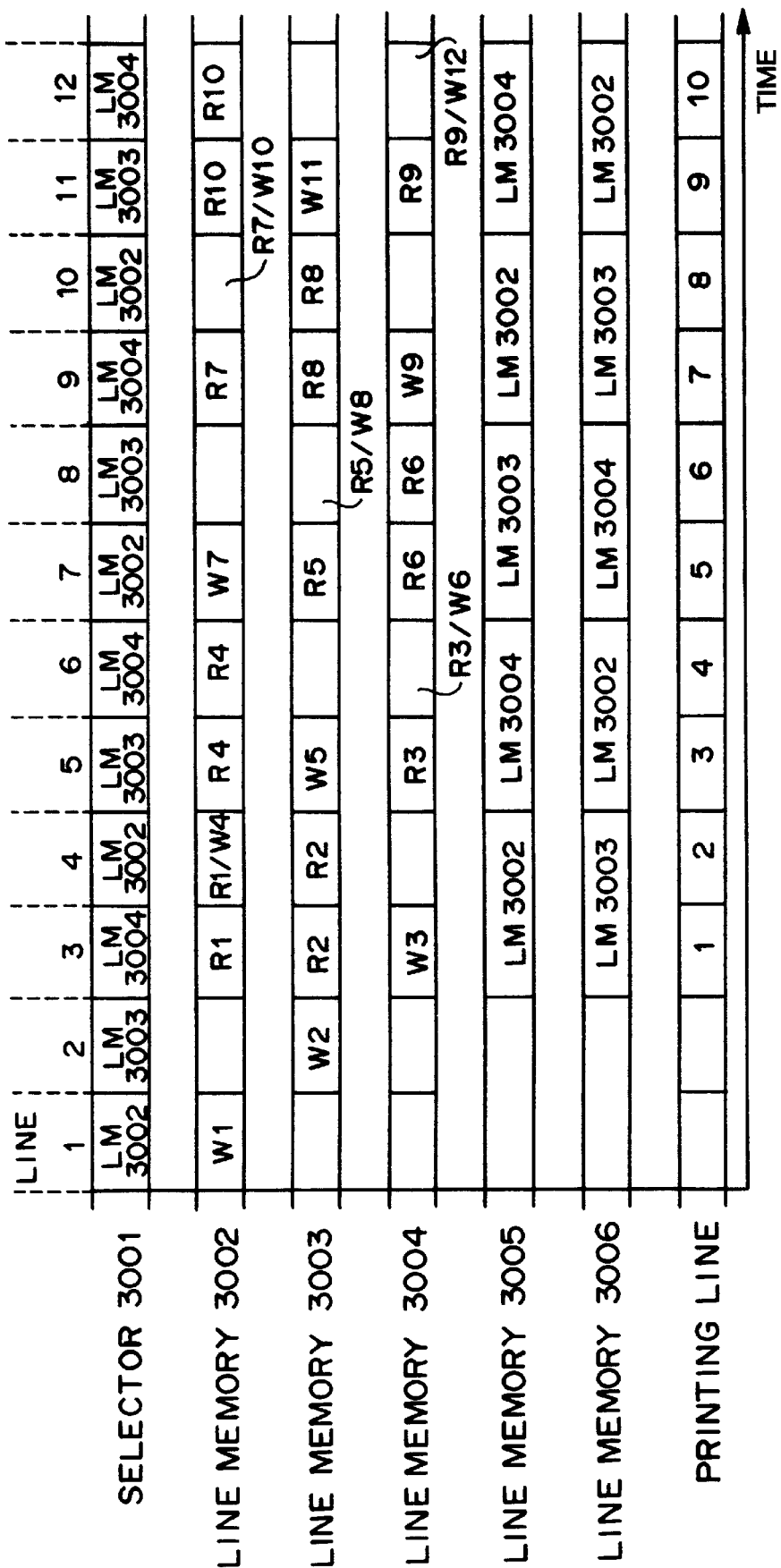
FIG. 22 illustrates the operation timing of a line memory shown in FIG. 21.

Then, the operation of this embodiment will be described. The printer controller 100 has a binary and a multivalued bit map memories so as to transmit the binary image data developed therein as the signals VD0 to VD05 for one each line in the main scanning direction in synchronization with the signal BD. Although the data for each of the pixels is transmitted in synchronization with the image clock signal VCLK, the resolution is 150 dpi in the case where the data is multivalued data. Therefore, the controller transmits the same data for two clock pulses of the VCLK signal. Furthermore, a multivalue/binary selection signal M/B is, as a signal for selecting whether the printing is performed in accordance with either signal, transmitted in response to the VCLK signal in the case where both binary data and multivalued data exist for a certain pixel. The 8-bits video signal for one line in the main scanning direction is written to any of the line memories 3002 to 3004 selected by the selector 3001. The data which has been previously written is read from the residual two line memories except for the line memory which has been brought to the writing mode. The data thus read out is supplied to the selectors 3005 and 3006. The timing of the operation of each of the selectors and the line memories controlled by a device control circuit 3007 is shown in FIG. 22. Referring to the drawing, symbol "Wn" represents timing at which data on the n-th line in the main scanning direction is written, while symbol "Rn" represents timing at which data on the m-th line is read. Furthermore, symbols "Rm/Wn" denote a case where the reading of the m-th line and writing to the n-th line are simultaneously performed. As is shown from the drawing, data is written to the line memories 3002, 3003, 3004, 3002, . . . , in this sequential order. On the other hand, data reading is performed in such a manner that the same data is read two times from a pair consisting of an odd-number line and the next even-number line so as to be respectively supplied to the shift registers 3008 and 3009. The shift outputs 1a to 1f and 2a to 2f from each of the shift registers 3008 and 3009 are supplied to the determination circuit 3010. That is, data for 6 pixels in the lateral direction for the neighboring two lines, that is, data for 2×6 pixels is latched by the shift registers 3008 and 3009.

Figure 23A:
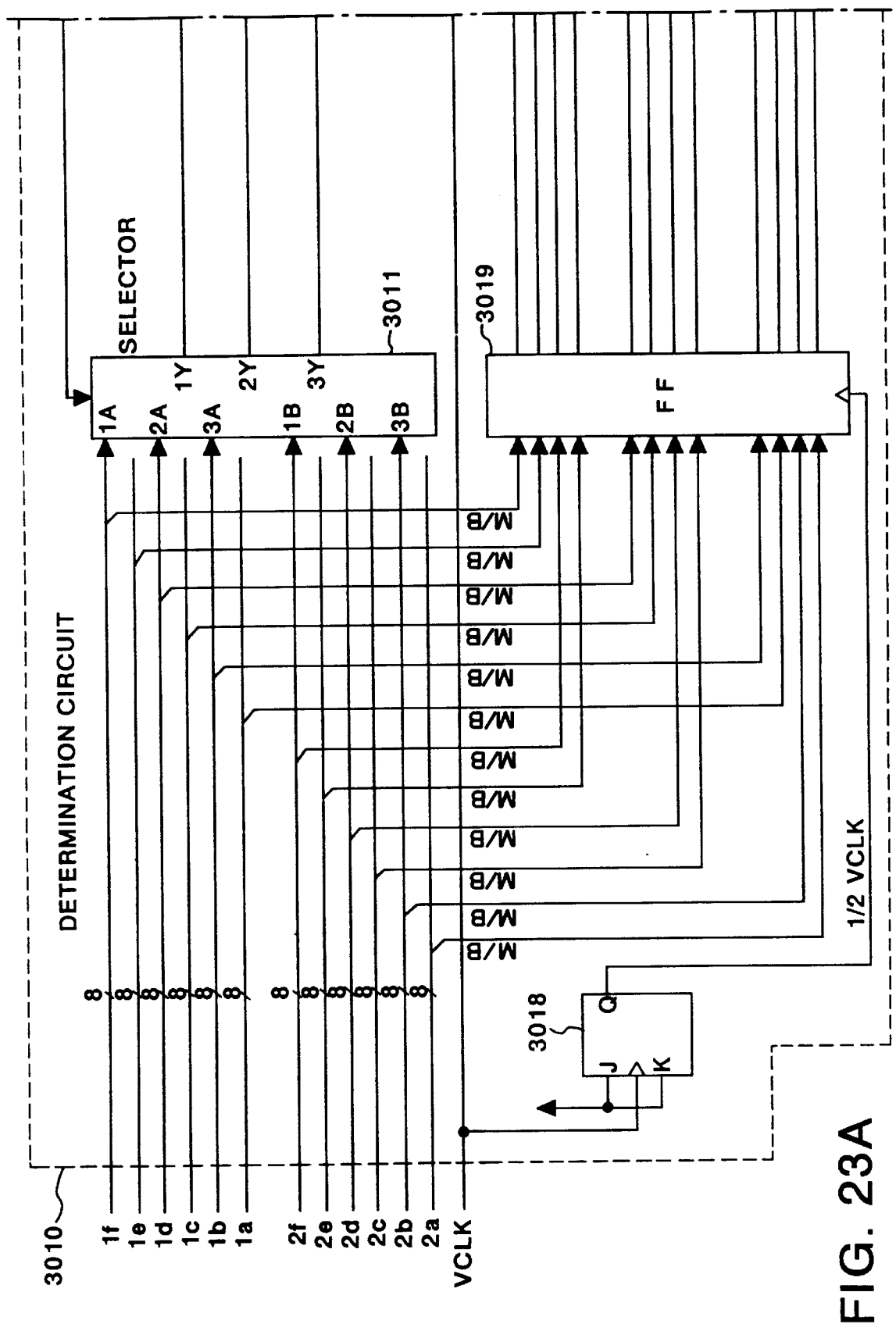
FIGS. 23A and 23B are block diagram of the determination circuit shown in FIG. 21.
Figure 23B:
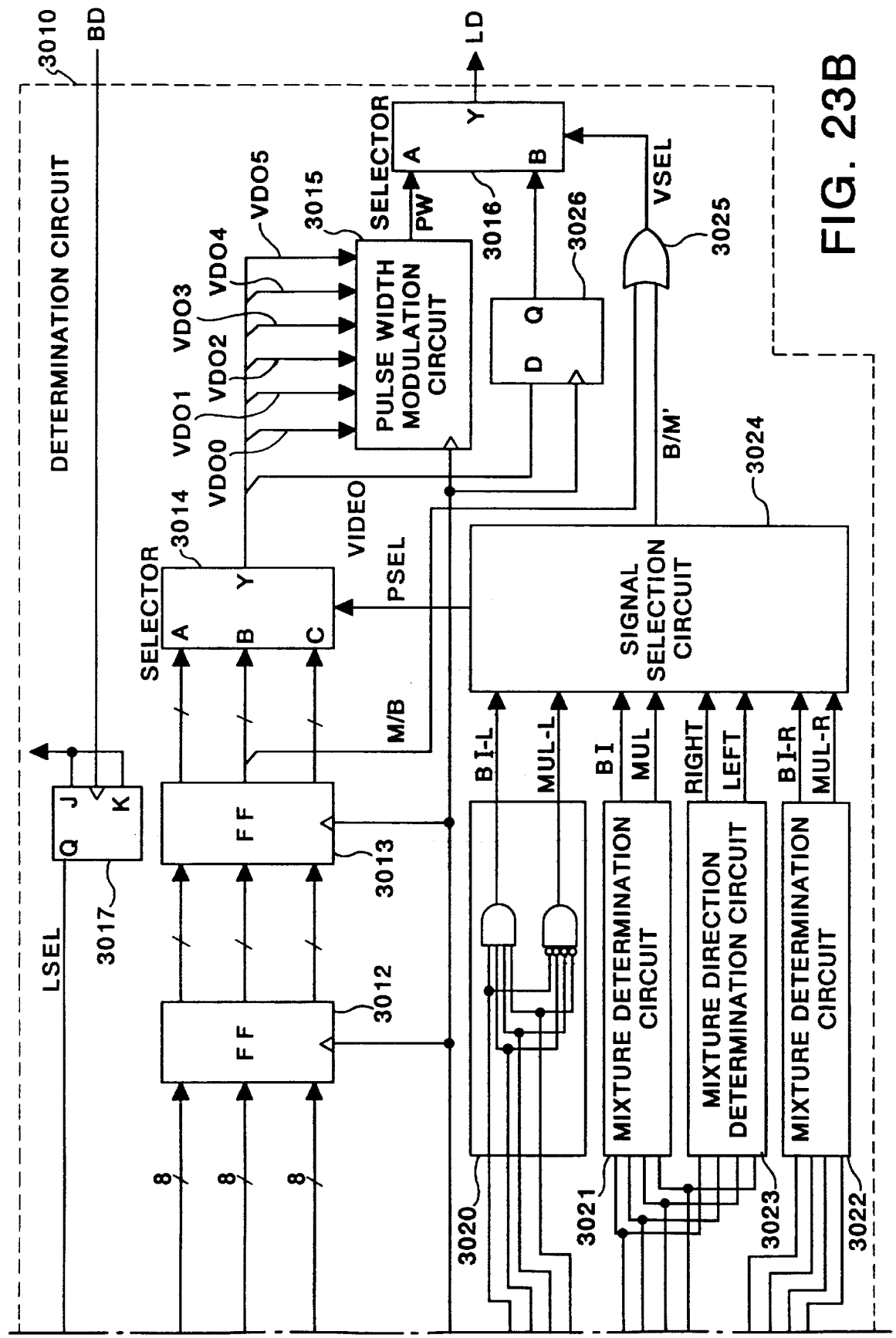

An example of the structure of the determination circuit 3010 is as shown in FIGS. 23A and 23B.

Referring to the drawing, reference numeral 3011 represents a selector which selects the supplied data pair "A" or "B" as output Y. Reference numeral 3014 represents a selector for selecting a pair from the three input pairs A to C as the output Y. Reference numeral 3015 represents a pulse width modulation circuit for transmitting pulse width modulation signal PW in response to the multivalued video signals VDOO to VD05. Reference numerals 3020 to 3022 represent a mixture determination circuit for determining whether or not multivalued data and binary data are mixed in the pixel in a unit of 150 dpi. Reference numeral 3023 represents a mixing direction determination circuit for determining the direction of the multivalue/binary mixed pixel of the subject pixel when viewed at the resolution of 150 dpi. Reference numeral 3024 represents a signal selection circuit for transmitting selection signal PSEL and M/B' (to be described later) serving as the printing signal in response to the above-described information about the mixture and the mixing direction signal.

Then, the operation will be described.

The pixel data for the odd-number line is transmitted from the shift outputs 1a to 1f of the shift register 3008, while pixel data for the even-number line is transmitted from the shift outputs 2a to 2f of the shift register 3009. Assuming that the shift output 1d is the subject pixel, 1c is the data for the right pixel adjacent to the subject pixel 1d when viewed at a unit of 300 dpi, while 1e is the data for the left pixel adjacent to the subject pixel 1d. On the other hand, 1b is the data for the right pixel adjacent to data 1d which expresses a portion of the subject data 1d when viewed in a unit of 150 dpi, while 1f is the data for the left pixel. Similarly, 2d is the pixel data which expresses a portion of the subject pixel when viewed in a unit of 150 dpi and other symbols hold the similar relationship for the odd-number line. Data 1b, 1d and 1f are supplied to the input A of the selector 3011, while 2b, 2d and 2f are supplied to the input B of the selector 3011. The selector 3011 alternately transmits the inputs A and B for each line in response to signal LSEL which is alternately switched in response to the signal BD by a J–K flip-flop 3017. That is, data 1b, 1d and 1f are selected/transmitted for the odd-number line, while data 2b, 2d and 2f are selected/ transmitted for the even-number line. The output data is delayed by the D-flip-flops 3012 and 3013 by a degree corresponding to two clocks of the signal VCLK so that tha data is syncronized with data deleyed by flip-flop 3019, and is supplied to the selector 3014.

On the other hand, the multivalue/binary selection signal M/B included in the input signals 1a to 1f and 2a to 2f is latched by signal ½ VCLK halved by the J–K flip-flop 3018. That is, data is latched in the flip-flop 3019 at a unit of 150 dpi. The signals 1c, 1d, 2c and 2d are 4-dot data which forms the subject pixel when viewed in a unit of 150 dpi. That is, 1c is the data for the upper right portion of the subject pixel, 1d is the data for the upper left portion, 2c is the data for the lower right portion and 2d is the data for the lower left portion. Similarly, 1a, 1b, 2a and 2b are data for the dot which forms the pixel at right of the subject pixel (to be called a "right pixel" hereinafter) when viewed in a unit of 150 dpi, while 1e, 1f, 2e and 2f are data for the dot which forms the pixel at left of the subject pixel (to be called a "left pixel" hereinafter). The positional relationship between the pixel groups is shown in FIG. 24.

The multivalue/binary selection signal M/B for each of the left pixel signals 1e, 1f, 2e and 2f of the output data from the flip-flop 3019 is supplied to the mixture determination circuit 3020. The multivalue/binary selection signal M/B of the subject pixel signals 1c, 1d, 2c and 2d are supplied to the mixture determination circuit 3021 and the mixture direction determination circuit 3023. The multivalue/binary selection signal M/B of the right pixel signals 1a, 1b, 2a and 2b is supplied to the mixture determination circuit 3022. Each of the mixture determination circuits makes a determination whether or not the multivalued pixel data and the binary pixel data are mixed in the 150 dpi pixel. That is, in the case of the subject pixel, if all of the 4-dot 300 dpi data items which form the pixel is binary data, signal BI becomes "1". If all of the 4-dot data items are multivalued data, signal MUL becomes "1". In the case where the binary data and the multivalued data are mixed, both the signals BI and MUL become "0". The signals BI-L and MUL-L respectively correspond to the signals BI and MUL in the left pixel, while signals BI-R and MUL-R correspond to the same in the right pixel. In other words, if all of the 4-dot 300 dpi data items from the 150 dpi pixel to the left of the subject pixel are binary data, then the signal BI-L becomes "1". If all of the 4-dot 300 dpi data items from the 150 dpi pixel to the left of the subject pixel are multivalued data, then the signal MUL-L becomes "1". The signals BI-R and MUL-R are determined in a similar manner from the 4-dot 300 dpi data items from the 150 dpi pixel to the right of the subject pixel. Furthermore, the signal 1d-M/B, 2d-M/B, 1c-M/B and 2c-M/B of the subject pixel are supplied to the mixture direction determination circuit 3023 in which the region, in which the multivalued data exists in the subject pixel, is positioned on the right side of the subject pixel or the left side is determined. As a result, the mixture direction determination circuit 3023 transmits signal RIGHT if it has determined that the multivalued data is positioned on the right side of the pixel, while it transmits signal LEFT if it has been determined that the multivalued data is positioned on the left side. An example of the structure of the mixture direction determination circuit 3023 is shown in FIG. 25.

FIG. 26 illustrates mixture patterns of the multivalue/ binary data in a pixel of 150 dpi and outputs when the pixel of each of the mixture patterns has been determined by the circuit shown in FIG. 25. The LEFT and RIGHT signals are eventually used, as described below, to select the multivalued data that is to be printed for the subject pixel. As seen in FIG. 26, when the binary data is on the right and the multivalued data is on the left, the LEFT signal is 1, which will cause the multivalued data from the left of the subject pixel to be selected. Similarly, when the binary data is on the left and the multivalued data is on the right, the RIGHT signal is 1, which will cause the multivalued data from the right of the subject pixel to be selected. The pattern which becomes symmetric with respect to the center line in the main scanning direction of the 150 dpi pixel becomes the same result, its pattern is omitted from the illustration.

Referring back to FIGS. 23A and 23B, each of the output signals from the mixture determination circuits 3020 to 3022 and the mixture direction determination circuit 3023 are supplied to the signal selection circuit 3024. The signal selection circuit 3024 transmits signal PSEL for selecting a pixel signal with which the printing is performed and the signal M/B'. The signal PSEL acts to select a signal from the left pixel signal, the subject pixel signal and the right pixel signal with which the printing is performed, the selected signal being then supplied to the selector 3014. The signal M/B' selects the multivalue processing or the binary processing in response to the signal of the pixel selected in response to the signal PSEL, the signal M/B' being supplied to a selector 3016 via an OR circuit 3025.

As described above, the left pixel video signal is supplied to the input A of the selector 3014, the subject pixel video signal is supplied to the input B and the right pixel video signal is supplied to the input C. The PSEL signal selects and transmits any of the above-described pixel video signals. The signals PSEL and M/B' are determined in accordance with the following algorithm.

I. PSEL signal (1) In the case where the subject pixel is a mixture of the multivalue/binary data, the mixture direction is right and the right pixel is a non-mixture pixel, the signal for the right pixel, that is, the input C of the selector is selected.

(2) In the case where the subject pixel is a mixture of the multivalue/binary data, the mixture direction is left and the left pixel is a non-mixture pixel, the signal for the left pixel, that is, the input A of the selector is selected.

(3) In the other cases, the signal for the subject pixel, that is, the input B of the selector is selected.

II. M/B' signal

In the case where all of the 2×2 pixels of 300 dpi, which constitute the 150 dpi pixel (any of the inputs A to C of the selector 3014) selected and transmitted in response to the signal PSEL, are binary data items, the M/B' signal of level "1" is transmitted. On the other hand, the signal M/B' of level "0" is transmitted in the other case.

The relationship between the input to the signal selection circuit 3024 and the output from the same under the above-described restriction is shown in FIG. 27, where symbol X represents that either "1" or "0" may be selected.

The binary signal VIDEO of the signals selected by the selector 3014 is synthesized with the clock VCLK by the flip-flop 3026 so as to be supplied to the input B of the selector 3016, while the multivalued signals VD00 to VD05 are supplied to the pulse width modulation circuit 3015.

Figure 28:
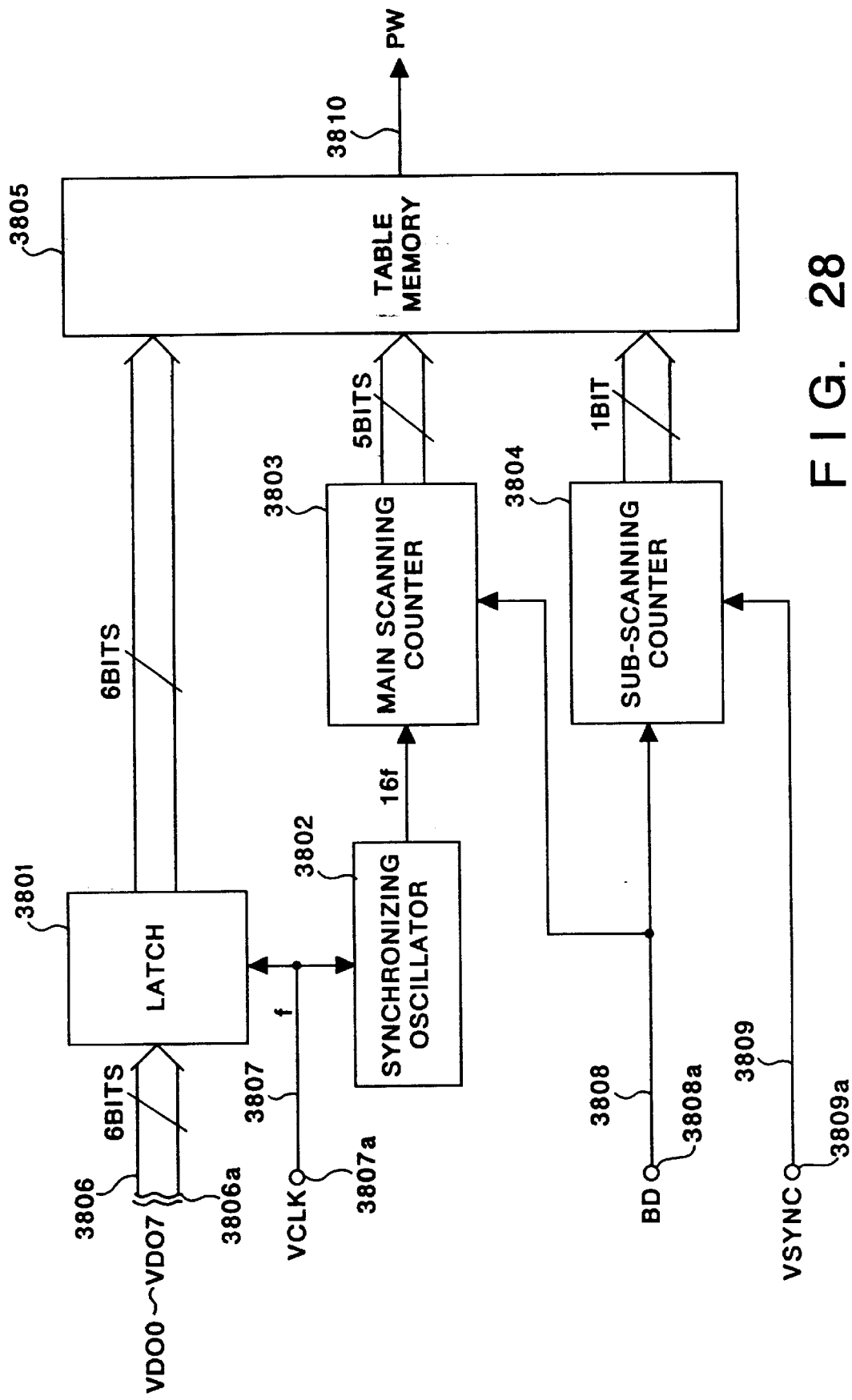
FIG. 28 illustrates the structure of the signal selection circuit shown in FIG. 23.

An example of the pulse width modulation circuit 3015 is shown in FIG. 28.

Referring to the drawing, reference numeral 3801 represents a latch for latching the multivalued image data VD00 to VD05. Reference numeral 3802 represents an oscillator for generating predetermined period clock 16f which expresses the printing density realized by the printer apparatus in the main scanning direction, the oscillator 3802 being a synchronizing oscillator acting in synchronization with the image clock VCLK (3807). The synchronizing oscillator 3802 transmits the clock 16f the frequency of which is 16 times the frequency of the clock VCLK assuming that the frequency of the VCLK is f. Reference numeral 3803 represents a main scanning counter which performs the counting in accordance with the clock 16f supplied from the synchronizing oscillator 3802. Reference numeral 3804 represents a sub-scanning counter for performing the counting the number of the horizontal synchronizing BD signal 3808. Reference numeral 3805 represents a table memory which receives the input video signal and the output value from each of the counters 3803 and 3804 and transmits the results of "1" and "0" obtained by dither processing the multivalued input video signal by a predetermined threshold matrix. Reference numeral 3806a represents a video signal input terminal through which the multivalued video signals VD00 to VD05 (3806) are supplied. Reference numeral 3807a represents an input terminal for the image clock VCLK (3807) and 3808a represents an input terminal for the horizontal synchronizing signal BD (3808). Reference numeral 3809a represents an input terminal for the vertical synchronizing signal VSYNC (3809) and 3810 represents a binary signal transmitted from the table memory 3805, that is, video signal PW which has been dither-processed. Then, the operation of the above-described circuit will be described.

The 6-bits multivalued video signals VD00 to VD05 (3806) supplied from the selector 3014 are latched by the latch circuit 3801 in accordance with the image clock VCLK (3807). The multivalued video signals thus latched are supplied as the address signals for the table memory 3805.

The image clock 3807 triggers the synchronizing oscillator 3802 so that the output 16f from the synchronizing oscillator 3802 counts up the main scanning counter 3803. The main scanning counter 3803 expresses the counted value in the form of a parallel binary 5-bits data which is then supplied to the upper bit portion of the bit in the table memory 3805 to which the multivalued video signal 3806 has been supplied. The main scanning counter 3803 is reset in response to the horizontal synchronizing signal BD (3805) so as to act as a point address formed by finely sectioning the pixel region (1-dot region of 4800 dpi).

The sub-scanning counter 3804 is counted up in response to the horizontal synchronizing signal BD (3808), the counted value being expressed by a binary 1-bit data. The 1-bit data is supplied to the upper bit of the bit in the table memory 3805 to which the counted value of the counter 3803 is supplied. The sub-scanning counter 3804 is reset at the forward end of the image region in response to the vertical synchronizing signal VSYNC (3809) so as to act as a pointer for the sub-scanning direction.

By virtue of the counted value of each of the main scanning counter 3803 and the sub-scanning counter 3804, each of the threshold values in the 32×2 dither matrix is selected. The threshold in the dither matrix has been set in accordance with the characteristics of the printer. The signals "1" and "0" which are the results of the comparison between the threshold in the matrix and the value of the multivalued video signal are stored in the respective addresses of the table memory 3805. As a result of the above-described threshold processing, a 300 dpi pixel can be expressed by four pixels consisting of two pixels in the main scanning direction and two pixels in the sub-scanning direction, that is, expressed in 64 gradations in a unit of 150 dpi. The signal PW is transmitted in the form of a signal the pulse width of which has been modulated in a unit of 1/16 of a pixel in the case of the binary processing. The signal PW thus processed is supplied to the input A of the selector 3016 shown in FIGS. 23A and 23B. The selector 3016 selects the binary video signal VIDEO when the selection signal VSEL is "1" and selects the pulse width modulation signal PW which is a binary video signal when the selection signal VSEL is "0". The selection signal VSEL is formed by calculating the OR of the multivalue/binary selection signal M/B (the output from the flip-flop 13) about the subject pixel position and the output M/B' from the signal selection circuit. A signal selected in response to the selection signal VSE1 serves as laser drive signal LD so that a semiconductor laser (omitted from illustration) is operated. As a result, the printing is performed by a known electrophotographic process.

According to the above-described structure and the operation, when a binary image and a multivalued image having a resolution lower than the binary image are recorded in an overlapped manner, a result shown in FIG. 29 can be obtained.

Figure 38A:
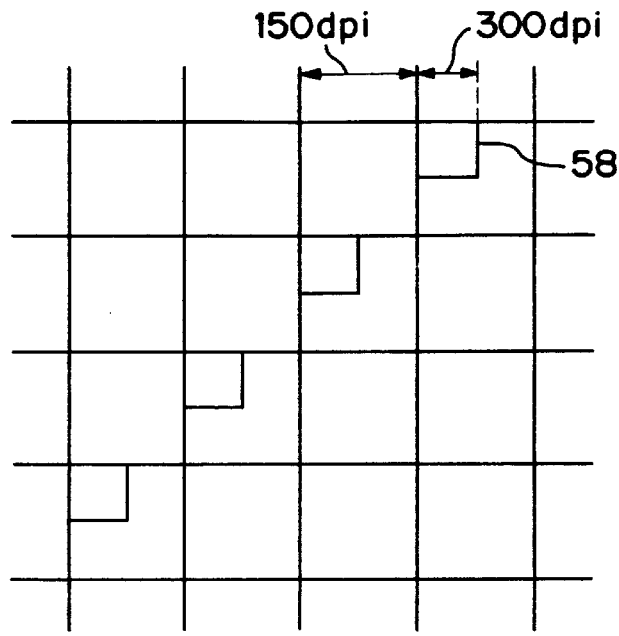
FIGS. 38A to 38C illustrate problems experienced with the conventional apparatus.
Figure 38B:
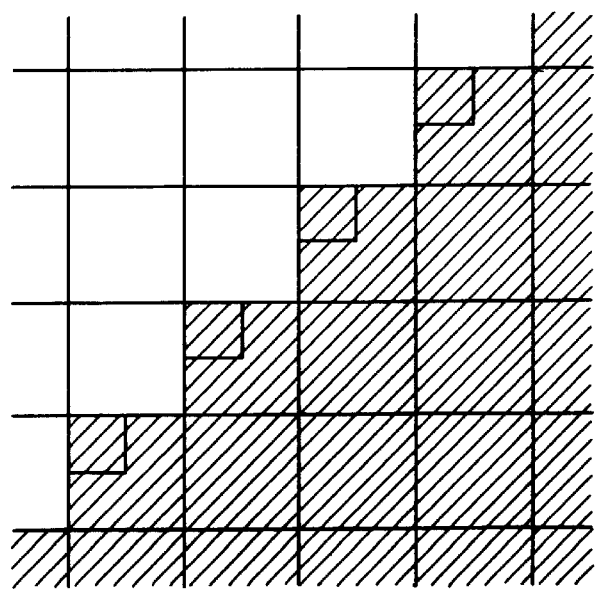
Figure 38C:
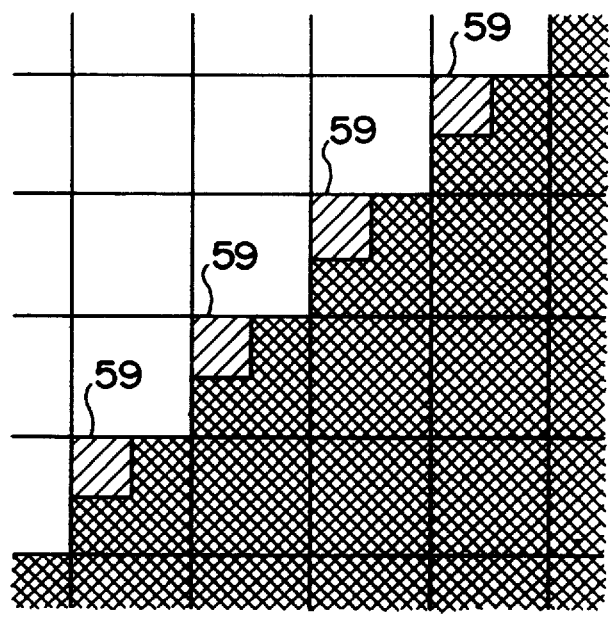

As can be clearly seen from the result of a comparison made with an output image (see FIG. 38C) formed by the conventional processing, a gray portion 59 left on the boundary can be eliminated by the processing according to this embodiment. As a result, the quality of the printed image can be significantly improved.

As described above, according to the fourth embodiment, undesired gray portion, which may be generated on the boundary when a multivalue/binary data is written in an overlapped manner at the time of the post-script processing, can be eliminated. As a result, an image exhibiting an excellent quality can be formed. Although the above-described algorithm is employed in the determination processing according to the fourth embodiment, the present invention is not limited to this. Furthermore, the description is made about a case in which the resolution of the printer is 300 dpi and the resolution in the case of the multivalued printing is 150 dpi. However, the present invention is not limited to this. For example, the structure according to the fourth embodiment can be applied to a case in which printing is performed by a printer having a resolution of 600 dpi in such a manner that a multivalued data image is printed in the form of 150 dpi data by collecting 16 pixels of 600 dpi data. Although the structure is slightly changed, it can be easily realized by employing a structure in which the reading of the memory is performed two times into a structure in which it is performed four times. In addition, according to the fourth embodiment, the processing portion is provided for the portion in the vicinity of the printer engine 200. However, it may, of course, be provided for the portion in the vicinity of the printer controller 100. Furthermore, whether or not the above-described processing is performed may be instructed with a command. Although the laser beam printer is employed in the description according to this embodiment, the present invention is not limited to this. The present invention can be applied to any of the printers capable of performing a plurality of processings having different resolutions.

<Fifth Embodiment>

Figure 30A:
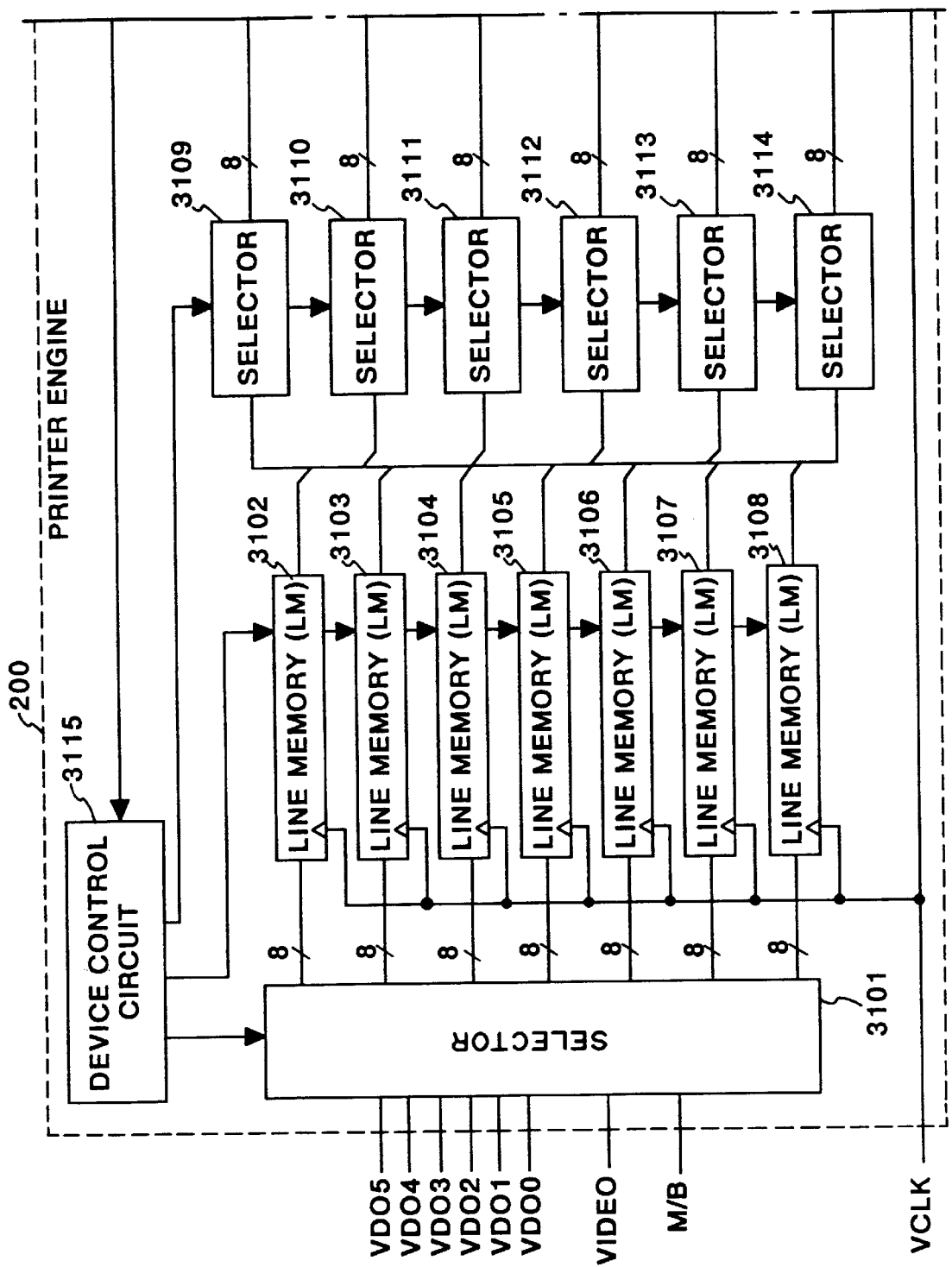
FIGS. 30A and 30B are block diagram according to a fifth embodiment of the present invention.
Figure 30B:
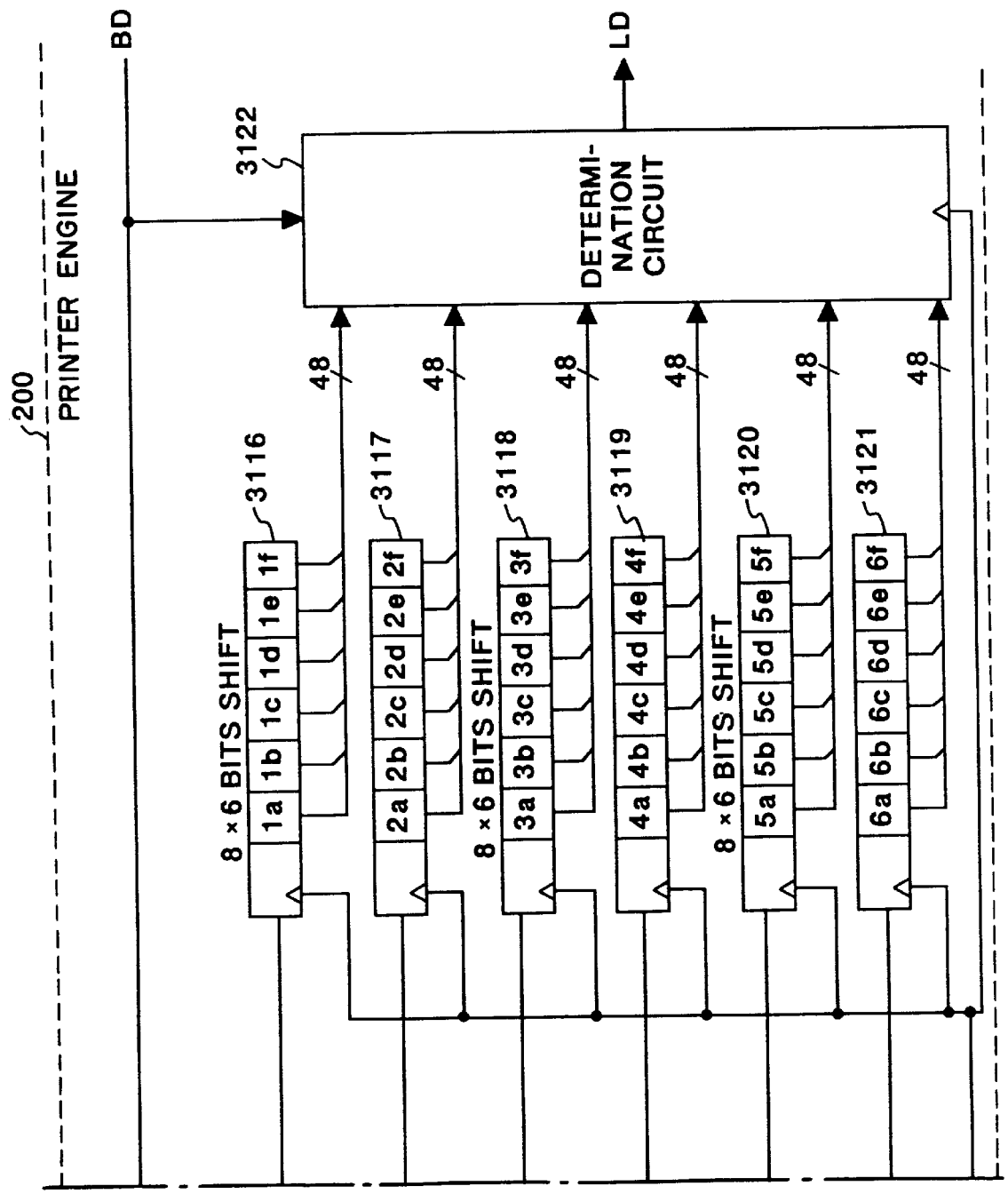

FIGS. 30A and 30B are block diagram of a video signal processing portion according to a fifth embodiment of the present invention. According to the above-described fourth embodiment, the reference is made to only the two pixels disposed adjacent to each other in the main scanning direction of the subject pixel when viewed in a unit of 150 dpi. However, according to the fifth embodiment of the present invention, the reference is made to 8 pixels surrounding and positioned in contact with the pixel to be printed.

In this case, the reference is made to the forward and the rear lines in addition to the line on which the subject pixel exists (three lines in all). Therefore, the line memory having a capacity of substantially three times the structure shown in FIG. 21 must be provided. Specifically, for example, a structure as shown in FIGS. 30A and 30B is necessary to be arranged.

Figure 32:
FIG. 32 illustrates the positional relationship between data registered by the shift register shown in FIG. 30 and the pixel recorded actually.

Since the operation of each of the elements is the same as that according to the fourth embodiment, the description is omitted here. According to this structure, timing of reading/writing the line memories is as shown in FIGS. 31A and 31B. Referring to FIGS. 30A and 30B, the relationships between the shift outputs 1*a* to 1*f,* 2*a* to 2*f,* 3*a* to 3*f,* 4*a* to 4*f,* 5*a* to 5*f* and 6*a* to 6*f* from the respective shift registers 3116 to 3121 and the printing positions are held as shown in FIG. 32.

Figure 3:
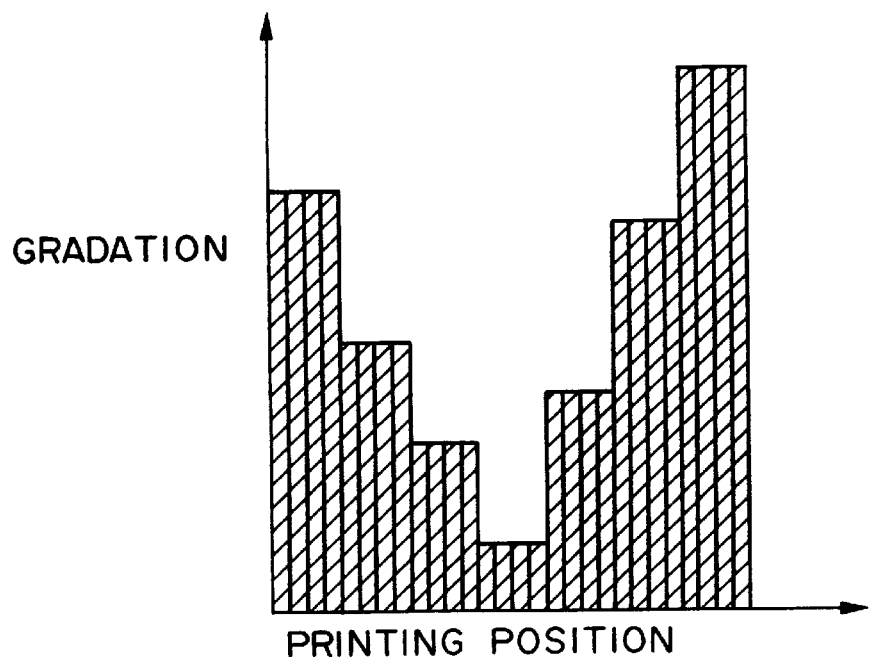
FIG. 3 illustrates the relationship between dot positions and dot gradations when a dot interpolation has been performed at 1200 dpi.

The shift outputs are supplied to a determination circuit 3122 so as to be subjected to predetermined processings. The determination circuit 3122 may, basically, arranged in such a manner that the processings according to the fourth embodiment of the present invention shown in FIGS. 23A and 23B are performed for each of the lines in parallel. Therefore, since the structure is arranged similarly except for the number of the signals which is three times the structure shown in FIG. 3, its illustration is omitted. The determination circuit 3122 acts in such a manner that, when a multivalue/binary data mixture is detected in signals 3*c,* 3*d,* 4*c* and 4*d* of the 300 dpi pixel constituting the subject pixel when viewed in a unit of 150 dpi, it is replaced by data for a non-mixed pixel data for the surrounding 8 pixels. The detection of the 8 non-mixed pixel data is performed by the circuits similarly arranged to the mixture determination circuits 3020, 3021 and 3022 shown in FIGS. 23A and 23B. Since other structures are the same as those according to the fourth embodiment of the present invention, its description is omitted. Furthermore, since the number of the pixels to which the reference is made is large, it might be considered feasible to employ an algorithm from a multiplicity of algorithms. A preferred one may be selected depending upon the characteristics of the printer. According to this embodiment, since the number of the pixels, to which the reference is made, becomes large, the processing can be further accurately performed.

<Sixth Embodiment>

Figure 35:
FIG. 35 illustrates the positional relationship between data registered by the shift register shown in FIG. 33 and the pixel recorded actually.
Figure 33A:
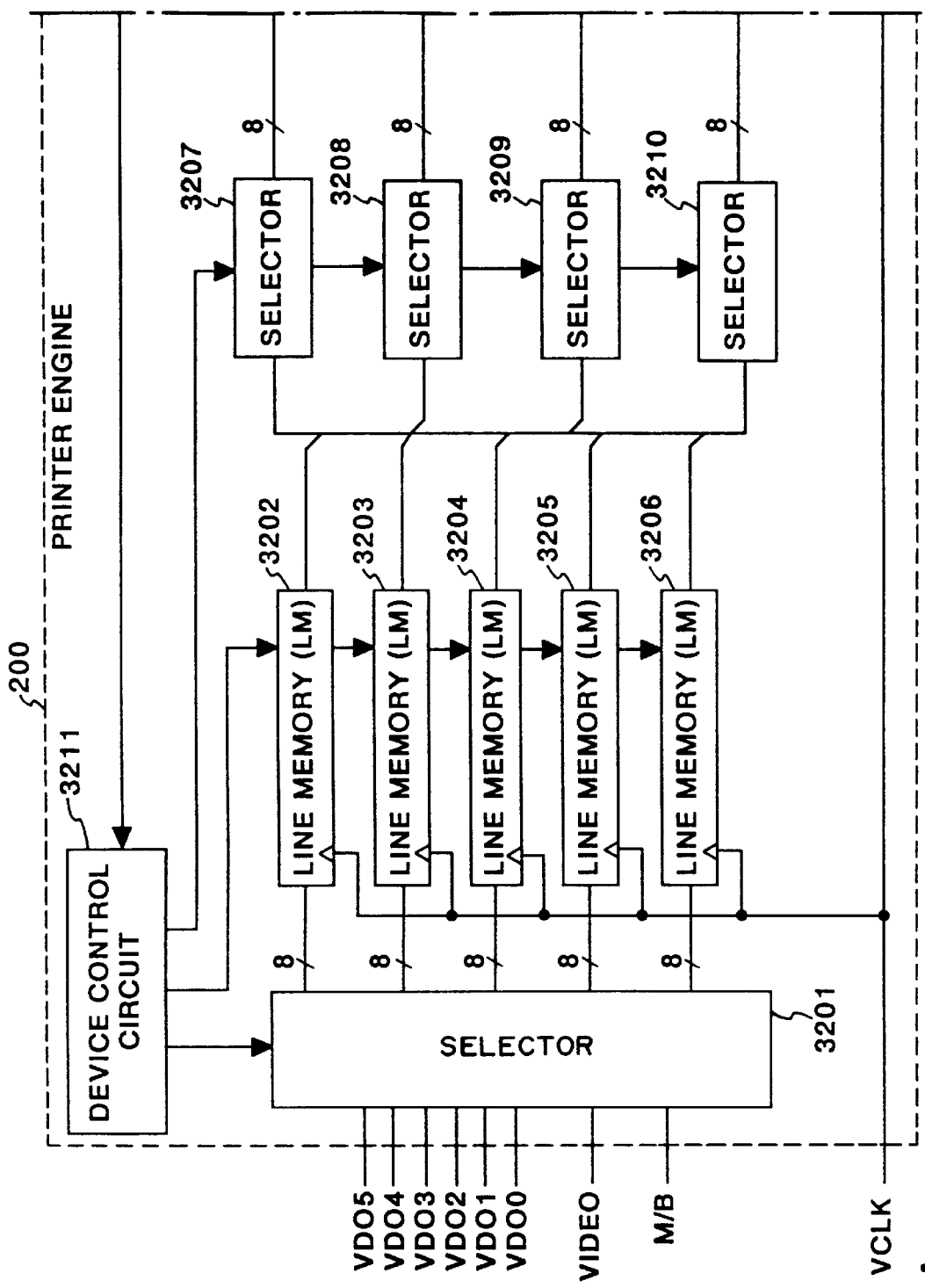
FIGS. 33A and 33B are block diagram according to a sixth embodiment of the present invention.
Figure 33B:
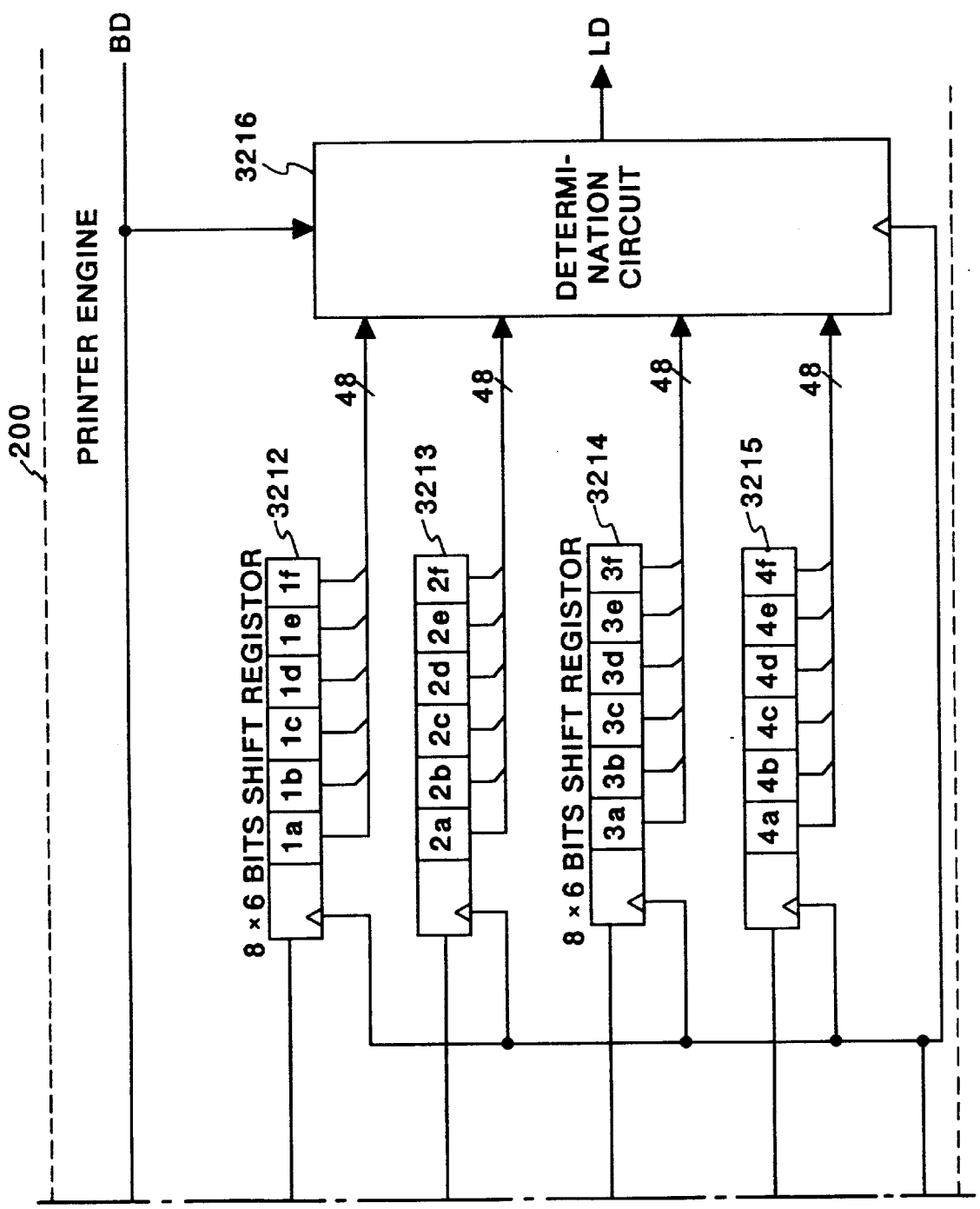

FIGS. 33A and 33B are block diagram which illustrates the structure according to a sixth embodiment of the present invention. The timing of the control of each of the line memories and the selectors is shown in FIG. 34. According to the sixth embodiment, the region of the 150 dpi unit pixel, to which the reference is made, is the same as that according to the fifth embodiment. The structure is characterized in that the region, to which the reference is made, is restricted for the pixels positioned in vertically and diagonally contact with the subject pixel so that the number of the line memories is reduced. FIG. 35 illustrates the positional relationship between the subject pixel and the pixel group to which the reference is made. Similarly to the above-described embodiment, the pixels are given the symbols as illustrated so as to represent the shift outputs from the shift registers 3212 to 3215 shown in FIGS. 33A and 33B. The pixels adjacent to 2*c,* 2*d,* 3*c* and 3*d* constituting the subject pixel in the main scanning direction are subjected to the similar determination processing to that according to the fourth and the fifth embodiments.

As for the pixels vertically and diagonally positioned in contact with the subject pixel, the reference is made to only two pixels of the four 300 dpi pixels constituting the pixel of 150 dpi unit in the main scanning direction, the two pixels being positioned adjacent to the pixel to be printed. That is, the upper right pixel is processed in such a manner that the reference is made to 1*a* and 1*b* and the upper pixel is processed in such a manner that the reference is made to 1*c* and 1*d.* The upper left pixel is processed in such a manner that the reference is made to 1*e* and 1*f* and the lower right pixel is processed in such a manner that the reference is made to 4*a* and 4*b.* The lower pixel is processed in such a manner that the reference is made to 4*c* and 4*d* and the lower left pixel is processed in such a manner that the reference is made to 4*e* and 4*f.* The determination of the above-described pixel, whether or not the mixture of the multivalue/binary data items exist, is made in such a manner that it is determined that it is the mixture of the binary data if the both pixels are binary data, it is the non-mixture pixel of the multivalued data if the both pixels are multivalued data and it is the mixed pixel of the multivalue/binary data in other cases. In accordance with the result of the determination thus made, the mixture data for the subject pixel is replaced by the non-mixture data for the pixel, to which the reference is made, so as to perform the printing. According to the sixth embodiment, the number of the necessary line memories can be reduced, and economical advantage can be obtained.

<Seventh Embodiment>

Figure 36B:
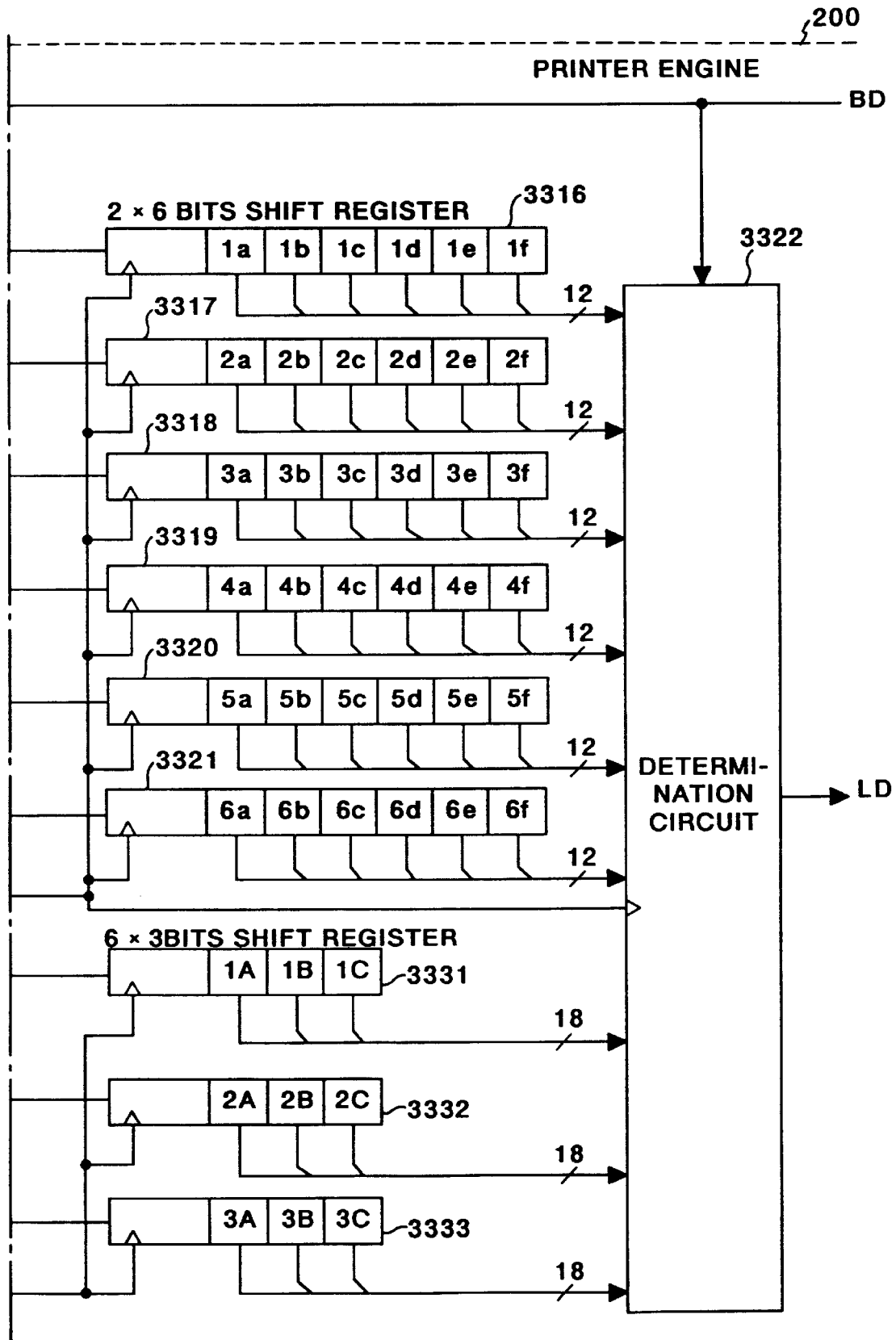
Figure 37:
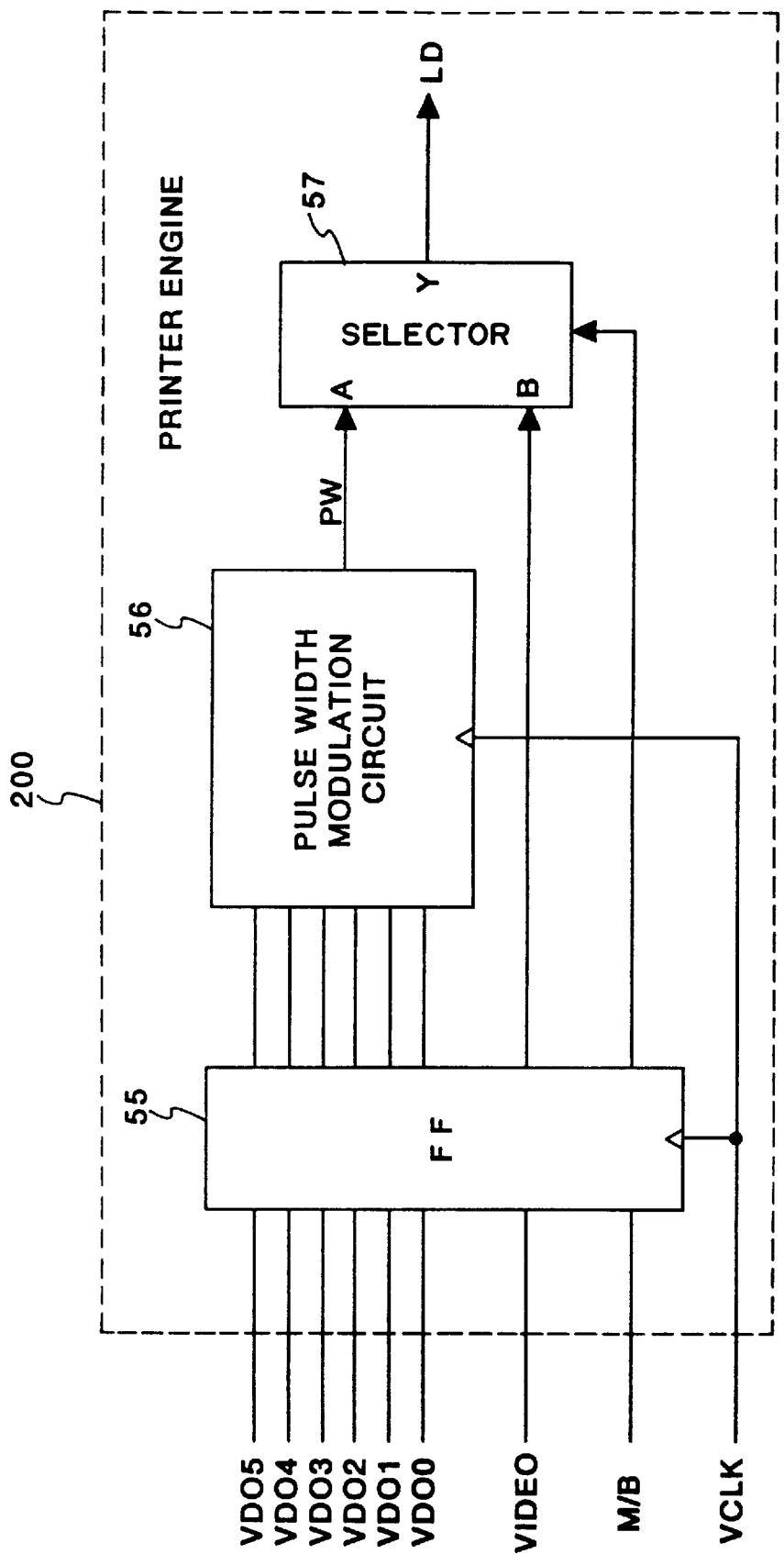
FIG. 37 illustrates a circuit for processing a video signal in a conventional printer engine portion.

FIGS. 36A and 36B are block diagram which illustrates the structure of the seventh embodiment of the present invention.

According to this embodiment, the multivalued data and the binary data are separated from each other at the time of writing the video signal to the line memory so as to be individually written to the respective memories. Referring to the drawing, the line memories 3302 to 3308 serve as the line memories to which binary data is written in such a manner that the binary video signal VIDEO and the multivalue/binary selection signal M/B are written at a density of 300 dpi. The operation timing for each of the line memories and selectors 3309 to 3314 and the shift registers 3316 to 3321 is the same as that according to the fifth embodiment.

On the other hand, the line memories 3324 to 3327 serve as the line memories to which the multivalued video signals VD00 to VD05 are written in such a manner that the writing is performed at a density of 150 dpi in accordance with the clock ½ VCLK obtained by halving the image clock VCLK. Furthermore, data reading from the above-described line memories is performed two times so as to be supplied to the shift registers 3331 to 3333 which also shift the supplied signals in accordance with the clock ½ VCLK so as to transmit each of the shifted signals. The shift output from each of the shift registers 3316 to 3321 and 3331 to 3333 is supplied to a determination circuit 3322 so as to be subjected to the processings similar to those according to the second embodiment. As a result, the printing is performed.

According to the seventh embodiment, since the binary signal and the multivalued signal are separated from each other and the binary signal is written to the line memory at the density of 300 dpi and the multivalued signal having a large number of bits is written to the same at the density Of 150 dpi, the necessary memory capacity can be reduced in addition to the effect obtained from the fourth embodiment.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image processing apparatus comprising:
    means for receiving first pixel data for a large pixel region, and second pixel data for a small pixel region, wherein a plurality of said small pixel regions correspond to one large pixel region, said second pixel data overlying the first pixel data so that second pixel data exists for at least some of said small pixel regions contained within at least some large pixel regions;
    means for receiving identification signals which indicate whether second pixel data exists for each small pixel region; and
    means for generating third pixel data to be supplied to recording means, on the basis of the first and the second pixel data and the identification signals.

2. The image processing apparatus according to claim 1, wherein said generating means includes correcting means for correcting pixel data of a border of an area, when the first and second pixel data, which has been processed for filling an area, are received.

3. The image processing apparatus according to claim 1, wherein, when the identification signals are not identical among all the small pixels in a given large pixel region, and the identification signals are identical among all the small pixels in a neighboring large pixel, said generating means outputs, for a small pixel region within the given large pixel region, data from the neighboring large pixel region.

4. The image processing apparatus according to claim 1, wherein said generating means includes correcting means for, when first pixel data exists for a large pixel region of interest and a neighboring large pixel region, replacing the first pixel data of a small pixel region within the large pixel region of interest with the first pixel data of the neighboring large pixel region.

5. The image processing apparatus according to claim 1, wherein said first pixel data is multivalued data and said second pixel data is binary data.

6. The image processing apparatus according to claim 5, wherein said generating means comprises means for generating a pulse width modulated signal in accordance with the multivalued data.

7. The image processing apparatus according to claim 1, further comprising recording means for recording an image on the basis of the third pixel data.

8. The image processing apparatus according to claim 7, wherein said recording means records the image on recording medium by using an electrophotographic method.

9. An image processing method comprising the steps of:
    receiving first pixel data for a large pixel region, and second pixel data for a small pixel region, wherein a plurality of the small pixel regions correspond to one large pixel region, said second pixel data overlying the first pixel data so that second pixel data exists for at least some of said small pixel regions contained within at least some large pixel regions;
    receiving identification signals which indicate whether second pixel data exists for each small pixel region; and
    generating third pixel data to be supplied to recording means, on the basis of the first and the second pixel data and the identification signals.

10. The image processing method according to claim 9, wherein said generating step includes a correcting step of correcting pixel data of a border of an area, when the area is to be filled by using both the first and second pixel data.

11. The image processing method according to claim 9, wherein, when the identification signals are not identical among all the small pixels in a given large pixel region, and the identification signals are identical among all the small pixels in a neighboring large pixel, said generating step includes the step of outputting, for a small pixel region within the given large pixel region, data from the neighboring large pixel region.

12. The image processing method according to claim 9, wherein said generating step includes a correcting step of, when first pixel data exists for a large pixel region of interest and a neighboring large pixel region, replacing the first pixel data of a small pixel region within the large pixel region of interest with the first pixel data of the neighboring large pixel region.

13. An image processing apparatus comprising;
    means for receiving first pixel data of a first resolution and second pixel data of a second resolution which is an integral multiple of the first resolution, said second pixel data overlying the first pixel data so that second pixel data exists for at least some of the second resolution regions contained within at least some first resolution regions;
    means for receiving identification signals which indicate whether the second pixel data exists for each pixel region of the second resolution; and
    means for generating third pixel data to be supplied to recording means, on the basis of the first and the second pixel data and the identification signals.

14. The image processing apparatus according to claim 13, wherein said generating means includes correcting means for correcting pixel data of a border of an area, when the area is to be filled by using both the first and second pixel data.

15. The image processing apparatus according to claim 13, wherein, when the identification signals are not identical among all the second resolution pixel regions in a given first resolution pixel region, and the identification signals are identical among all the second resolution pixel regions in a neighboring first resolution pixel, said generating means outputs, for a second resolution pixel region within the given first resolution pixel region, data from the neighboring first resolution pixel region.

16. The image processing apparatus according to claim 13, wherein said generating means includes correcting means for, when first pixel data exists for a first resolution pixel region of interest and a neighboring first resolution pixel region, replacing the first pixel data of a second resolution pixel region within the first resolution pixel region of interest with the first pixel data of the neighboring first resolution pixel region.

17. The image processing apparatus according to claim 13, wherein the first pixel data is multivalued data and the second pixel data is binary data.

18. The image processing apparatus according to claim 17, wherein said generating means comprises means for generating a pulse width modulated signal in accordance with the multivalued data.

19. The image processing apparatus according to claim 13, further comprising recording means for recording an image on the basis of the third pixel data.

20. The image processing apparatus according to claim 19, wherein said recording means records the image on recording medium by using an electrophotographic method.

21. An image processing method comprising the steps of:

receiving first pixel data of a first resolution and second pixel data of a second resolution which is an integral multiple of the first resolution, said second pixel data overlying the first pixel data so that second pixel data exists for at least some of the second resolution regions contained within at least some first resolution regions;

receiving identification signals which indicate whether the second pixel data exists for each pixel region of said second resolution; and generating third pixel data to be supplied to recording means, on the basis of the first and the second pixel data and the identification signals.

22. The image processing method according to claim 21, wherein said generating step includes a correcting step of correcting pixel data of a border of an area, when the area is to be filled by using both the first and second pixel data.

23. The image processing method according to claim 21, wherein, when the identification signals are not identical among all the second resolution pixel regions in a given first resolution pixel region, and the identification signals are identical among all the second resolution pixel regions in a neighboring first resolution pixel, said generating step includes the step of outputting, for a second resolution pixel region within the given first resolution pixel region, data from the neighboring first resolution pixel region.

24. The image processing method according to claim 21, wherein said generating step includes a corrective step of, when first pixel data exists for a first resolution pixel region of interest and a neighboring first resolution pixel region, replacing the first pixel data of a second resolution pixel region within the first resolution pixel of interest with the first pixel data of the neighboring first resolution pixel region.

25. An image processing apparatus having a device for outputting image data to a printing means which prints a halftone image on a predetermined recording medium, comprising:

receiving means for receiving image data including binary image data to be printed with a first resolution or multivalued image data to be printed with a second resolution lower than said first resolution and identifying data indicating whether or not a given pixel is binary or multivalued;

binary/multivalued detection means for detecting whether a pixel area of interest represented by said second resolution includes only binary pixels having said first resolution or only multivalued pixels having said first resolution or binary and multivalued pixels having said first resolution, in accordance with the identifying data; and determination means for determining pixel data on the basis of the result of detection by said binary/multivalued detection means and data received by said receiving means.

26. An image processing apparatus according to claim 25, wherein said determination means comprises:

direction detection means for detecting a direction in an area of interest including a multivalued pixel; and selection means for selecting pixel data in the area of interest when said binary/multivalued detection means detects that the area of interest includes only binary pixels or only multivalued pixels, and for selecting pixel data neighboring to the area of interest, which is located in the direction detected by said direction detection means, when said binary/multivalued detection means detects that the area of interest includes both binary and multivalued pixels.

27. The image processing apparatus according to claim 3, wherein the neighboring large pixel region is selected from among a plurality of neighboring large pixel regions based on the identification signals for the small pixels in the given large pixel region.

28. The image processing method according to claim 11, wherein the neighboring large pixel region is selected from among a plurality of neighboring large pixel regions based on the identification signals for the small pixels in the given large pixel region.

29. The image processing apparatus according to claim 15, wherein the neighboring first resolution pixel region is selected from among a plurality of neighboring first resolution pixel regions based on the identification signals for the second resolution pixels in the given first resolution pixel region.

30. The image processing apparatus according to claim 23, wherein the neighboring first resolution pixel region is selected from among a plurality of neighboring first resolution pixel regions based on the identification signals for the second resolution pixels in the given first resolution pixel region.

* * * * *

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.

It is certified that error appears in the above-identified patent and that said Letters Patent is hereby corrected as shown below:

Title page, item
[75] INVENTORS

"Seiji Uchiyama;" should be deleted.

[56] REFERENCES CITED

U.S. Patent Documents
"Chem et al." should read --Chen et al.--.

COLUMN 1

Line 12, "an electrophotography" should read
   --electrophotography,--; and "a" should be deleted.
Line 13, "printer has" should read --printers have--;
   and "an output apparatus for the" should read
   --output apparatuses for--.
Line 14, "computer." should read --computers.--.
Line 15, "advantage" should read --advantages--.
Line 17, "been" should be deleted.
Line 18, "of the" should read --for--.
Line 22, "page" should read --in a page--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.                Page 2 of 14

It is certified that error appears in the above-identified patent and that said Letters Patent is hereby corrected as shown below:

COLUMN 1 CONTINUED

Line 23, "language)" should read --language, also known as a page description language or--.
Line 38, "200" should read --200 is--.
Line 43, "the" should be deleted.
Line 44, "The gradation" should read --Gradations--.
Line 45, "modulation" should read --modulation method--.
Line 46, "hereinafter) method." should read --hereinafter).--.
Line 63, "the" (first occurrence) should read --an--.
Line 65, "resulting" should read --resulting in--.
Line 66, "to become" should read --becoming--.

COLUMN 2

Line 6, "cannot" should read --can--.
Line 13, "half tone" should read --halftone--.
Line 22, "resolution exhibited and the half tone image" should read --resolution, and halftone images--.
Line 31, "6-bits" should read --6-bit--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.    Page 3 of 14

It is certified that error appears in the above-identified patent and that said Letters Patent is hereby corrected as shown below:

COLUMN 2 CONTINUED

Line 47, "(a subject pixel)" should read --(the "subject pixel")--; and "data or the" should read --data, or that the--.
Line 50, "the" (first occurrence) should be deleted.
Line 53, "the" should be deleted.
Line 54, "performed" should read --performed,--.
Line 58, "the" should be deleted.
Line 59, "image" should read --image (gradated image)--; and "the" should be deleted.
Line 61, "the" should be deleted.
Line 65, "in" (first occurrence) should read --by--; and "a unit" should be deleted.
Line 66, "of" should read --at--; and "the" (both occurrences) should be deleted.

COLUMN 3

Line 1, "arises" should read --gives rise to--.
Line 5, "in" (second occurrence) should read --in a--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.          Page 4 of 14

It is certified that error appears in the above-identified patent and that said Letters Patent is hereby corrected as shown below:

COLUMN 3 CONTINUED

Line 6, "post-script," should read --Post Script (a trademark of Adobe)--.
Line 10, "post-script" should read --Post Script--.
Line 15, "FIG. 38," should read --FIG. 38B,--.
Line 34, "plurality" should read --plurality of types--; and "softwares" should read --software--.
Line 35, "are" should read --is--; and "it" should be deleted.
Line 38, "to" should read --on--.
Line 63, "to" should read --on--.

COLUMN 5

Line 44, "illustrate" should read --illustrate a--.
Line 60, "a" should be deleted; and "an" should be deleted.
Line 62, "respectively illustrate" should read --illustrate the--.
Line 63, "of" should read --of the--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.

It is certified that error appears in the above-identified patent and that said Letters Patent is hereby corrected as shown below:

COLUMN 6

Line 23, "diagram" should read --diagrams--.
    Line 42, "are" should read --are a--.
    Line 49, "are" should read --are a--.
    Line 57, "are" should read --are a--.
    Line 66, "Preferred" should read --The preferred--.

COLUMN 7

Line 6, "referring" should read --(referring--.
    Line 7, "4A-2," should read --4A-2),--.
    Line 19, "by a quantity" should be deleted.
    Line 20, "line" should read --line at a time--.
    Line 26, "times" should read --times the--.
    Line 37, "Then," should read --Now,--.
    Line 45, "the" (first occurrence) should read --a--.
    Line 51, "an" should be deleted.
    Line 53, "the" (first occurrence) should be deleted;
       and "times" should read --times that in signal VDO--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.

It is certified that error appears in the above-identified patent and that said Letters Patent is hereby corrected as shown below:

COLUMN 8

Line 19, "the" (second occurrence) should read --a--.
Line 20, "of" should be deleted; and "times" should read --times that required for--.
Line 21, "the" should read --a--.
Line 60, "16 gradations" should read --16-gradation--.
Line 61, "4-bits" should read --4-bit--; and "Thus," should read --Now,--.
Line 67, "neighboring two" should read --two neighboring--.

COLUMN 9

Line 3, "resulted" should read --resulting--.
Line 7, "each of" should be deleted.
Line 8, "are" should read --are each--.
Line 12," neighboring two" should read --two neighboring--.
Line 16, "in" should be deleted.
Line 24, "the" should read --a--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.            Page 7 of 14

It is certified that error appears in the above-identified patent and that said Letters Patent is hereby corrected as shown below:

COLUMN 9 CONTINUED

```
Line 29, "Then," should read --Now,--.
Line 41, "five-bits" should read --five-bit--.
Line 51, "supplied" should read --being supplied--.
Line 60, "four-bits" should read --four-bit--.
```

COLUMN 10

```
Line 1, "4-bits" (both occurrences) should read
   --4-bit--.
Line 2, "4-bits" should read --4-bit--.
Line 19, "having the" should read --whose--.
Line 20, "corresponding" should read --correspond--.
Line 22, "an" should be deleted.
Line 30, "from" should read --from the--.
Line 37, "from" should read --from the--.
Line 42, "so as to be transferred" should read
   --for transfer--.
Line 50, "in that" should read --for--.
Line 52, "supplied two" should be deleted.
```

UNITED STATES PATENT AND TRADEMARK OFFICE
CERTIFICATE OF CORRECTION

PATENT NO. : 5,850,295
DATED : December 15, 1998
INVENTOR(S) : ATSUSHI KASHIHARA ET AL.

It is certified that error appears in the above-identified patent and that said Letters Patent is hereby corrected as shown below:

COLUMN 10 CONTINUED

```
Line 53, "it" should be deleted.
Line 54, "two supplied" should be deleted.
Line 56, "Then," should read --Now,--.
```

COLUMN 11

```
Line 33, "an excessive" should read --a strong--.
Line 34, "character" should read --character,--.
Line 39, "to" should read --with--.
Line 44, "to" should read --with--.
Line 49, "a" (second occurrence) should be deleted.
Line 50, data" should read --data having--.
Line 51, "the half tone" should read --a halftone--.
Line 56, "only with" should read --with only--.
Line 66, "it" should be deleted; and "the edge
   portion of the" should read --edge portions of--.
Line 67, "character and the line" should read
   --characters and lines--.
```

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.

It is certified that error appears in the above-identified patent and that said Letters Patent is hereby corrected as shown below:

COLUMN 12

```
Line 2, "inputted" should read --input--.
Line 11, "of" (second occurrence) should read
    --the level of whose--.
Line 12, "the level of which" should be deleted.
Line 25, "8-bits" should read --8-bit--.
Line 29, "for" should read --for a--.
Line 33, "8 bits" should read --8-bit--.
Line 37, "frequency is four times" should read
    --frequency of which is four times higher--.
Line 42, "so as to be" should read --before being--.
```

COLUMN 13

```
Line 9, "9-bits" should read --9-bit--.
Line 30, "transmitted" should read --being transmitted--.
Line 32, "9x6(=54" should read --9x6(=54)--.
Line 33, "bits)" should read --bits of--.
Line 39, "region," should read --region--.
Line 40, "made," should read --made--.
```

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.

It is certified that error appears in the above-identified patent and that said Letters Patent is hereby corrected as shown below:

COLUMN 13 CONTINUED

Line 42, "Then," should read --Now,--.
    Line 63, "it" should be deleted.
    Line 65, "the" (third occurrence) should be deleted.

COLUMN 14

Line 5, "a" should be deleted.
    Line 6, "unit" should read --units--.
    Line 8, "Then," should read --Now,--.
    Line 17, "54-bits" should read --54-bit--.
    Line 60, "illustrates the" should read --illustrate--.
    Line 64, "FIGS. 19 (a), 19 (b) and 20 (c) and 20 (d)"
       should read --FIGS. 19(a), 19(b), 20(c) and 20(d)--.
    Line 67, "drawings," should read --drawings--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.

It is certified that error appears in the above-identified patent and that said Letters Patent is hereby corrected as shown below:

COLUMN 15

Line 2, "Furthermore," should read --Furthermore--.
    Line 20, "timing" should read --time--.
    Line 22, "transmits" should read --transmit time--.
       and "transmits" should read --transmitting--.
    Line 25, "writing 8 bits" should read --writing an
       8-bit--; and "6-bits" should read --6-bit--.
    Line 31, "the" should be deleted.
    Line 32, "8-bits" should read --8-bit--.
    Line 33, "write in" should read -written to--.
    Line 51, "Then," should read --Now,--.
    Line 53, "a" (both occurrences) should be deleted.
    Line 66, "8-bits" should read --8-bit--.

COLUMN 16

Line 23, "pixels" should read --pixels,--.

COLUMN 17

Line 3, "tha" should read --the--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.

It is certified that error appears in the above-identified patent and that said Letters Patent is hereby corrected as shown below:

COLUMN 18

Line 10, "its" should read --and so its--.
    Line 11, "back" should read --again--.

COLUMN 19

Line 9, "counting" should read --counting of--.
    Line 28, "6-bits" should read --6-bit--.
    Line 37, "a" should be deleted; and "5-bits" should
       read --5-bit--.

COLUMN 20

Line 28, "undesired gray portion," should read
       --an undesired gray portion--.

COLUMN 21

Line 3, "forward" should read --following--.
    Line 4, "rear" should read --preceding--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.

It is certified that error appears in the above-identified patent and that said Letters Patent is hereby corrected as shown below:

COLUMN 21 CONTINUED

Line 5, "the" should read --a--.
Line 8, "necessary to be" should read --necessary.--.
Line 9, "arranged." should be deleted.
Line 21, "arranged" should read --be arranged--.
Line 31, "a unit" should read --units--.
Line 37, "its" should read --Their--.
Line 41, "algorithms." should read --available algorithms.--.
Line 48, "are" should read --are a--.

COLUMN 22

Line 29, "are" should read --are a--.
Line 63, "Of" (second occurrence) should read --of--.
Line 67, "form" should read --forms--; and "particularly," should read --particularity,--.

UNITED STATES PATENT AND TRADEMARK OFFICE
CERTIFICATE OF CORRECTION

PATENT NO. : 5,850,295

DATED : December 15, 1998

INVENTOR(S) : ATSUSHI KASHIHARA ET AL.

It is certified that error appears in the above-identified patent and that said Letters Patent is hereby corrected as shown below:

COLUMN 23

Line 1, "form has been" should read --forms can be--.
    Line 2, "and the combination" should read --and that different combinations--.
    Line 3, "arrangement" should read --arrangements--.

COLUMN 24

Line 18, "comprising," should read --comprising:--.

Signed and Sealed this

Fourteenth Day of December, 1999

Attest:

Q. TODD DICKINSON

*Attesting Officer*     *Acting Commissioner of Patents and Trademarks*